(12) United States Patent
Jones et al.

(10) Patent No.: US 10,526,111 B1
(45) Date of Patent: Jan. 7, 2020

(54) COLLAPSIBLE BULK MATERIAL CONTAINER

(71) Applicant: RMC Jones LLC, Prior Lake, MN (US)

(72) Inventors: Robert J. Jones, Prior Lake, MN (US); Michael R. Jones, Apple Valley, MN (US)

(73) Assignee: RMC Jones LLC, Prior Lake, MN (US)

( * ) Notice: Subject to any disclaimer, the term of this patent is extended or adjusted under 35 U.S.C. 154(b) by 0 days.

(21) Appl. No.: 16/273,897

(22) Filed: Feb. 12, 2019

(51) Int. Cl.
| | |
|---|---|
| *B65D 19/18* | (2006.01) |
| *B65D 5/44* | (2006.01) |
| *B65D 77/06* | (2006.01) |

(52) U.S. Cl.
CPC ............ *B65D 19/18* (2013.01); *B65D 5/445* (2013.01); *B65D 77/06* (2013.01); *B65D 2519/00034* (2013.01); *B65D 2519/00129* (2013.01); *B65D 2519/00174* (2013.01); *B65D 2519/00208* (2013.01); *B65D 2519/00422* (2013.01)

(58) Field of Classification Search
CPC ........ B65D 19/00–18; B65D 5/00–445; B65D 2519/00–00129; B65D 2519/00208; B65D 2519/00174; B65D 2519/00422; B65D 77/00–06
See application file for complete search history.

(56) References Cited

U.S. PATENT DOCUMENTS

| | | | |
|---|---|---|---|
| 1,044,023 | A | 11/1912 | Colgate |
| 1,139,281 | A | 5/1915 | Hazelton |
| 1,794,821 | A | 3/1931 | Andrews |
| 2,056,956 | A | 10/1936 | Carpenter |
| 2,337,370 | A | 12/1943 | Broadfoot |
| 2,502,586 | A | 4/1950 | Ottinger |
| 2,503,022 | A | 4/1950 | Benoist et al. |
| 2,611,526 | A | 9/1952 | George |
| 2,783,960 | A | 3/1957 | Herz et al. |
| 3,026,078 | A | 3/1962 | Simkins |

(Continued)

OTHER PUBLICATIONS

U.S. Pat. No. 49,390, issued Aug. 15, 1865, Doolittle.

(Continued)

*Primary Examiner* — Kareen K Thomas
(74) *Attorney, Agent, or Firm* — Merchant & Gould P.C.

(57) ABSTRACT

A collapsible, reusable bulk material container assembly, kit and method for assembling and using same are disclosed. Upper ring and base members are locked together by peripheral post members, forming an upright rigid framework that operatively supports a woven fabric bulk material receiving sleeve. A cover connected to the upper ring seals the container. Intermediate support bands may be attached to and along the post members to resist outwardly directed forces applied to the post members through the sleeve by contained bulk material. The container is reconfigurable to a collapsed storage or shipping module that retainably contains the post members, support bands and woven fabric sleeve. The post members may be segmentable or collapsible for containment within the collapsed module. Component parts of the container assembly are detachable, reusable and recyclable. One configuration of the container is sized to replace a conventional 55-gallon drum.

15 Claims, 49 Drawing Sheets

(56) References Cited

U.S. PATENT DOCUMENTS

| | | | |
|---|---|---|---|
| 3,041,029 A | 6/1962 | Brown | |
| 3,123,254 A | 3/1964 | Rabby et al. | |
| 3,255,720 A | 6/1966 | Pasquier | |
| 3,256,839 A | 6/1966 | Peterson et al. | |
| 3,257,068 A | 6/1966 | Wright | |
| 3,301,200 A | 1/1967 | Landsiedel | |
| 3,423,009 A | 1/1969 | Palmer | |
| T886,012 I4 | 5/1971 | Small | |
| 3,653,578 A | 4/1972 | Wood | |
| 3,779,448 A | 12/1973 | Wootten | |
| RE28,439 E | 6/1975 | Shepherd | |
| 3,896,991 A | 7/1975 | Kozlowski et al. | |
| 3,937,392 A | 2/1976 | Swisher | |
| 3,945,493 A | 3/1976 | Cardinal | |
| 3,957,195 A | 5/1976 | Lin | |
| 3,983,914 A | 10/1976 | Benson | |
| 4,013,168 A | 3/1977 | Bamburg et al. | |
| 4,115,909 A | 9/1978 | Corella | |
| 4,176,748 A | 12/1979 | Beane | |
| 4,226,327 A | 10/1980 | Ballard | |
| 4,308,905 A | 1/1982 | Gallagher | |
| 4,337,888 A | 7/1982 | Kudalkar | |
| 4,362,199 A | 12/1982 | Futerman | |
| RE31,191 E | 3/1983 | Connolly | |
| 4,457,483 A | 7/1984 | Gagne | |
| 4,538,385 A | 9/1985 | Kandarian | |
| 4,622,693 A | 11/1986 | Mykleby | |
| 4,655,366 A | 4/1987 | Sykes | |
| 4,666,059 A | 5/1987 | Nordstrom | |
| 4,850,506 A | 7/1989 | Heaps, Jr. et al. | |
| 4,868,955 A | 9/1989 | Magnant et al. | |
| 4,903,431 A | 2/1990 | Stoll | |
| 4,907,515 A | 3/1990 | Win | |
| 4,940,820 A | 7/1990 | Pithouse et al. | |
| 4,997,125 A | 3/1991 | Glerum | |
| 5,158,369 A | 10/1992 | Derby | |
| 5,165,568 A | 11/1992 | Wischusen, III | |
| 5,226,544 A | 7/1993 | Gallucci et al. | |
| 5,285,957 A | 2/1994 | Halsell | |
| 5,323,922 A | 6/1994 | Lapoint, Jr. et al. | |
| 5,340,217 A | 8/1994 | Rothman | |
| 5,405,006 A | 4/1995 | Burgdorf et al. | |
| 5,507,237 A * | 4/1996 | Barrow | B65D 19/08 108/53.1 |
| 5,518,168 A | 5/1996 | Mayer | |
| 5,566,531 A | 10/1996 | Nordstrom et al. | |
| 5,615,608 A | 4/1997 | Shaw et al. | |
| 5,690,037 A | 11/1997 | Hill | |
| 5,746,343 A * | 5/1998 | Waltke | B65D 19/12 206/600 |
| 5,758,973 A | 6/1998 | LaFleur | |
| 5,759,644 A | 6/1998 | Stanley | |
| 5,772,108 A | 6/1998 | Ruggiere, Sr. et al. | |
| 5,795,282 A | 8/1998 | DeMunnik | |
| 5,890,437 A | 4/1999 | Hill | |
| 5,897,012 A * | 4/1999 | Sortwell | B65D 19/12 206/600 |
| 6,112,672 A | 9/2000 | Heil | |
| 6,415,927 B1 * | 7/2002 | Stone | B65D 19/06 206/600 |
| 6,431,435 B1 * | 8/2002 | Jones | B65D 5/029 229/109 |
| 6,932,266 B2 * | 8/2005 | Jones | B65D 5/029 229/109 |
| 6,973,882 B2 | 12/2005 | Baechle et al. | |
| 7,219,609 B1 | 5/2007 | Utz et al. | |
| 7,328,833 B1 | 2/2008 | Wiley | |
| 7,434,721 B2 | 10/2008 | Feltz | |
| 7,516,706 B2 | 4/2009 | Creighton et al. | |
| 7,644,665 B2 | 1/2010 | Creighton et al. | |
| 7,793,828 B2 | 9/2010 | Booth et al. | |
| 7,798,711 B2 * | 9/2010 | Plunkett | B65D 75/5877 383/11 |
| 7,819,269 B2 * | 10/2010 | Perkins | B65D 19/18 220/1.6 |
| 8,221,869 B2 | 7/2012 | Pare | |
| 8,251,209 B2 | 8/2012 | Shiao | |
| 8,256,621 B2 | 9/2012 | Deiger et al. | |
| 8,397,916 B1 | 3/2013 | Cassidy et al. | |
| 8,814,031 B2 | 8/2014 | Graham et al. | |
| 8,919,589 B2 * | 12/2014 | Hill | B65D 19/12 220/6 |
| 8,978,964 B1 * | 3/2015 | Ruggiere, Sr. | B65D 5/445 229/164.1 |
| 9,296,511 B2 | 3/2016 | Jones et al. | |
| 10,065,782 B1 * | 9/2018 | Jones | B65D 77/062 |
| 10,071,842 B2 | 9/2018 | Jones et al. | |
| 2002/0048415 A1 | 4/2002 | Derby et al. | |
| 2002/0148859 A1 * | 10/2002 | Pigott | B65D 11/10 222/185.1 |
| 2002/0170844 A1 * | 11/2002 | Stone | B65D 19/06 206/600 |
| 2003/0123757 A1 | 7/2003 | Cholsaipant | |
| 2004/0081374 A1 | 4/2004 | Richardson, Jr. et al. | |
| 2004/0238400 A1 * | 12/2004 | Knutsson | B65D 11/1833 206/600 |
| 2005/0045639 A1 | 3/2005 | Thorpe | |
| 2005/0196080 A1 * | 9/2005 | Stone | B65D 19/06 383/119 |
| 2006/0027638 A1 | 2/2006 | Jones et al. | |
| 2008/0083354 A1 | 4/2008 | Markert et al. | |
| 2008/0196633 A1 | 8/2008 | Ho | |
| 2008/0251654 A1 | 10/2008 | Campbell | |
| 2013/0228574 A1 | 9/2013 | Hill | |

OTHER PUBLICATIONS

U.S. Pat. No. 915,455, issued Mar. 16, 1990, Lynch, Jr.
U.S. Pat. No. 920,637, issued May 4, 1901, Paar.
Pressed Wood Pallets http://uline.com/BL_8203/Pressed-Wood-Pallets retrieved Dec. 4, 2018.
New Wood Pallets http://uline.com/BL_817/New-Wood-Pallets retrieved Dec. 4, 2018.
Block Wood Pallets http://uline.com/BL_718/Block-Pallet retrieved Dec. 4, 2018.
Rackable Pallets http://uline.com/BL_8204/Rackable-Pallet retrieved Dec. 4, 2018.
Aluminum Pallets http://uline.com/BL_367/Aluminum-Pallets retrieved Dec. 4, 2018.
Galvanized Steel Pallet http://uline.com/BL_2298/Galvanized-Steel-Pallet retrieved Dec. 4, 2018.
Heavy Duty Nestable Pallet http://uline.com/BL_8208/Heavy-Duty-Nestable-Pallet retrieved Dec. 4, 2018.
Solid Top Rackable Pallets http://uline.com/BL_1417/Solid-Top-Rackable-Pallets retrieved Dec. 4, 2018.

* cited by examiner

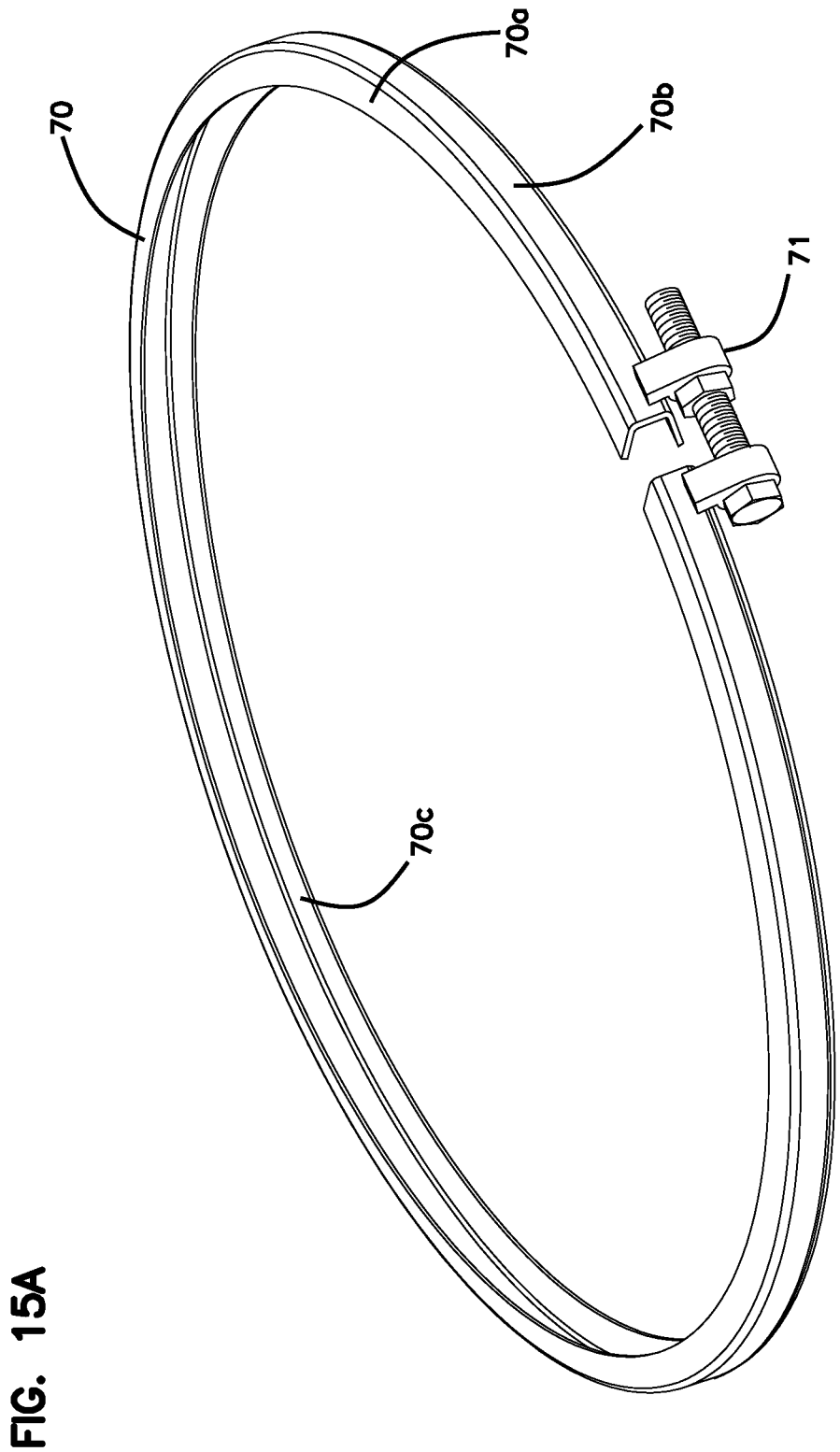

COLLAPSIBLE BULK MATERIAL CONTAINER

FIELD OF THE INVENTION

This invention relates generally to rigid, collapsible storage and shipping containers for bulk materials, and more particularly to a collapsible, reusable, and recyclable rigid framework shipping container particularly suitable and adapted to be supportively carried by pallets commonly used in the packaging/transport industries and collapsible to a protective modular unit suitable for storage and reshipment for reuse at a fraction of the cost of storing and shipping comparably sized non-collapsible rigid containers.

BACKGROUND OF THE INVENTION

Effective, reliable, safe, and economical packaging of bulk material products into containers for handling, transport, and storage have been concerns for many years to the packaging and transport industries. Bulk products requiring such packaging vary widely from semisolids such as ketchup and other food items, to granular materials such as beans, peas, grains, rice, salt, flour, sugar, dry chemicals, dry cementitious products, animal feeds, fertilizers, soap, and other such items, to liquid materials such as syrups, milk, juices, glues, inks, paints, resins, chemicals, and the like. Since such materials have a tendency to move or flow, containment of them for shipment handling and storage raises many challenges. While the shapes and configurations of containers for such bulk products vary, a commonly used container configuration has been a drum-type container that can be readily transported by truck, rail, or ship and that can be easily handled during transport and at a final destination, such as at a processing or manufacturing facility, by hand or by readily available equipment such as a forklift, crane, or hand truck. The flowing nature and weight of bulk products present unique packaging issues for a drum container. A popular packaging industry standard drum-type container commonly used for transporting bulk materials is the 55-gallon drum, which is easy to handle and move and which is conveniently arrangeable on industry standard sized pallets. Movement or shifting of contained bulk materials during transport can cause deformation of the drum container that can result in load shifting and instability and possible bursting of the drum, often with enough force to damage or destroy the drum container. The result is loss or damage to drum container contents and undue clean-up and environmental concerns. Besides the strength requirements for containing a bulk material, the container must be designed for additional strength, stability, and reliability if the containers are stacked upon each other during storage or shipment.

While the 55-gallon drum container has been a favorite size and configuration in the packaging industry, and while the preferred embodiments of the present invention will be described primarily in view of the 55-gallon drum industry standard, it should be understood that this invention is not limited to a 55-gallon container or even to a drum shaped container. Those skilled in the art will recognize that the principals of this invention apply to containers of both larger and smaller containment sizes and to containers of varied configurations, geometric shapes, and profiles. Further, while the preferred embodiments of the invention described herein will use specific materials that are suitable for containing certain bulk materials, those skilled in the an will recognize that the principles of this invention apply to the use of other container materials not specifically referred to in this specification. Further, while the preferred embodiments described herein may use polyethylene or polypropylene liners that fit within the drum type container described and are compatible with or suitable for the bulk material being contained for preventing contamination of the material or, in the case of a liquid, for containing the liquid, the invention is not limited to the use of such liners, or to any particular material described for such liners.

The packaging industry has primarily used five 55-gallon bulk material containment approaches. They will be referred to herein as: (1) the "corrugated" drum containment approach: (2) the "woven fabric" drum containment approach; (3) the "fiber" drum containment approach, (4) the "plastic" drum containment approach; and (5) the "metal" drum containment approach.

Corrugated 55-gallon drum containers are typically manufactured from corrugated cardboard panels that are scored so as to define six or eight vertical wall panels and also the bottom of the container. The ability of a corrugated drum container to handle a wide variety of weight and product consistency requirements is addressed by using different strength grades of corrugated board materials and/or by increasing the wall thickness of the corrugated board material by gluing corrugated sheets together or by inserting a corrugated material sleeve into the outer drum wall perimeter. The price of corrugated 55-gallon drum containers significantly increases with increased wall thickness and/or higher grade or quality corrugated materials. If the drum container board wall strength and/or thickness is reduced in order to cut costs, the contained bulk material pressure exerted against the thinner drum container walls generally causes the drum container wall to bulge outwardly and can result in the drum container having a marginal safety factor that can lead to costly drum container failures during shipment Corrugated drum containers that are subjected to high-humidity and moisture environments can cause the corrugated board material to weaken since they are manufactured from paper. Such high-humidity environments can be found in warehouses or when the container is transported by boat. This problem can be mitigated by using moisture or water resistant coatings or adhesives when the drum containers are manufactured. However, usefulness of the coatings are limited since the base material of the container is paper. Further, such treatments significantly add to the cost of the corrugated drum container. Corrugated drum containers are also subject to damage caused by movement of the container. It is common to move drum containers by hand (without mechanical means) by first tipping the drum container's body into an angled vertical position and then twisting or rolling the drum container along its lower edge to a desired location. The bottom of the corrugated drum container has corners that are defined by the spaces between the vertical scored drum wall panels, rather than a curved circular configuration. As a person rolls the drum to move the container, the weight of the container's contents can crush the container's lower angled corners, compromising the strength and reliability of the container. The unused corrugated containers are generally shipped in collapsed, unassembled form and require less space to ship and store than rigid containers, thereby reducing shipping and storage costs. Further, since the container materials are primarily made from paper, the majority of the corrugated container can be and is recycled. However, used corrugated containers are generally recollapsible and can be reused if desired.

In the woven fabric drum containment approach, the bulk material container is made from a woven fabric material that is flexible, collapsible, recyclable, and reusable. Various fabrics such as woven polypropylene and PVC coated fabrics are used and have various fabric weights and utilize various sewing methods, depending on the required strength for the container and its desired safety factor. The woven fabric containment approach uses bags typically used for transporting large quantities (e.g., 2,000 lbs. or more) of bulk material, and are generally referred to as flexible intermediate bulk containers (FIBC's) or bulk bags. However, the woven fabric containers also are made in smaller sizes such as the 55-gallon drum size. The fabric material has outstanding strength and safety factor ratios as compared to the weight of the contained bulk material. For example, an FIBC bag configured to hold a bulk material weighing 2,000 lbs. may have a strength rating capable of holding up to 10,000 lbs. of material-a safety factor ratio of 5:1 The woven fabric container has lifting handles, in the nature of sewn-in slings that can be engaged by a forklift to lift and move the container. The fabric containers can be designed with various shaped tops suitable for filling, and can have a solid bottom or a bottom with a sewn-in discharge spout configured for discharge of the container contents through the bottom of the container. The bulk material can be directly inserted into the woven fabric container, or a polyethylene or polypropylene liner can first be inserted into the woven fabric bag to isolate the contained bulk material from direct contact with the woven fabric and to prevent contamination of the contained bulk material. Such liners are typically disposed of after use. Since the woven fabric material has no inherent rigidity, for dry or fluidized products that require a more rigid drum container for stability or stacking strength, solid support inserts may be placed inside the woven fabric container or slid into individual sewn pockets in the internal fabric wall of the drum container. Because of the cost of sewing operations during manufacture and the costs of any rigidity enhancing inserts used in these types of containers, they typically result in a more expensive container than the corrugated drum containers. However, if used without significant rigidity supports to hold and store liquid materials, the woven fabric container acts like a large water balloon, thereby making these types of containers more practical for use in shipping and storing dry bulk products instead of liquid or semiliquid materials. Further, the inserts that are typically placed within the woven fabric containers to provide sidewall rigidity are generally sleeves joined or hinged at their adjoining edges, to fold flat when not in use, and do not have bottoms. Without rigid bottoms, the inserts are susceptible to significant deformation from their intended footprint configuration during loading of the drum container or from subsequent shifting of the contained bulk material during transport, resulting in a misshaped containment system that is unstable before and during shipment. To address this problem, separate solid bottoms can be inserted into the fabric container or attached to the outside surface of the base of the drum container with adhesive or sewing, thus adding additional cost to the container. It is a common industry practice to use corrugated cardboard/paper inserts for rigidity. As with the corrugated containers, such inserts are susceptible to degradation and deformation when subjected to moisture or environments of high humidity. If wood or plastic inserts are used, further cost is added to the construction of the woven fabric type of drum container. The 55-gallon size woven fabric drum container can only be moved using the sewn-in slings. It cannot be tilted or rolled to another location like a rigid 55-gallon drum container.

The 55-gallon fiber, plastic, or metal drum containers have cylindrical walls, bottoms, and tops of rigid construction and do not collapse to a flat configuration. They differ in the types of materials from which they are made. The metal drums are typically constructed of steel material. Because of the materials from which these types of drum containers are made, they all overcome, with a significant degree of margin and reliability, the disadvantages of the corrugated and woven fabric drum containers with respect to stacking strength and bulge resistance. They also are generally impervious to moisture or humidity. However, the materials used to manufacture the entire drum surface are more costly than those of the corrugated or woven fabric containers, especially for the steel and plastic versions of these rigid containers. The fiber drum base material is paper. However, it is an industry common practice to poly coat the insides of the fiber drums to provide the fiber drums with more consistent and enhanced strength characteristics when subject to humidity and moisture laden environments, as compared to the corrugated containers.

Because of the rigidity of the fiber, plastic, and metal containers, they do not collapse to a flat configuration, and the storage and shipping costs are considerably higher as compared to the collapsible corrugated and woven fabric drum containers. Such shipping costs are incurred both before and after use of the rigid containers. The considerable higher shipping costs are due to the fact that their rigidity causes them to take more space in a transport vehicle as compared to the collapsible drum versions. In many cases, although a rigid drum is capable of being used a number of times, the costs of shipping the empty containers after use makes it infeasible to reuse the drum due to the expense that would be required to ship the empty containers back to a bulk material loading facility. Further, if cleaning of the containers for reuse becomes necessary, because of their rigidity and solid bottoms, additional cleaning processes and steps are required, resulting in higher costs associated with their use. Further, the costs of disposing of rigid type drum containers is greater than that of the collapsible versions since the rigid containers are more difficult to break down and need to be crushed, particularly the steel version.

The present invention addresses the above problems and shortcomings of the prior drum container bulk material containment approaches. The present invention combines and takes advantage of the strength, flexibility, recyclability and reusability features of the polypropylene materials used in the woven fabric drum containment approach, with the greater stacking and bulge strength features of the rigid fiber, plastic and metal drum container approaches. The invention provides a highly reliable container assembly for bulk materials that is rapidly configurable between an operable upright assembled configuration and a compact collapsed configuration. In its collapsed configuration, the container components are protected within a compact module that is ideal for shipping, storage, and handling and also minimizes damage to and loss of component parts of the container.

SUMMARY OF THE INVENTION

The invention recognizes and employs advantageous features of heretofore known bulk material container approaches, while addressing their shortcomings. The invention uses existing industry accepted packaging materials to form a unique container system that is universally applicable to the packaging, storage, and transport of solid, powder, semi-solid, slurry, granular, and liquid bulk materials and a variety of manufactured components or parts that can be shipped in bulk material fashion.

The container assembly is defined by an external framework of support members that, when assembled, collectively define an internal geometric volume or shape. In preferred embodiments of the invention, the support members include top and bottom members interconnected by a plurality of peripherally spaced support posts and one or more intermediate containment support bands or rings. A flexible woven fabric bag cooperatively fits within the internal geometric volume defined by the assembled framework members and is configured for attachment to the framework members so as to hold the bag in place relative to the framework for receiving a bulk material through an upper opening thereof. An optional polymer liner can be placed within the fabric bag to provide the container with moisture imperviousness and to isolate the woven fabric bag from the bulk material contents loaded into and carried by the container. The framework components are rapidly attachable to and detachable from one another to allow use of the container assembly in assembled and unassembled/collapsed configurations. In the assembled configuration, the framework components, in combination with the woven fabric bag, collectively provide the necessary bulge resistance strength and rigidity for containing a bulk material, and the necessary rigidity and stacking strength to allow a desired plurality of such loaded containers to be safely stacked upon one another for shipping and/or storage. In the unassembled configuration, the woven fabric bag and framework members are configured for cooperative packaging within and between the base and top members, which can be fastened together to form a compact collapsed module that protects the component parts of the container during shipping and storage until reuse of the container assembly is desired. In assembled configuration, a preferred shape and size of the container resembles and replaces that of a standard cylindrical 55-gallon drum type rigid container. The top and bottom framework members of such preferred container shape are circular, enabling manual movement and handling of the container in the same way that known 55-gallon rigid drums are moved, by tipping of the container onto an outer lower edge of the bottom member and rolling the container along such edge in response to twisting motion provided to the container about its longitudinal axis. The container can also be readily handled by mechanical apparatus, such as by forklifts and commonly used container handlers such as used at container filling and emptying facilities. The woven fabric containment bag is preferably constructed of polypropylene material, and the framework components preferably comprise plastic molded parts, making all component parts of the container readily replaceable and recyclable. The collapsible feature of the container, coupled with the self-contained modularity feature of the unassembled container provides for outstanding storage of the container assembly and significant shipping cost savings when compared with rigid, non-collapsible drum containment approaches. Other significant cost savings are realized through multiple storage, reuse, and shipment cycles made available by the unique container assembly.

While the invention is described herein primarily with reference to a cylindrical drum container configuration with a 55-gallon capacity, the shape and size of the container can be readily changed. By way of example only, smaller drum configuration containers of from 20-30-gallon sizes, as well as larger drum configurations of, for example 210-310-gallon sizes, can readily be configured using the basic principles of this invention. Similarly, the geometric shape of the internal volume and outer shape of the container need not be cylindrical, but can readily comprise other geometric configurations. A simple manner of changing the external shape and internal geometric volume of the container is to alter the shape of the bottom footprint, top, and/or intermediate members. The bottom or base footprint shape is dictated primarily by the particular industry in which the container will be used, by the type of bulk material carried by the container, and by the standard industry sizes of the support pallets on which the containers are supported for storage and transport. Container base members could, for example, be of circular, rectangular, polygon, oval, or other geometric shapes. Similarly, the height dimensions of the containers can be readily adjustable, as well as the number of posts of the framework and their respective support specifications required to satisfy desired container stacking or load requirements. All of these considerations will be apparent to those skilled in the art when applying the principles of this invention.

The rigid compact parts of the container assembly of this invention are preferably formed using injection molding and heavy gauge twin sheet thermal forming methods which provide for highly durable and strong components that can be manufactured in high volumes, provide for flexibility in creating imaginative shapes and designs such as grid-like patterns that offer improved strength using less material, and allow the members to cooperatively engage, mate, lock, snap together, and protrude from one another in the manners in which they are intended and designed to provide the unique functional aspects of this invention. The invention contemplates not only the structural nature of the containers having configuration and interconnection features of this invention in both assembled and unassembled/collapsed forms, but the component parts of the container framework and assembly when sold in kit form, as well as methods of assembling and disassembling the container.

According to one aspect of the invention, there is provided a collapsible container assembly suitable for holding a charge of bulk material for storage and transport, comprising: (a) a rigid collapsible framework defining an internal geometrically shaped volume, comprising: (i) a base having a footprint perimeter defining a first closed geometric shape, and having a bottom with strength sufficient to support said charge of bulk material; (ii) an upper member defining a perimeter similar to that of the first geometric shape and having an open architecture defining an opening therethrough suitable for receiving the charge of bulk material; and (iii) a plurality of post members detachably connecting and peripherally extending between the base member and the upper member; (b) a continuously woven fabric sleeve sized and configured to fit within the internal geometrically shaped volume of the framework, wherein the sleeve has or is able to form a bottom and has an open upper end for receiving the charge of bulk material into the sleeve, and has strength and bulge resistant parameters suitable for containing the charge of bulk material of a quantity that would substantially fill the internal geometrically shaped volume: (c) one or more connectors cooperatively configured on the upper member and the sleeve, detachably connecting the sleeve to the upper member with the open upper end of the sleeve being in operative alignment with the opening in the upper member, and (d) a cover detachably cooperatively securable to the upper member to selectively close the opening through the upper member.

According to another aspect of the invention, the woven fabric sleeve could have an open bottom which, when folded back upon itself on the upper surface of the base bottom, closes the sleeve and forms a bag enclosure, or could have a closed bottom sewn into the sleeve bottom, or otherwise formed by sewing of the sidewall portions of the sleeve together. According to another aspect of the invention, the component parts of the container assembly are detachable from one another, and the upper member and base are sized and configured to mateably attach to one another to form a collapsed configuration having an internal cavity. The cavity is sized in cooperation with the post members and woven fabric sleeve such that the post members and sleeve can be placed within and retainably held within the internal cavity. The cover is securable to the upper member of the collapsed configuration in the same manner as it is attached to the upper member in the container's upright fully assembled manner, by a tightening band typically used for attaching covers to rigid shipping containers known in the art—forming a compact collapsed self-contained container module. According to a further aspect of the invention, the base and/or upper member can be configured to include retainers for positionally retaining post members in predetermined fixed positions within the internal cavity defined by the base and upper member when secured together in the container's collapsed configuration. The height of the container in its collapsed configuration is significantly less than that of the container assembly in its upright assembled configuration, and is preferably less than about 25 percent of its fully assembled upright configuration height. According to yet another aspect of the invention, the container assembly can include one or more intermediate support bands configured to cooperatively overlie and engage the upright post members at positions along their longitudinal lengths spaced from the base. The intermediate support bands are configured to provide bulge resistance counterforce support to the engaged posts and to the fabric support bag which resist outward bulging forces applied to the posts by bulk materials contained by the fabric support bag. According to one aspect of the invention, the intermediate support band(s) are preferably positioned along the post members at a position between about 20 to 40 percent of the distance along the length of the posts as measured from the base of the assembled container, where the bulge forces applied by the fabric support bag to the posts are likely to be the greatest. The intermediate band(s) is formed or formable to a closed loop configuration and held in such configuration by the support posts, and is collapsible and/or deformable to a size that can also be protectively placed within the internal cavity of the collapsed container module for storage or shipment in the module along with the other loose components of the container assembly. According to yet a further aspect of the invention, the post members of the container assembly are segmentable into multiple post member portions sized to fit within the collapsed modular internal cavity, and can be axially locked together to form elongated stiff support posts for interconnecting the upper member with the base of an upright container assembly. According to yet a further aspect of the invention, the plurality of support posts when assembled to the base and upper member can be selectively locked to the base and upper member, to form a rigid, but detachable framework for the container. According to a further aspect of the invention, an impervious liner bag can be inserted within the woven fabric sleeve of the container such that the bulk materials are charged directly into the liner bag, which isolates the woven fabric sleeve from direct contact with the bulk material. Such liner sleeves are configurable in combination with the container cover to seal the bulk material contents between the liner bag and the container cover.

According to yet a further aspect of the invention, there is provided a kit for assembling a collapsible container of a type suitable for holding a charge of bulk material for storage or transport, comprising—(a) a base having a footprint perimeter defining a first closed geometric shape, and configured to cooperatively receive end portions of a plurality of post members; (b) an upper member having a peripheral shape generally the same as that of the base footprint perimeter and having an open architecture defining an opening therethrough for receiving a charge of bulk material, the upper member being configured to cooperatively receive end portions of a plurality of post members; (c) a plurality of post members have oppositely disposed end portions and sized and configured to detachably operatively connect the base and the upper member to form a rigid collapsible framework defining an internal geometrically shaped volume; (d) a continuously woven fabric sleeve sized and configured to fit within the internal geometrically shaped volume and having an open upper end for receiving the charge of bulk material therethrough, wherein the sleeve has strength and bulge resistant parameters suitable for containing the charge of bulk material that is of a quantity that would substantially fill the internal geometrically shaped volume; (e) connectors having portions operatively arranged on the upper member and adjacent the open upper end of the sleeve, for attaching the upper end of the sleeve to the upper member; and (f) a cover sized and configured for detachable connection to the upper member, to close the opening through the upper member.

According to a further aspect of the invention, the kit may include an intermediate closable band member sized and configured to cooperatively engage the plurality of post members when operatively connected with the base and upper member, wherein the intermediate band member has a strength for providing anti-bulging inward resistive forces to the post and fabric bag members. According to yet a further aspect of the invention, the base and upper member portions of the kit may include locking features arranged and configured to selectively lock the base and upper member to the end portions of the post members. According to yet a further aspect of the invention, the kit may also include a tightening band for securing the cover to the upper member and an impervious liner bag configured to fit within the woven fabric sleeve to protect the sleeve from direct contact with the bulk material. According to yet a further aspect of the invention, the kit components are sized and configured to be assembled in a collapsed modular form defining a protective outer shell formed by the base, upper member, and cover, which protectively retainably encloses the remaining loose components of the container assembly.

According to yet a further aspect of the invention, there is provided a method of assembling a collapsible container for storage or transport of bulk materials, comprising the steps of: (a) providing component parts of a collapsible container comprising: a base, a cover, an upper member of open architecture having an opening extending therethrough and a plurality of first connector members along its inner periphery, a plurality of post members, a woven fabric bag having a plurality of second connector members adjacent an open end thereof, and an intermediate band member; (b) operatively engaging the post members with the base around the outer periphery of the base such that the post members extend generally vertically upward from the base; (c) engaging the intermediate band member to the post members at a longitudinal position along the post members that is spaced from the base, to form a continuous closed configuration of the band around the post members; (d) operatively engaging the upper member with the top distal portions of the post members such that the upper member overlies the base; (e)

rotating the post members to positionally lock the posts to the base and the upper member, forming a rigid framework of the posts, base, upper member, and intermediate band that defines an internal geometrically shaped volume, (f) positioning the woven fabric bag within the internal geometrically shaped volume of the rigid framework with the open end of the bag adjacent the opening of the upper member; (g) securing the woven fabric bag to the upper member with the first and second connector members; and (h) operatively engaging the cover to the upper member.

According to yet a further aspect of the invention, there is provided a method of forming a collapsed module of an assembled container for bulk materials of the type having an upper member, a cover connectable to the upper member, a base, a plurality of post members detachably connecting the base to the upper member, and a woven fabric bag attachable to the upper member, comprising the steps of: (a) removing the cover from the upper member, (b) detaching and removing the woven fabric bag from the upper member; (c) unlocking the post members from the upper member and the base, (d) removing the upper member from the post members: (e) removing the post members from the base; (f) positioning the post members and woven fabric bag within the internal storage cavity of the base: (g) cooperatively securing the upper member to the base, and (h) securing the cover to the upper member to form a collapsed self-contained module of the container suitable for storage or transport.

According to yet a further aspect of the invention, the method of forming a collapsed module of an assembled container for bulk materials may include removal of an intermediate band from the post members, if such intermediate band is incorporated within the assembled container, and positioning the intermediate band within the internal cavity along with the post members and fabric bag.

The container assembly of this invention can be used with any type of bulk materials, including for example, solids, semi-solids, granular materials, powders, slurries, and liquids, or combinations thereof.

These and other features of the invention will become apparent upon a more detailed description of preferred embodiments of the invention, as described below.

BRIEF DESCRIPTION OF THE DRAWING

When referring to the Drawing Figures, where a Figure number may have multiple letter views and designations associated therewith (i.e., FIG. 1A, FIG. 1B), the associated Figure views may be collectively referred to simply by the numerical designation (i.e., FIG. 1). Referring to the Drawing wherein like numerals represent like parts throughout the several views:

FIG. 15A is a top perspective diagrammatic view of the tightening band portion of the container assembly of FIG. 1;

DETAILED DESCRIPTION OF THE PREFERRED EMBODIMENT

Figure 1A:
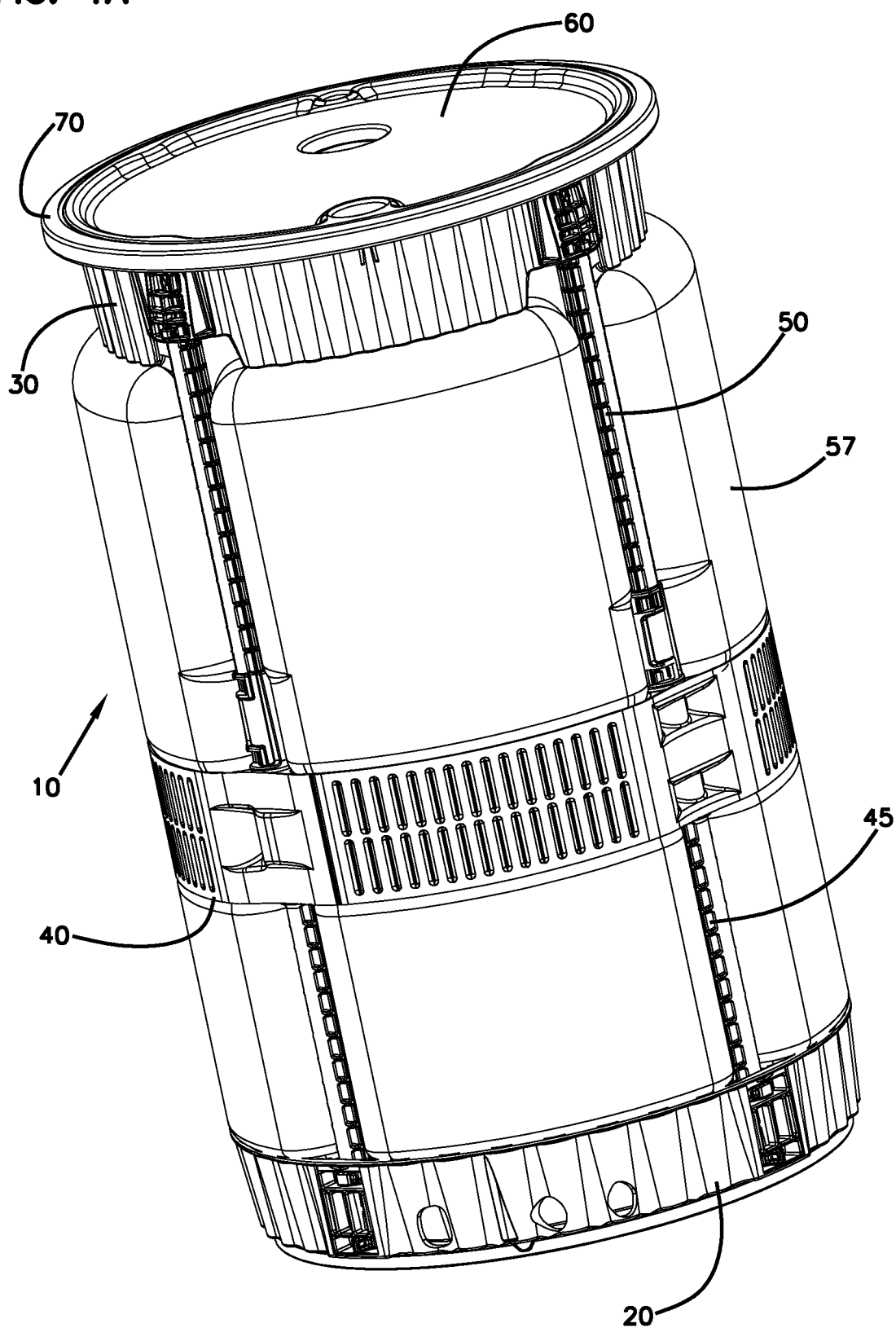
FIG. 1A is a top front perspective view of a preferred embodiment container assembly constructed according to the principles of this invention, shown in assembled form.
Figure 1B:
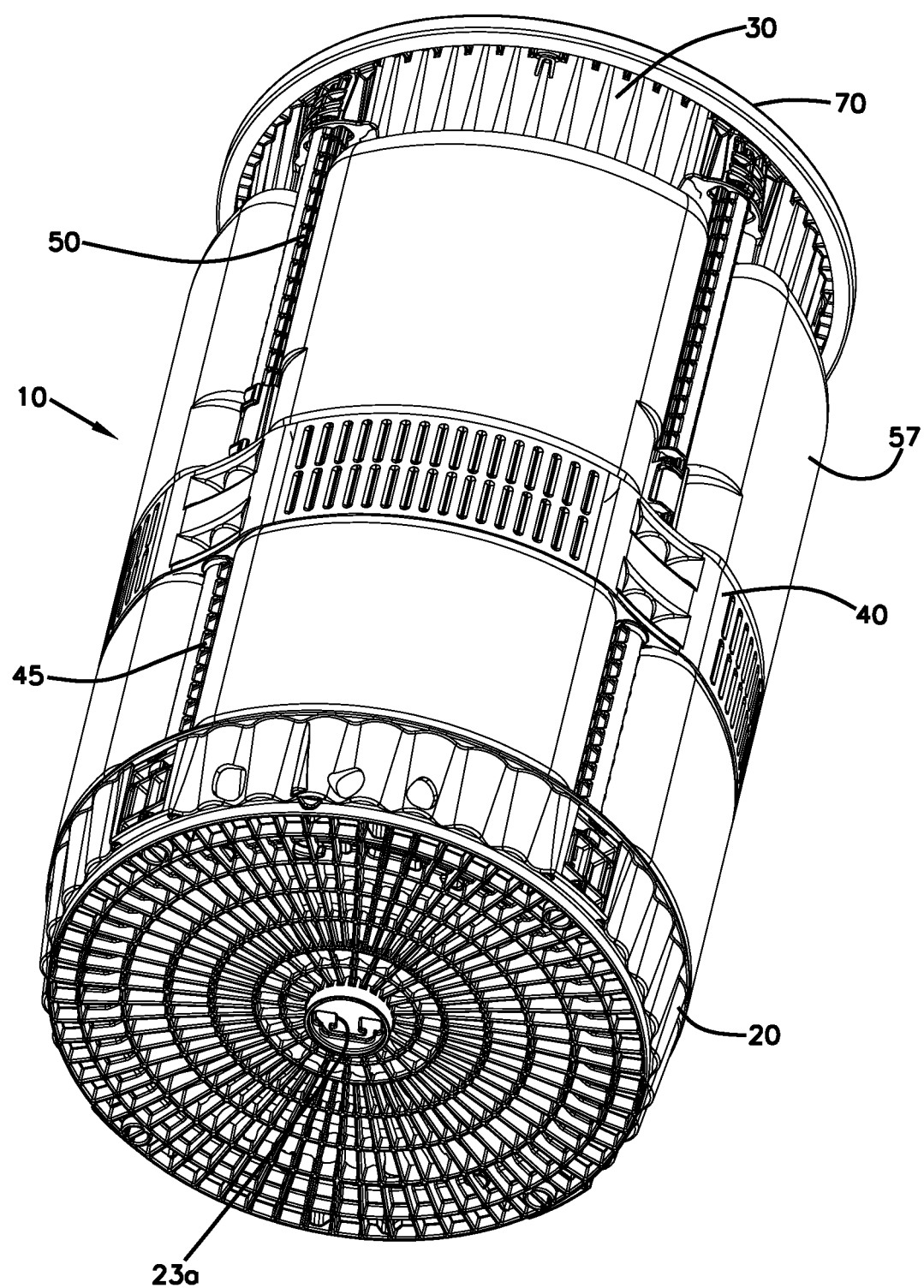
FIG. 1B is a bottom back perspective view of the container assembly of FIG. 1.
Figure 2:
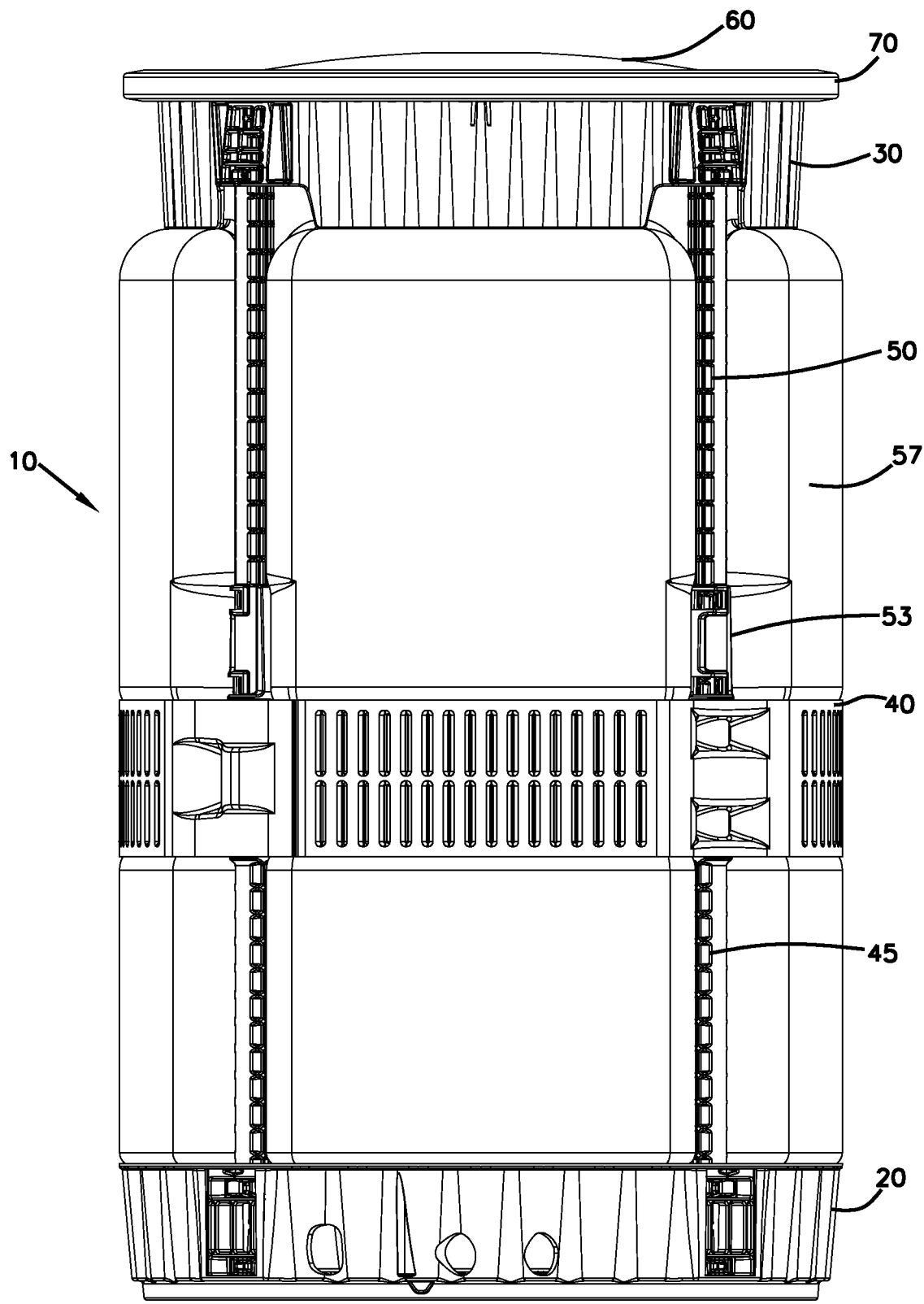
FIG. 2 is a front plan view of the container assembly of FIG. 1.
Figure 3:
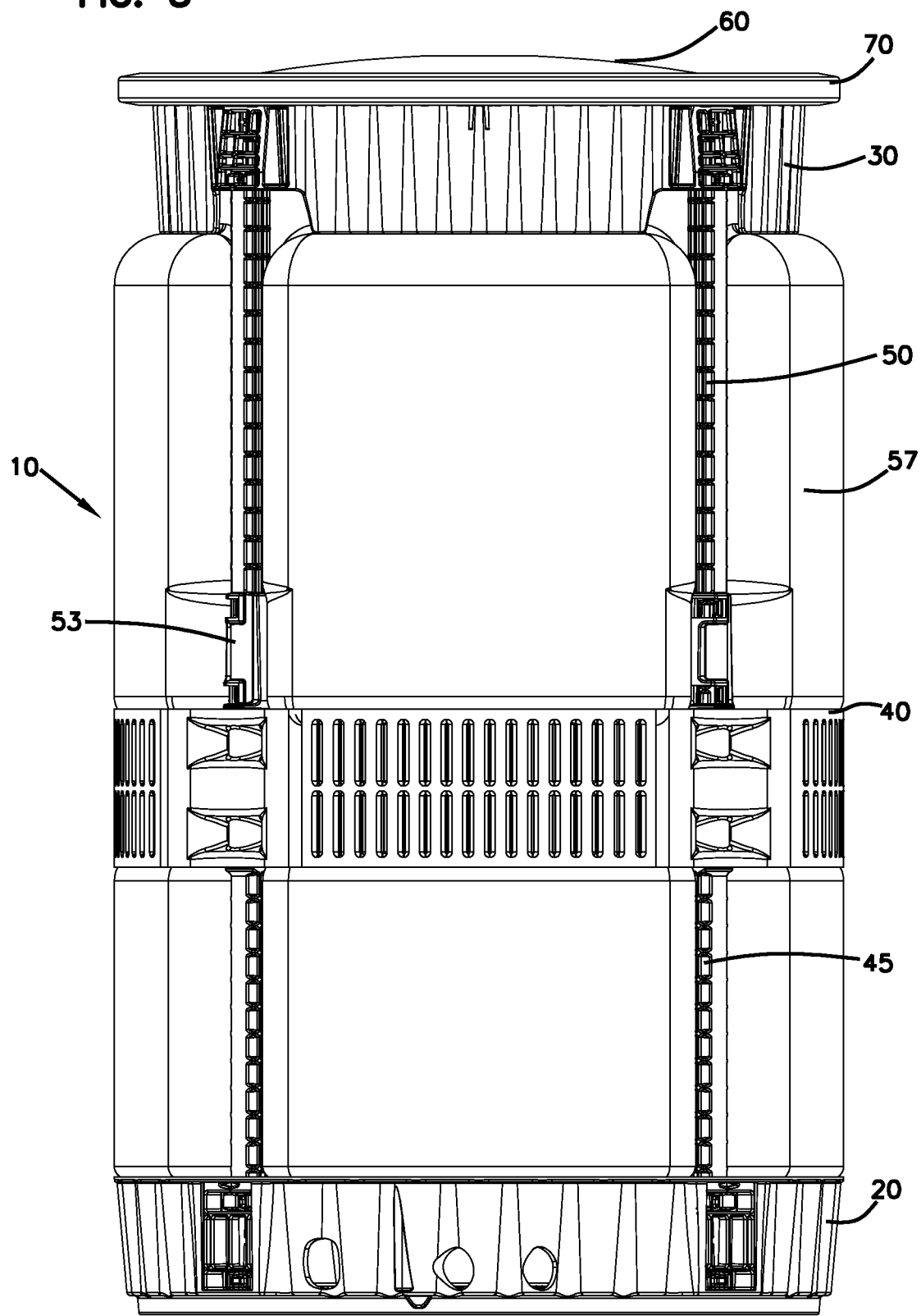
FIG. 3 is a back plan view of the container assembly of FIG. 1.
Figure 4:
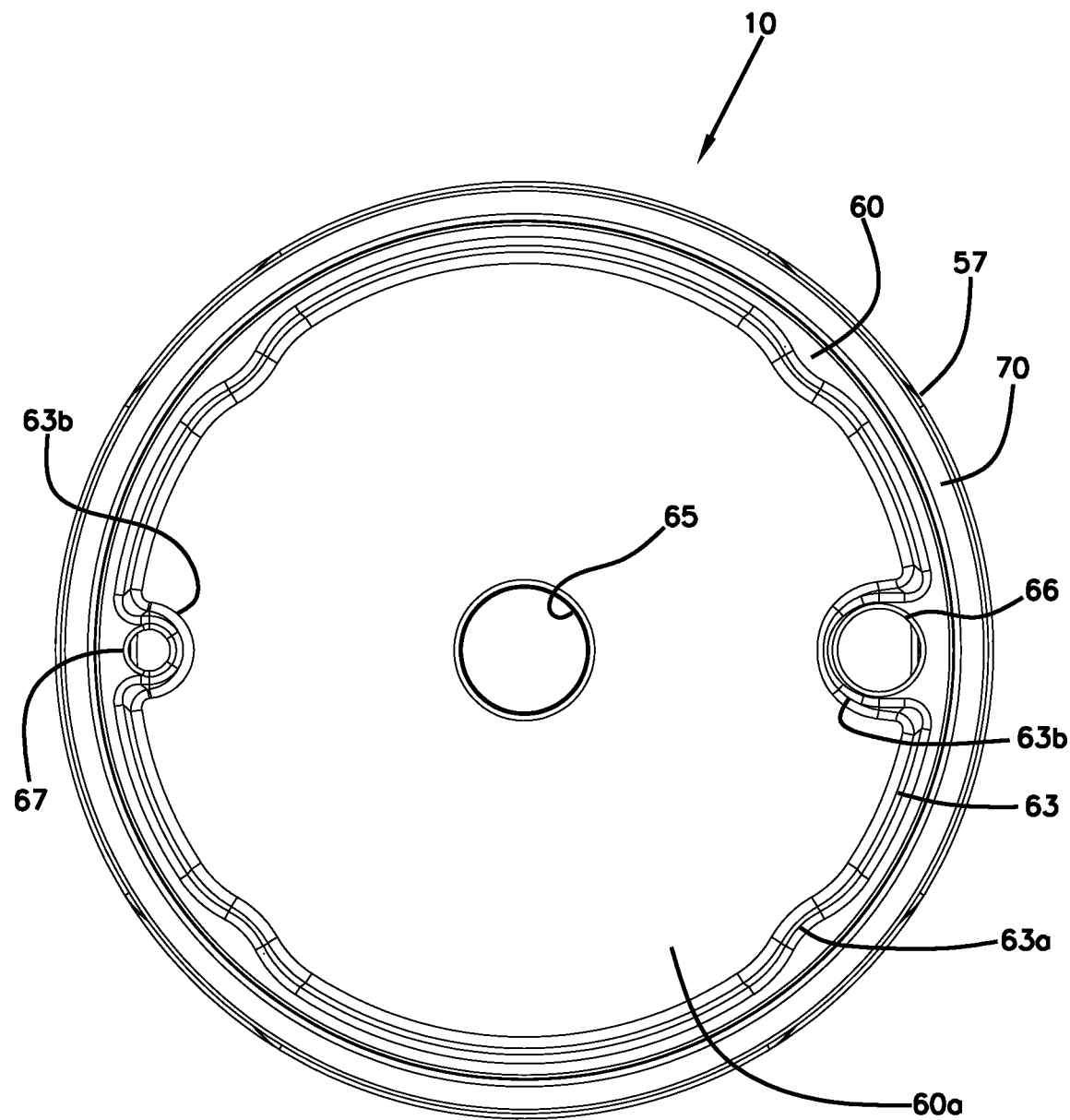
FIG. 4 is a top plan view of the container assembly of FIG. 1.

This invention provides a highly reliable container assembly for bulk materials that is rapidly configurable between an operable upright assembled configuration and a compact collapsed modular configuration. In its collapsed configuration the container reduces in size to a compact module that is ideal for shipping, storage, and handling and also minimizes damage to and loss of loose component parts of the container. In its assembled configuration, the container assembly provides a container for bulk materials widely ranging from solids, to powder, to semi-solids, to granular materials, to slurries, and to liquids. The assembled container provides superior bulge resistance and stacking strength and imperviousness to moisture and is particularly suitable for reuse. The container assembly is very cost effective to use, store, and reuse due to its superior strength and collapsibility features and is particularly attractive for handling, storage, and shipment in its collapsed configuration.

The container assembly generally includes an external framework of support members, a woven fiber bag cooperatively insertable and held within the framework to retainably hold a volume of bulk material, and a cover cooperatively mounted to the framework to close the top of the bag container and to selectively prevent or enable removal of the bulk material from the container. The framework generally includes a bottom base member connectible to an upper ring member by a plurality of intermediate post members and, if necessary, for structural support, one or more intermediate band members. The cover operatively connects to the upper ring member, or could be integrally formed therewith. Since a popular sized shipping container used in multiple industries is a 55-gallon drum, the invention will be described below with reference to a preferred embodiment container assembly sized and shaped to replace and replicate a 55-gallon drum type container.

Referring to the Drawings, a preferred embodiment drum type container assembly of this invention illustrated in assembled form is illustrated at 10 in FIGS. 1-5. The container assembly 10 has an external framework 12 of support members generally including a base member 20, an upper ring member 30, an intermediate band member 40, a plurality of lower post members 45, and a plurality of upper post members 50. The external framework members are cooperatively detachably interlocked and connected together as described in more detail below, to form a generally rigid framework.

A woven fiber support bag 57 is cooperatively attached to and hung from the upper ring 30 and has a bottom that rests upon and is also attachable to the base 20. An optional poly bag (not shown in FIGS. 1-5) may be inserted within the woven fiber support bag 57 to isolate contained bulk material from direct contact with the outer support bag 57. A top cover 60 is detachably secured to the upper ring 30 by means of a tightening band 70, to close external access into the support bag 57 through its upper opening, thereby providing sealing closure to the container assembly.

Figure 5:
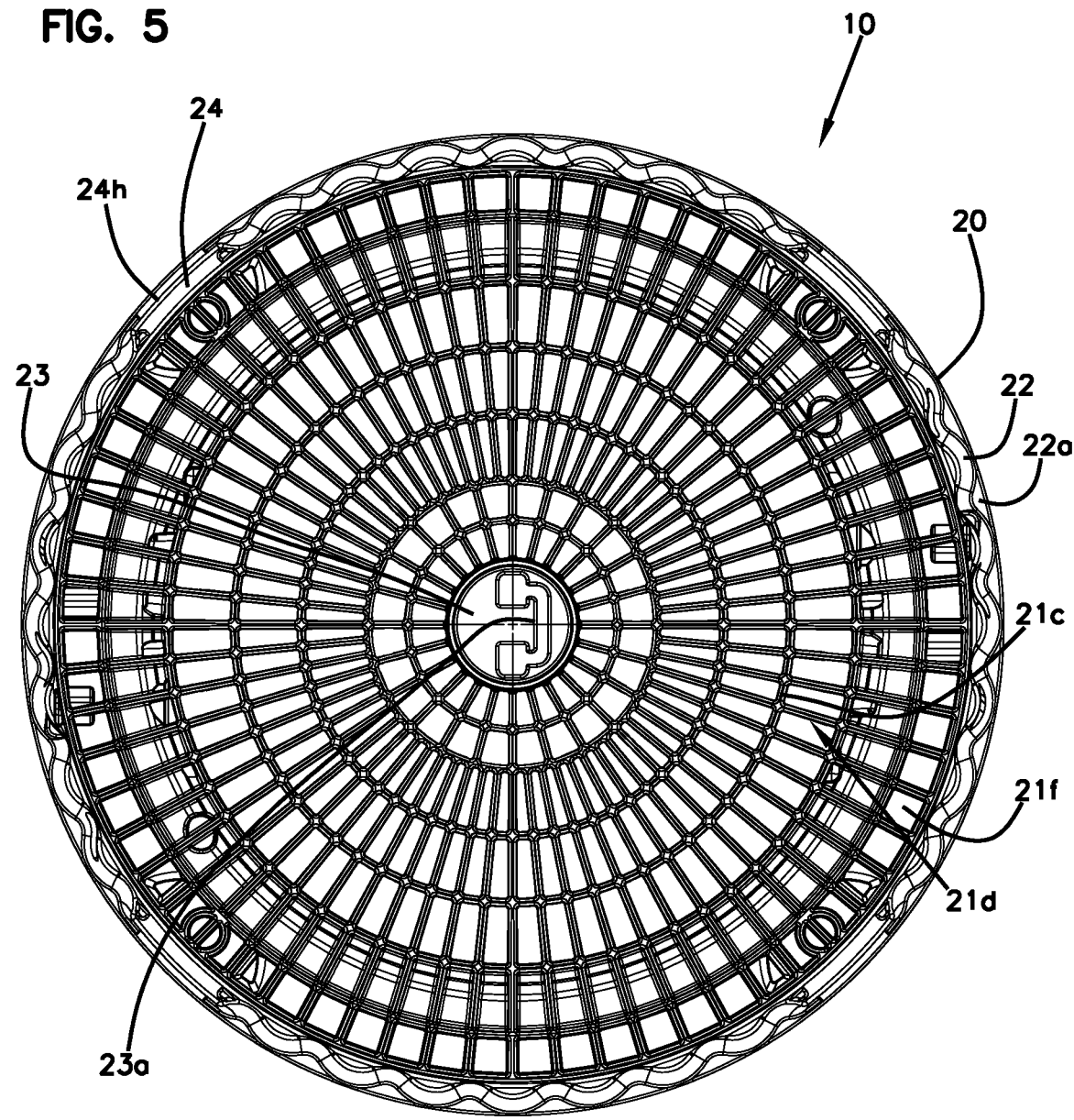
FIG. 5 is a bottom plan view of the container assembly of FIG. 1.
Figure 6:
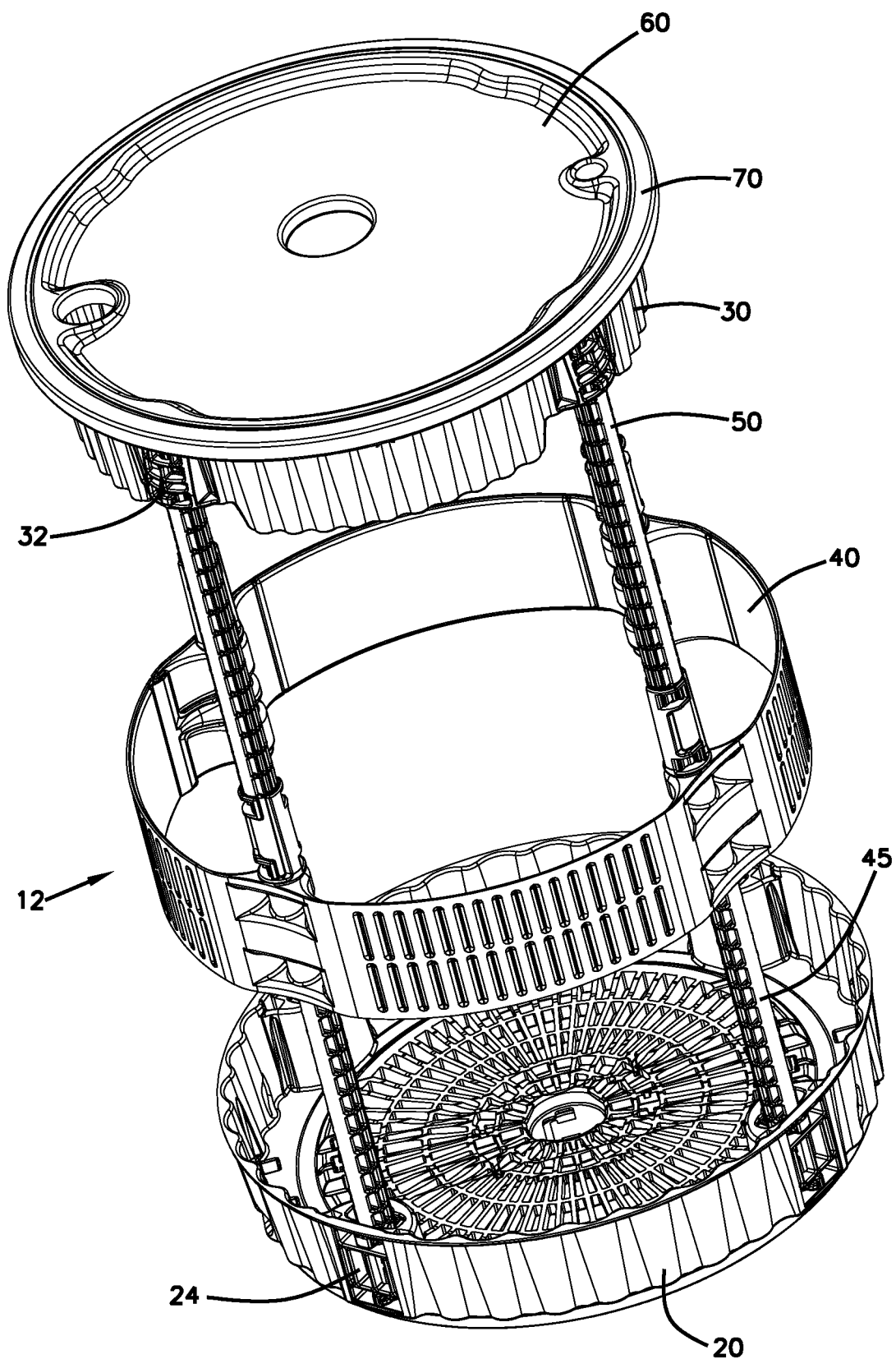
FIG. 6 is a top back perspective view of the assembled framework portion of the container assembly of FIG. 1, shown without the woven fabric bag and including the top cover and tightening band portions thereof.

FIG. 6 is a top back perspective view of the assembled framework portion 12 of the container assembly of FIGS. 1-5, shown without the fabric bag 57 and including the top cover 60 and tightening band 70. A more detailed description of the container assembly 10 follows.

Referring to FIGS. 1B, 5, 6, 8, and 24, the base member 20 has broad oppositely disposed upper and lower surfaces 21 a and 21 b, respectively. A bottom portion 21 of the base 20 is formed from a grid-like molded pattern of a plurality of concentric ringed portions, generally designated at 21 c, and a plurality of radially interconnecting rib portions, generally designated at 21 d. An outer peripheral ring or wall portion 22 extends upwardly from the bottom 21. The upwardly extending wall portions of the outer ring 22 are formed in undulating corrugated manner around the periphery of the outer ring. Except as described in more detail hereinafter, the grid-like concentric rings 21 c and interconnecting ribs 21 d form a generally planar region across most of the grid pattern forming the upper surface 21 a of the bottom 21. The upper surfaces of the outermost ribs 21 d are upwardly inclined in the radial outward direction at an acute angle with respect to the general plane of the upper surfaces of the inner ribs, and flatten out along their outer distal portions and are co-planar with an upper surface of the outermost concentric ring 21 c. The outer edge of the outermost concentric ring 21 c slopes back down to the general plane of the inner ribs and flattens out to an outer generally planar outer land portion 21 f The general plane of the land portion 21 f is the same as that of the inner grid-like portion and forms a seat for the upper ring 30 when the two pieces are joined in their collapsed modular mode (hereinafter discussed in more detail). The innermost ones of the radial ribs 21 d and the innermost concentric ring 21 c terminate at an outer wall of a downwardly depending cylindrical portion 23. The upper peripheral edge of the outer ring portion 22 defines a circular and planar flange surface 22 a. This is shown, for example, in the FIG. 8A view of the base 20 The outermost concentric ring 21 c of the lower grid portion of the base 20 is connected by means of an intermediate ring member 21 e and the outer land portion 21 f to the upright outer ring portion 22 of the base 20.

Figure 8A:
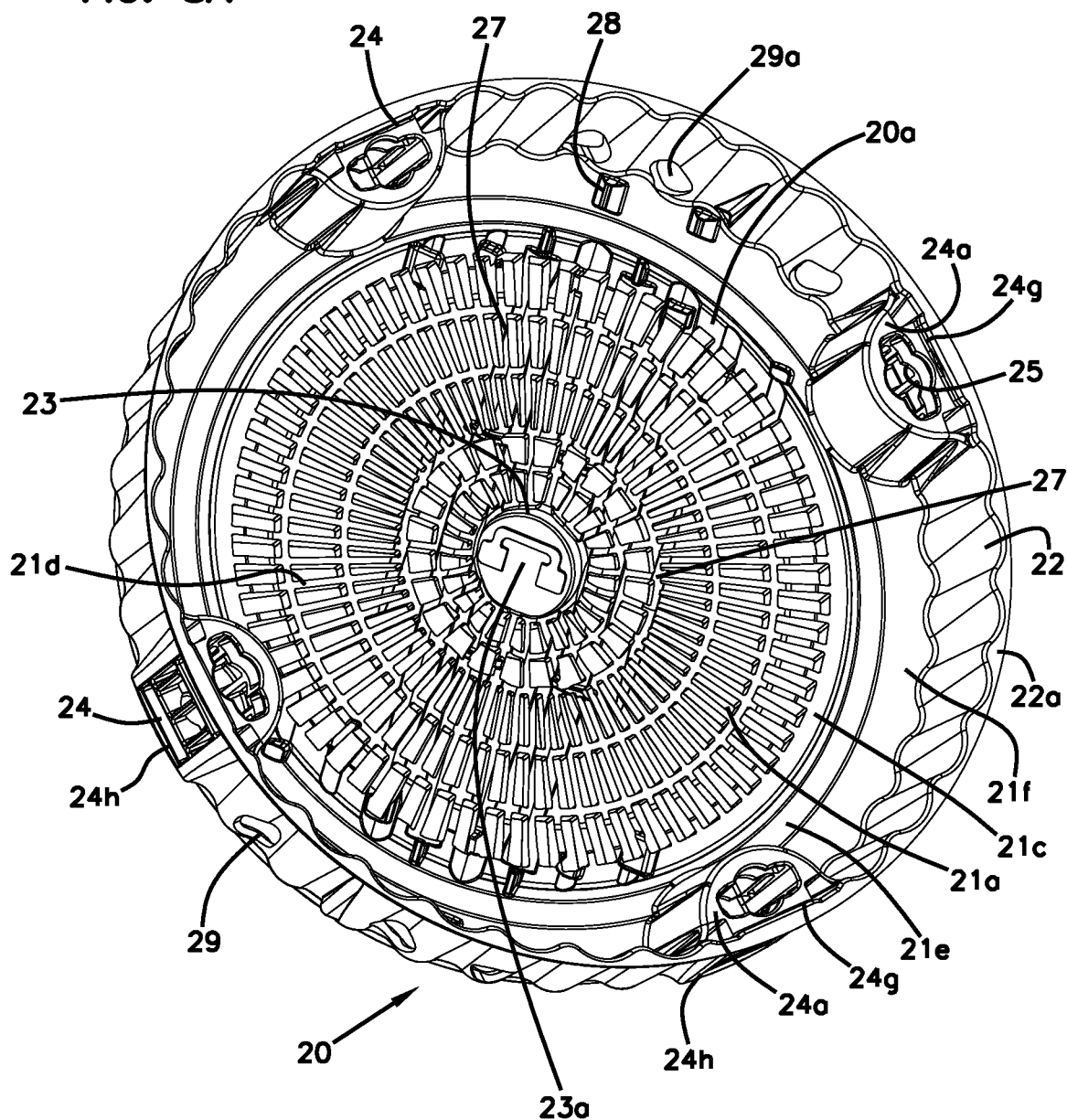
FIG. 8A is a top front perspective view of the base portion of the container assembly of FIG. 1.
Figure 8B:
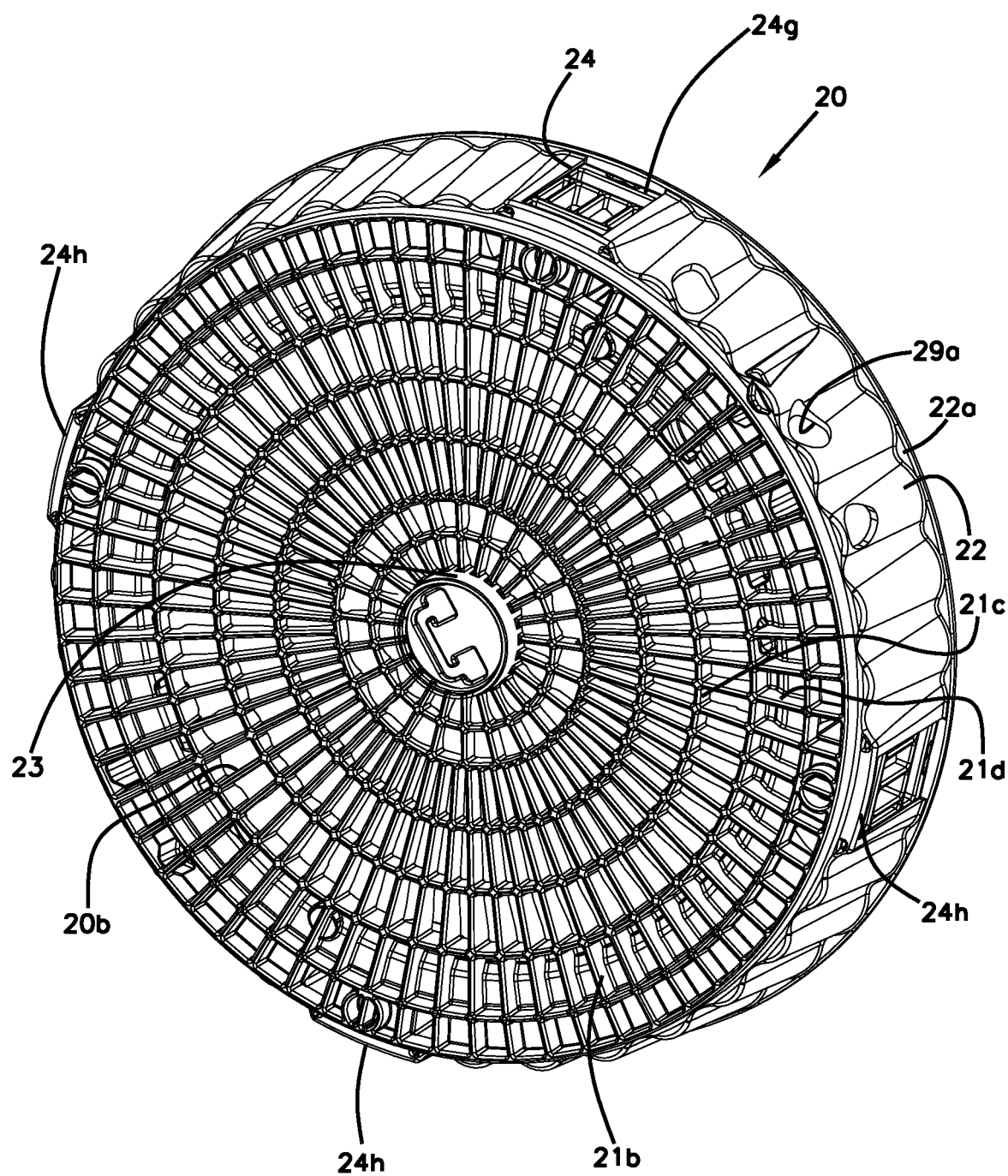
FIG. 8B is a bottom front perspective view of the base portion of the container assembly of FIG. 1.
Figure 24:
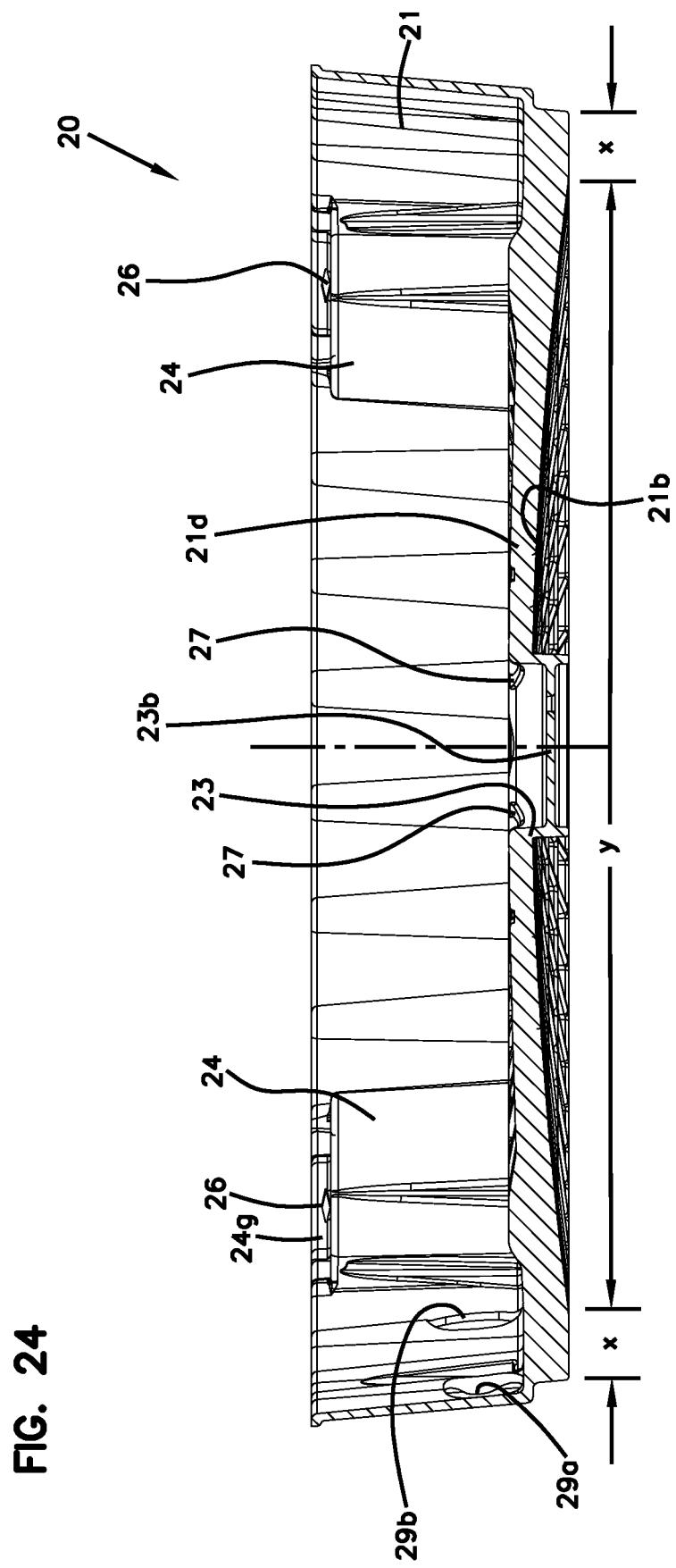
FIG. 24 is a cross-sectional view of the base member of FIG. 22, taken generally along the Line B-B of FIG. 22.

Referring to FIGS. 5, 8B, and 24, the upwardly extending portion of the corrugated outer wall 22 does not extend all of the way down to the lower surface 21 b of the bottom portion 21 of the base 20. The lower surface 21 b of the bottom 21 begins at a position radially indented from the outer peripheral surface corrugations of the outer ring 22 (see the cross-sectional view of FIG. 24). The lower surface 21 b of the bottom 21 has a generally ring shaped outer planar region (identified at "x" in FIG. 24) portion extending radially inward for a short distance from its outer periphery.

The central portion of the bottom surface 21 b (identified at "y" in FIG. 24) is molded with a concave curved surface across the grated pattern defined by the ribs 21 d and concentric rings 21 c toward a central axis of the base 20, with the central axis defining the apex of the concave arch configuration. The innermost radial ribs 21 d of the concave lower surface 21 b terminate at the outer wall of the downwardly extending cylindrical portion 23 whose lower distal edge lies co-planar with the planar outer portion "x" of the lower surface 21 b. A hook member 23 a is molded within and extends laterally across the central portion of the downwardly extending cylinder 23 for attachment to a lower loop strap member extending from the bottom of the woven fabric support bag 57, as hereinafter described in more detail. The hook member is recessed upwardly from the lower distal edge of the cylindrical portion 23, providing a space from the open end of the cylindrical protrusion 23 in order to keep the bottom strap portion of the woven fabric support bag 57 clean and spaced from the floor or pallet deck surface upon which the base 20 rests. The concave molded lower surface configuration extending over the "y" portion of the bottom surface 21 b of the base 20 and the cylindrical downward protrusion 23 are designed to cooperatively mate with a convex molded outer surface of the top cover 60 and a corresponding cylindrical indentation molded into the center of its convex outer surface that is dimensioned to cooperatively slidably receive the molded protrusion 23 extending from the center of the base bottom concave surface.

Figure 17A:
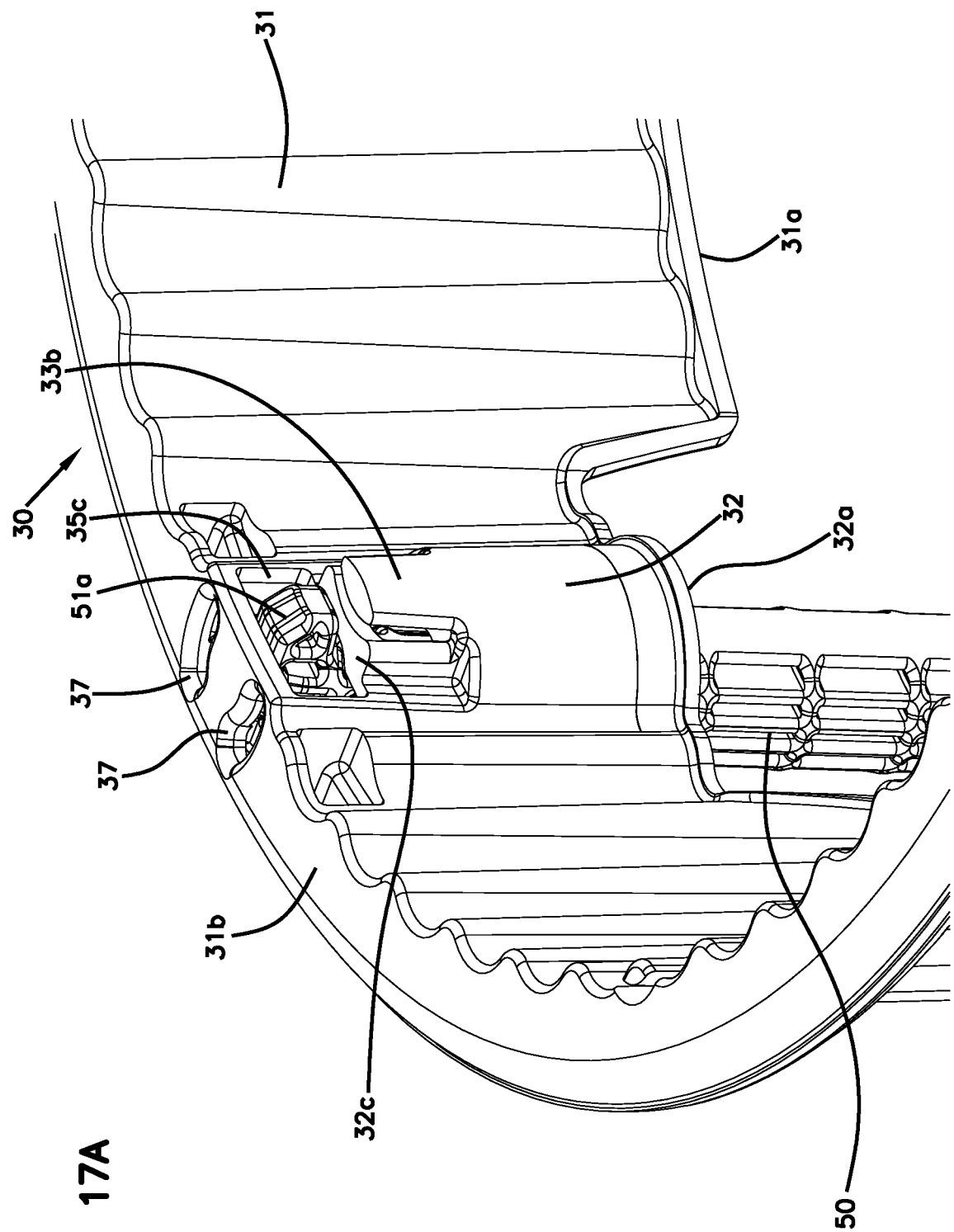
FIG. 17A is an enlarged perspective view of an upper post connection portion of the upper ring, viewed from the inside of the ring, showing an upper post tab member in locked position within the ring.
Figure 17B:
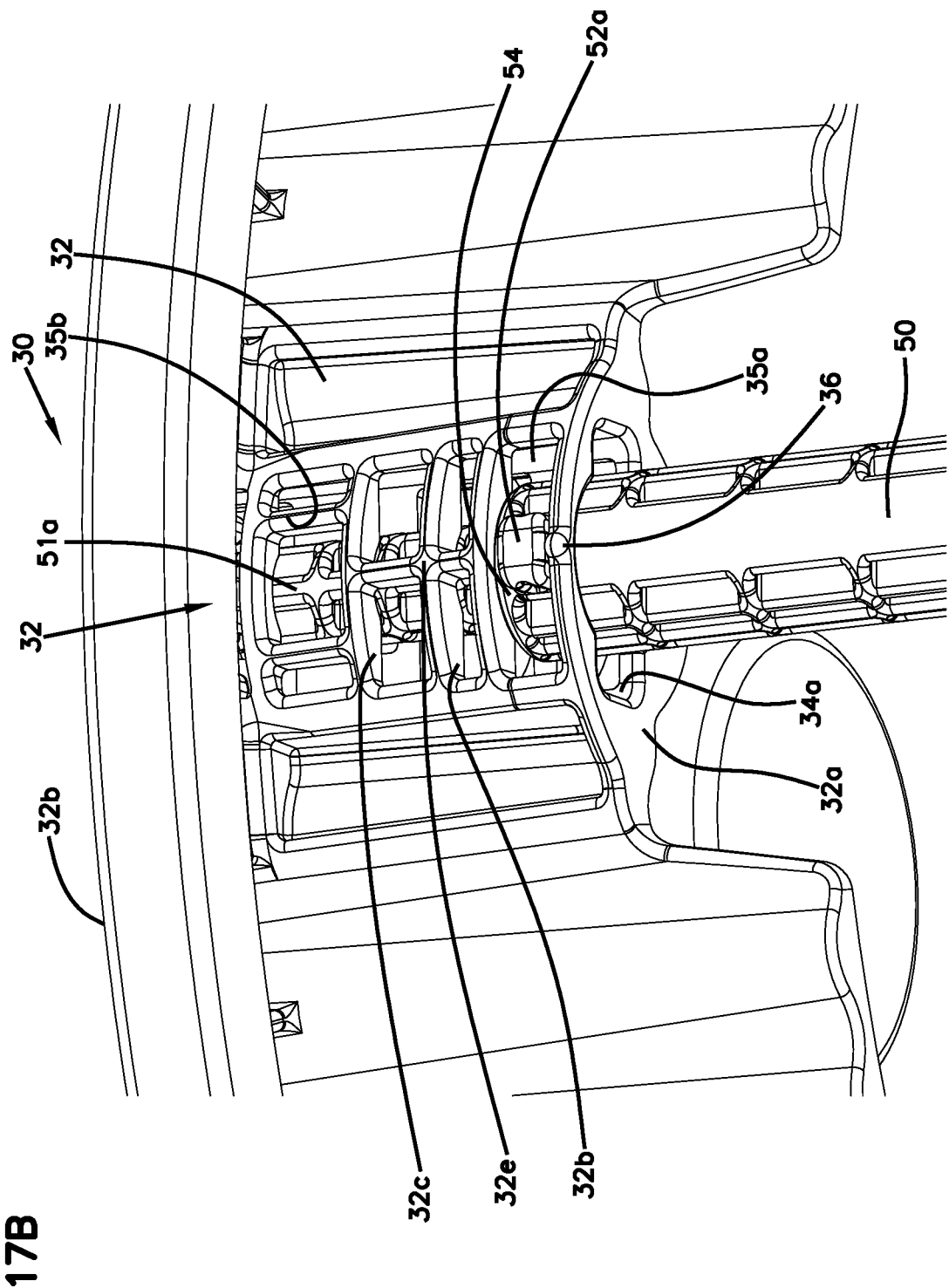
FIG. 17B is an enlarged perspective view of an upper post connection portion of the upper ring, viewed from the outside of the ring, showing the upper post tab members in locked position within the ring.
Figure 17C:
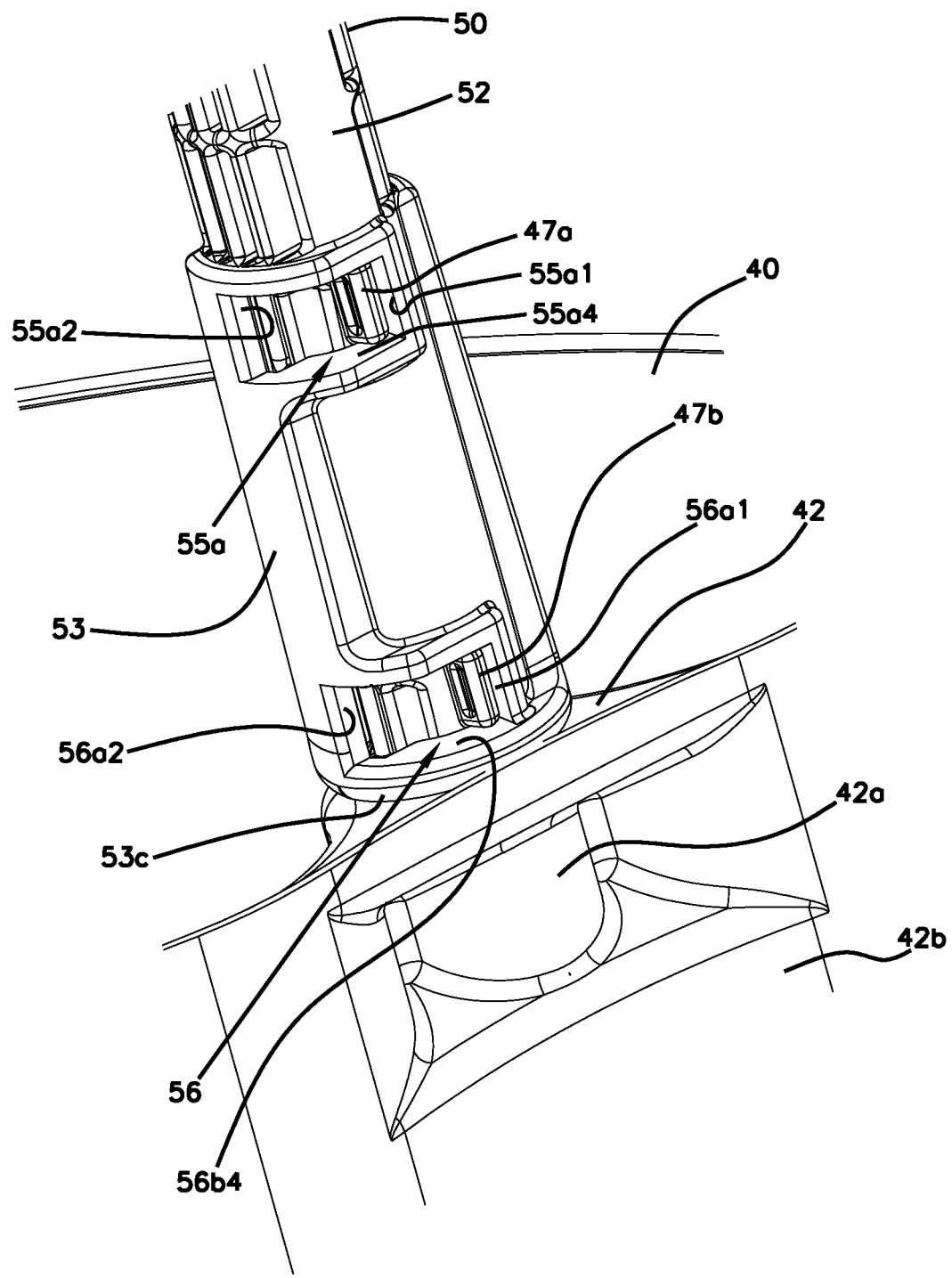
FIG. 17C is an enlarged perspective view of a portion of the intermediate band showing interconnection of the upper and lower posts relative to the intermediate band.
Figure 17D:
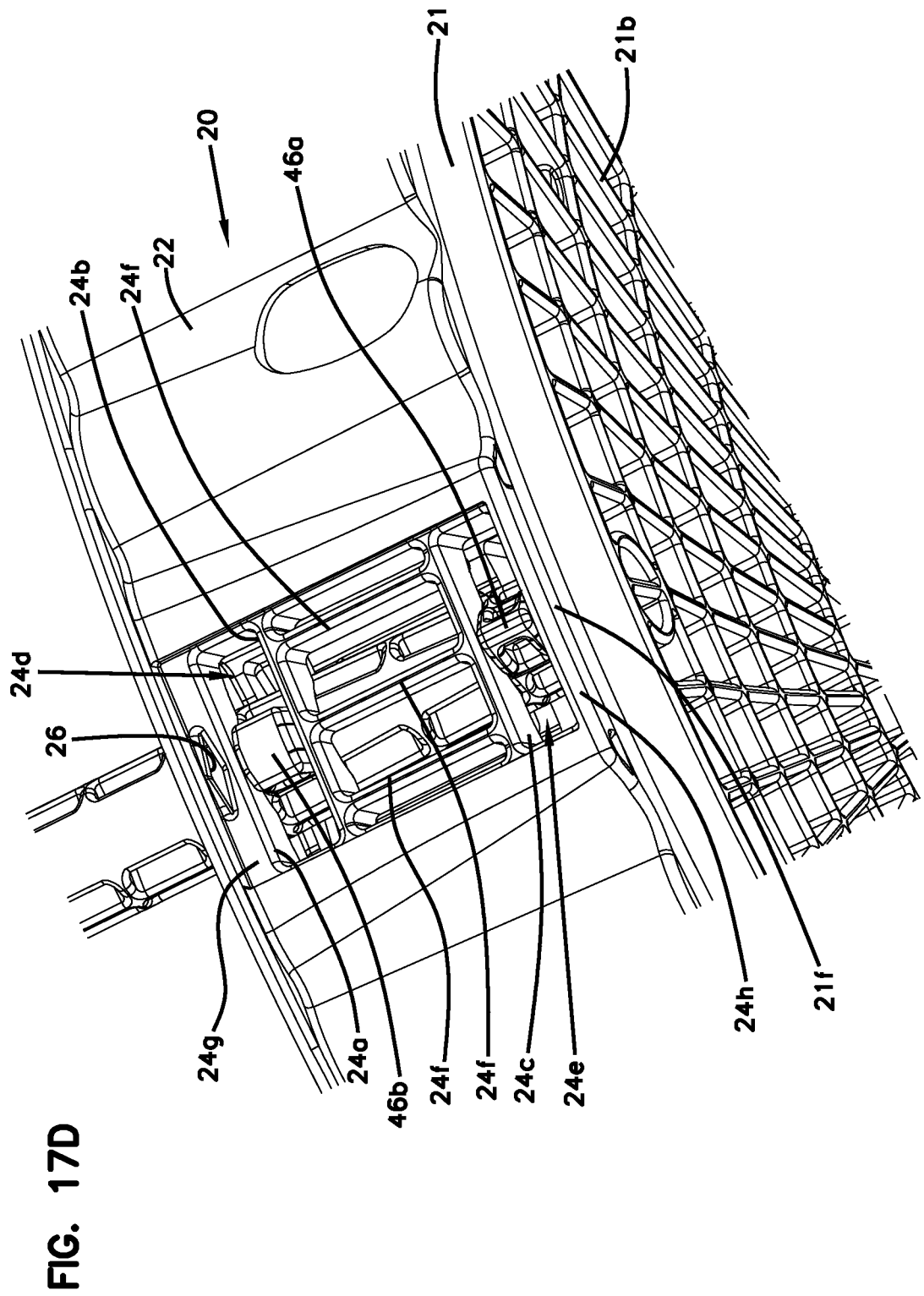
FIG. 17D is an enlarged perspective view of a portion of the base member, showing a lower post in locked position within the base member.

Referring to FIGS. 6, 8A, 17D. 18, and 19B, the base 20 includes four lower post receptors 24 rising upwardly from the outer land portion 21 f of the upper surface 21 a of the base bottom 21 at equally spaced positions around the inner perimeter of the outer upright wall member 22. In the embodiment shown, the inwardly facing walls of the lower post receptors 24 are generally semi-circular in shape and terminate at an upper surface 24 a. The four lower post receptors are, in the preferred embodiment, all of like construction. The upper surface 24 a of each lower post receptor 24 defines a keyed opening 25 a therethrough having a circular shaped central portion with a pair of radially opposed extended side slot areas sized, shaped and configured to receive the lower portion of a lower post member, hereinafter described in more detail. The outer walls of the lower post receptors 24 and the corresponding portion of the outer ring wall 21 f define a hollow inner cavity, except for intermediate seat plates, described below. A first intermediate seat plate 24 b is spaced downwardly from and parallel to the upper plate surface 24 a by a distance suitable for receiving a locking key portion of a lower support post member 45, and is peripherally connected to the inner walls of the lower post receptor 24 and the intermediate portion of the inner wall of the outer ring portion 22. The first intermediate seat plate 24 b defines a keyed opening 25 b therethrough that is identical to the keyed opening 25 a, and in vertical alignment therewith. A second intermediate seat plate 24 c is spaced downwardly from and parallel to the first intermediate seat plate 24 b by a distance suitable for receiving a second key portion of a lower support post member 45, and is peripherally connected to the inner walls of the lower post receptor 24 and the intermediate portion of the inner wall of the outer ring portion 22. The second intermediate seat plate 24 c defines a keyed opening 25 c therethrough that is identical to the keyed openings 25 a and 25 b and in vertical alignment with such keyed openings. The upper surface of the outer ring portion 21 f of the base bottom 21 that lies in axial alignment with and below the circular portions of the keyed openings 25 a, 25 b and 25 c has a concave indentation 25 d for slidably cooperatively receiving the bottom surface of a lower support post 45. Those portions of the outer wall 22 of the base 20 located between the upper plate 24 a and the first intermediate plate 24 b, and between the second intermediate plate 24 c and the upper surface of the outer ring portion 21 f of the base bottom 21, form openings through the outer wall 22, generally shown at 24 d and 24 e, respectively. In the preferred embodiment, the lower post receptors 24 also include a plurality of intermediate vertical support walls generally shown at 24f disposed along the outer periphery of the lower post receptors, and between the first and second intermediate seat plates 24 b and 24 c, for providing structural support to the intermediate seat plates along their outer peripheries.

An outer peripheral wall extension 24 g (FIG. 17D) of the upper seat plate 24 a of the lower post receptor 24 that projects vertically upward from the upper seat plate 24 a and is integrally molded at its lateral and upper ends to the outer ring wall 22 defines a diamond-shaped opening 26 formed therethrough for receiving a locking key member of the upper ring member 30, as described in more detail hereinafter, when the container assembly is modularly packaged in its collapsed configuration. As viewed in top plan (FIG. 22), the inner surface of the wall extension 24 g radially extends slightly inward from the inner wall surface of the upper seat surface portion 22 a of the outer ring wall 22.

The grid-like or grated/ribbed molding construction of the circular base 20 and the corrugated ribbing of the base upper wall member 30 provide enhanced structural stiffness and rigidity to the base, which enhances stacking strength of the base while reducing the weight and material cost of the base. The molded concave configuration of the lower surface of the grid-like bottom 21 of the base 20 enables precise mating engagement between the top cover 60 and the lower base surface 21 b and provides ease of stacking and stability of the container assemblies in both assembled and collapsed configurations for shipping or storage in either assembled or collapsed modular form.

While the number, configuration, strength, shape, materials of construction and length of the post members connecting the base and upper ring/cover portions of the container assembly can vary, in the preferred 55-gallon capacity cylindrical drum configuration illustrated in the Drawings, the interconnecting post members comprise lower and upper posts 45 and 50, respectively. The preferred embodiment uses four each of the lower and upper posts which are sized and configured to be compactly protectively packaged within and between the base 20, the upper ring 30, and the cover 60 when the container is configured in its collapsed module arrangement (hereinafter described in more detail).

Figure 9A:
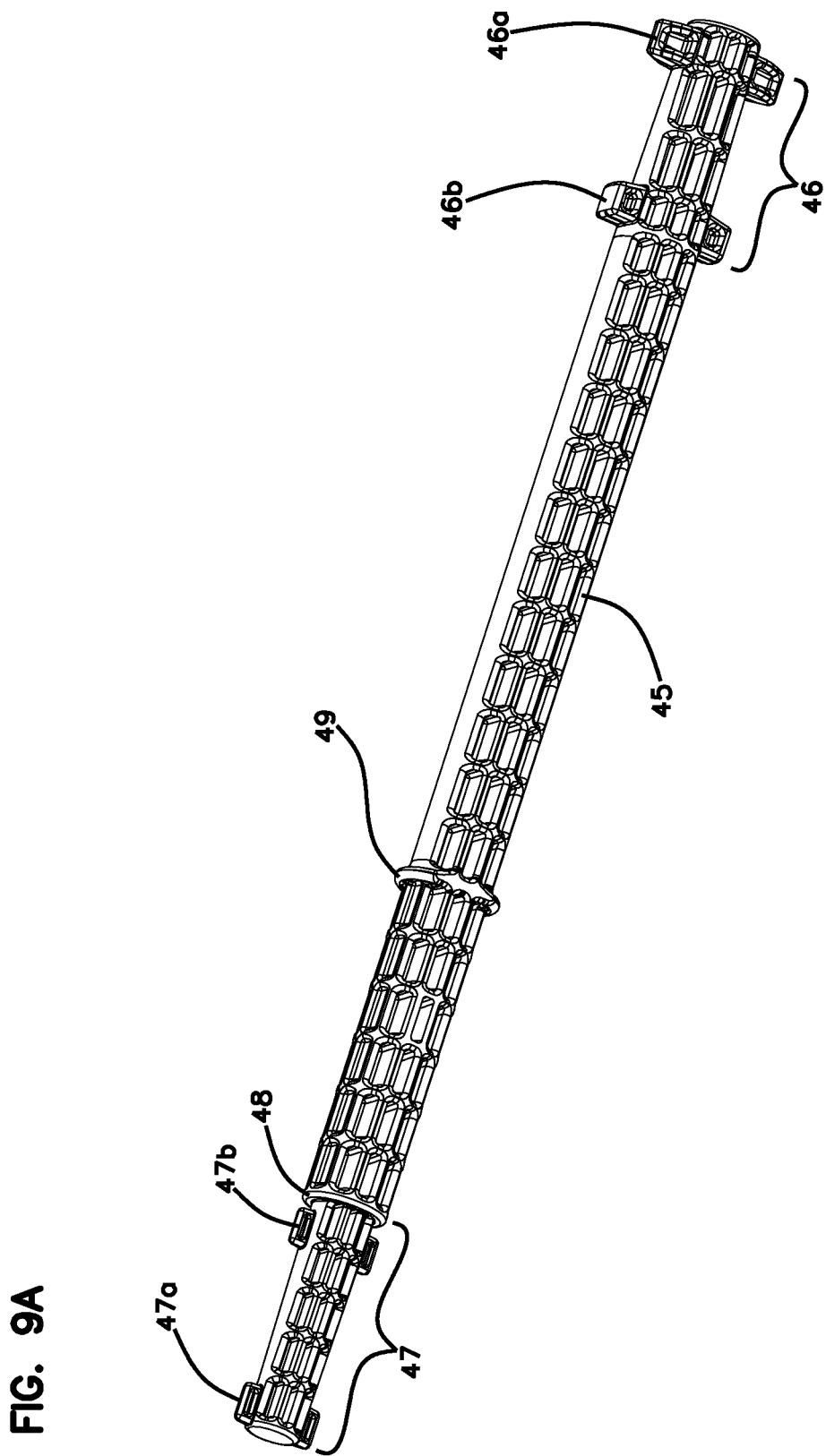
FIG. 9A is an upper, side perspective view of a lower support post of the container assembly of FIG. 1.
Figure 9B:
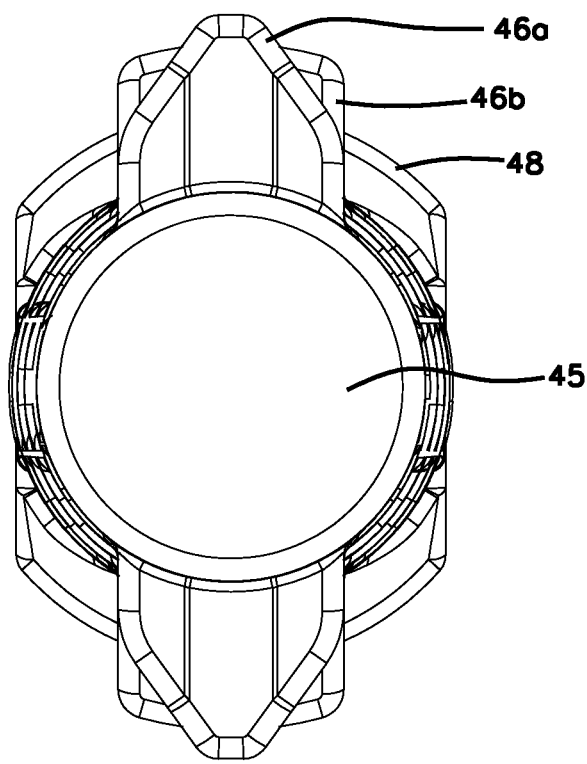
FIG. 9B is a bottom plan view of the lower support post of FIG. 9A.
Figure 9C:
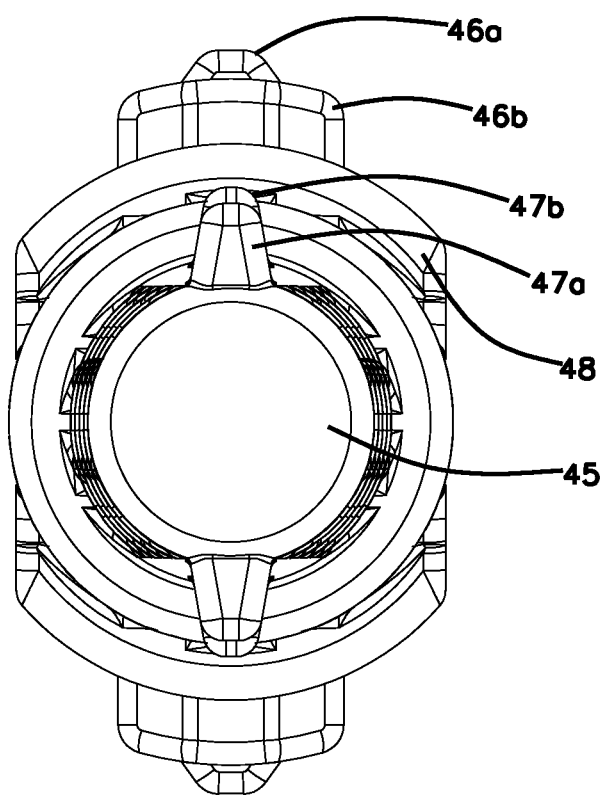
FIG. 9C is a top plan view of the lower support post of FIG. 9A.

A lower post 45 configuration of the 55-gallon drum container assembly is shown in FIG. 9. Both the lower and upper post members, 45 and 50, respectively, are preferably molded from plastic materials such as ABS plastic that provide outstanding strength and are readily recyclable. However, it will be understood by those skilled in the art that other materials could equally well be used. For example, for posts requiring exceptional strength, glass-filled nylon materials may be specified by a user. When multiple post sections (such as lower and upper posts) are utilized, it is desirable to mold the differing post sections from different colors for enhancing ease of identification and assembly sequencing and proper post placement within the base 20 when the container assembly is disassembled and configured into its modular collapsed configuration.

In the preferred embodiment, all of the lower post members 45 are of identical construction. A preferred configuration of a lower post member 45 of the container assembly 10 is shown as molded in irregular shape comprising a grid of longitudinally extending ribs and intervening lateral support members which provide a post member of superior strength and enhanced rigidity, while reducing the total weight and cost. The lower post has a first, or bottom end portion 46 having first and second pairs of symmetrically protruding radially projecting arms 46 a and 46 b axially spaced from one another. All of the projecting arms are coplanar with one another. The lower post 45 further has an oppositely longitudinally disposed second or top end portion 47 having third and fourth pairs of symmetrically radially projecting arms 47 a and 47 b that are axially spaced from one another, and which lie in the same plane as the first and second projecting pairs of arms 46 a and 46 b of the bottom portion 46 of the post. In the preferred embodiment, all of the projecting pairs of arms 46 a, 46 h, 47 a and 47 b are generally rectangular in cross-sectional shape when viewed from a cross-section taken through their common plane, with the first and second pairs of projection arms being radially longer than the third and fourth pairs of projection arms. The diameter of the top portion 47 of the lower post 45 is smaller than that of the bottom end portion 46. The molded juncture of the differing post diameters defines an annular ledge or upper seat 48. The projected lengths of the third and fourth pairs of arms 47 a and 47 b, respectively, generally are the same or less than the larger lower diameter of the lower portion 46 of the post 45. Approximately 60% of the longitudinal distance up from the bottom end of the post 45, a molded extension of increased diameter projecting outwardly from the outer post perimeter from the same sides as the first through fourth projecting arms, forms a second annular seat 49. The seat 49 is configured to retainably position and supportively hold the intermediate band member 40 that slides over the top portion 47 of the lower post 45, during assembly of the container. Bottom and top plan views of the post 45 are illustrated respectively in FIG. 9B and FIG. 9C.

As with the lower posts 45, all four of the upper post members 50 are of identical construction. Referring to FIG. 10, a preferred configuration of an upper post member 50 of the container assembly 10 is shown as molded in irregular shape comprising a grid of longitudinally extending ribs and intervening lateral support members, of similar functional nature to that of the lower post members 45.

Figure 10A:
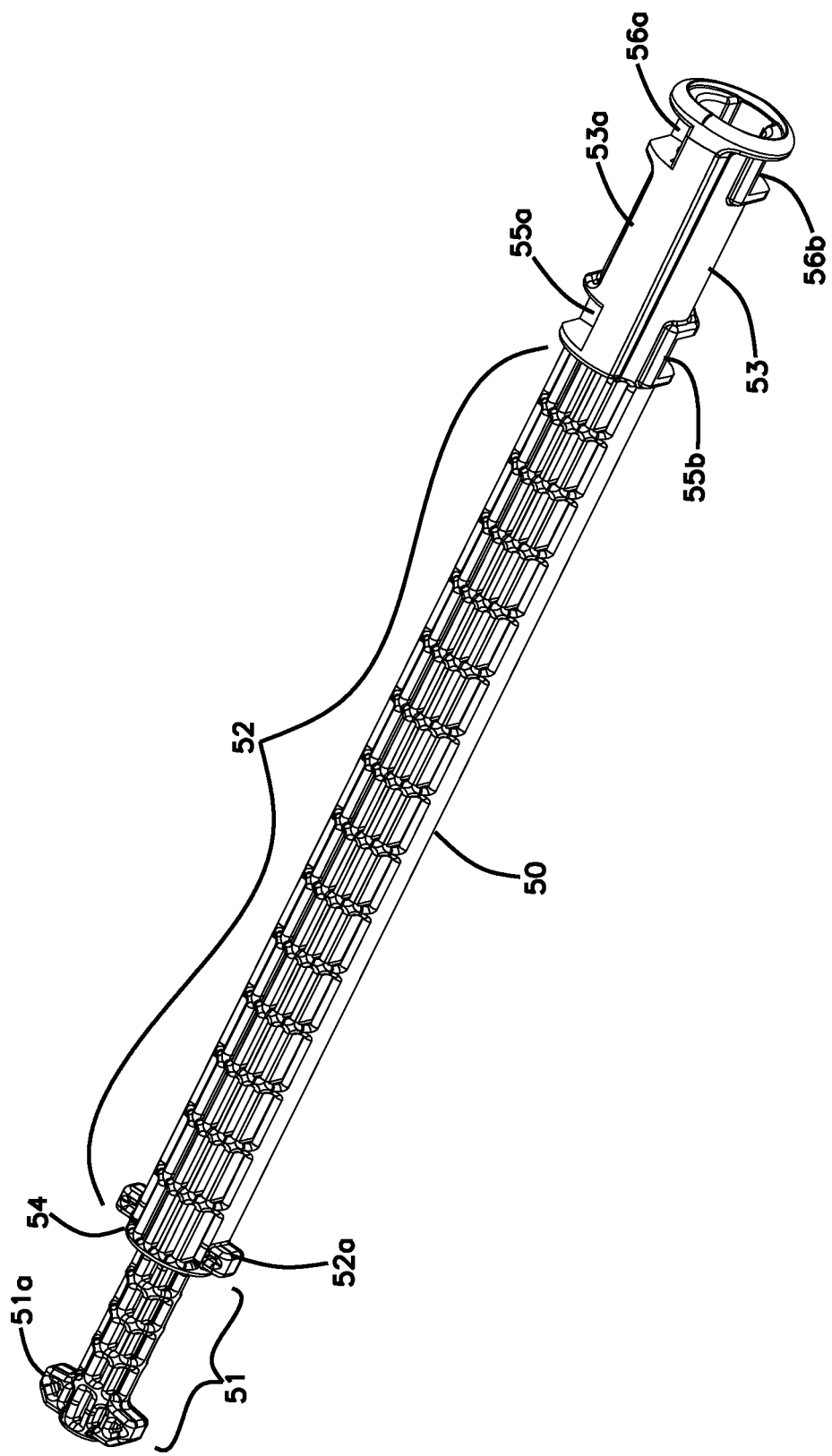
FIG. 10A is a lower, side perspective view of an upper post of the container assembly of FIG. 1.
Figure 10B:
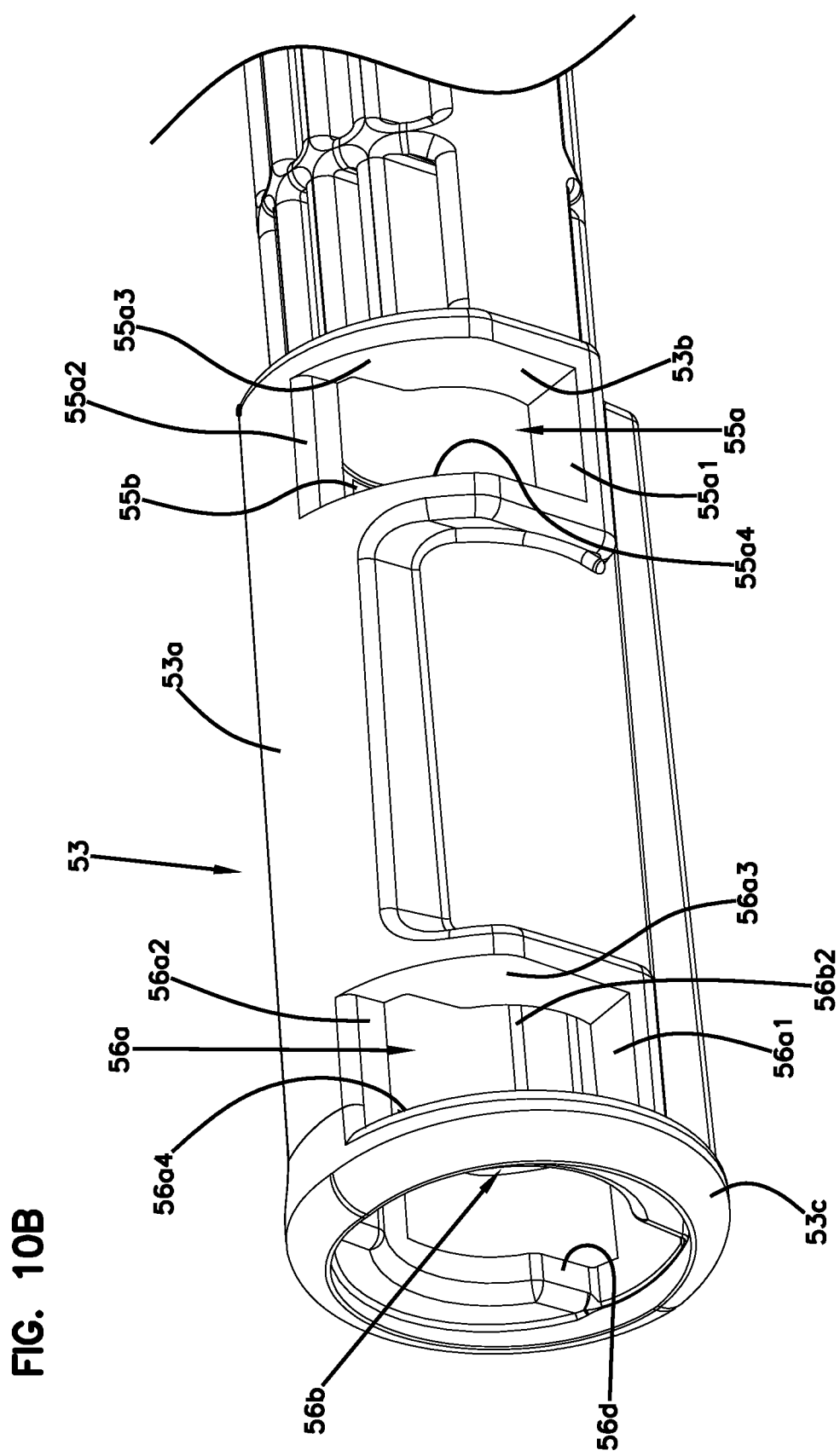
FIG. 10B is an enlarged bottom, side perspective view of the lower portion of the upper post of FIG. 10A.
Figure 10C:
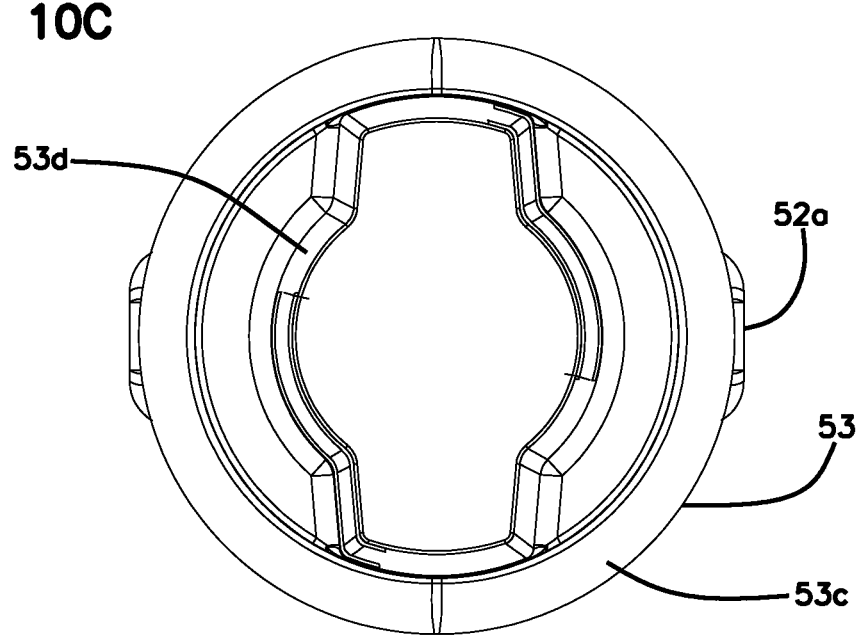
FIG. 10C is a bottom plan view of the upper post of FIG. 10A.
Figure 10D:
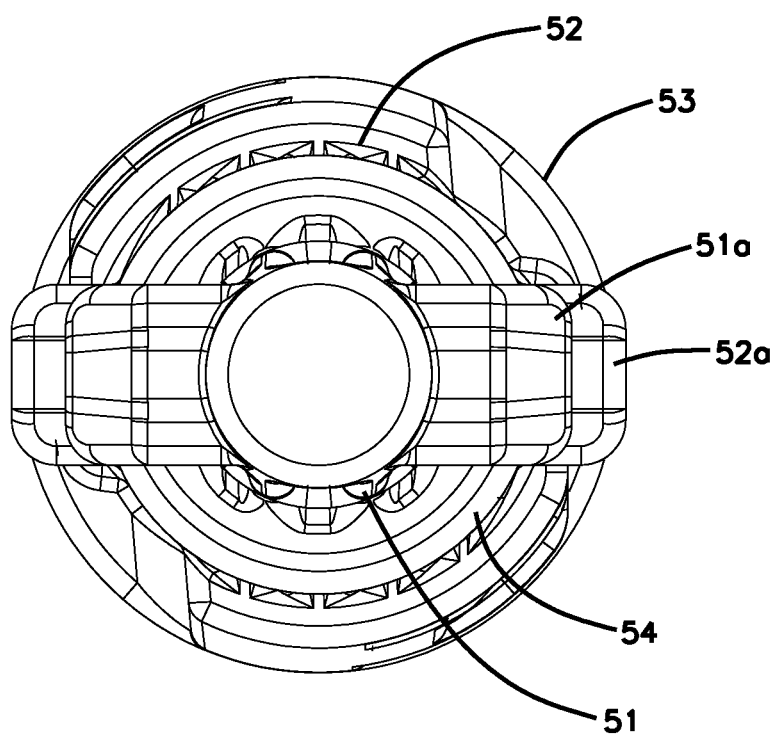
FIG. 10D is a top plan view of the upper post of FIG. 10A.

The upper post 50 has a first upper portion 51 of reduced diameter, an intermediate portion 52 of increased diameter, generally the same as that of the larger bottom portion 46 of the bottom post 45, and a lower receptor portion 53. The molded juncture of the differing post diameters between the upper portion 51 and the intermediate portion 52 of the upper post 50 defines an annular ledge or upper seat 54. The seat 54 is configured to retainably position and supportively hold the upper ring member 30 that slides over the top portion 51 of the upper post 50 during assembly of the container. The upper portion 51 of the post 50 has a first pair of symmetrically radially projecting arms 51 a lying in a plane and projecting from opposite sides of the upper portion 51, adjacent the top end of the upper post 50. A second pair of symmetrically radially projecting arms 52 a, axially spaced downwardly from the first pair of arms 51 a, extend outwardly from opposite sides of the intermediate portion 52 and adjacent the top end of the intermediate portion of the post 50. The first and second pairs of projecting arms 51 a and 52 a lie in a common plane. The second pair of arms 52 a extend radially outward slightly further than the first pair of arms 51 a, but generally have the same total cross-sectional width as the diameter of the lower receptor portion 53 of the post 50 (see FIGS. 10C and 10D). The first and second pairs of arms 51 a and 52 a are generally rectangular in cross-section with the upper distal end portions of the arms 51 a being slightly angled in the downward direction. An enlarged view of the lower receptor portion 53 of the upper post 50 is shown in FIG. 10B. Referring thereto, the receptor portion 53 extends axially downward from the intermediate portion 52 of the post 50 and is of generally cylindrical configuration, having an outer wall portion generally designated at 53 a that is molded to the intermediate post portion 52. The lower end 53 c of the receptor 53 defines a keyway opening or passage 53 d that, as viewed from the lower end 53 c of the receptor 53, has an axially aligned circular central portion with a pair of radially opposed extended side slot areas and is sized, shaped and configured to cooperatively axially receive the top end portion 47 of the lower post 45. The keyway opening 53 d longitudinally axially extends down through the length of the lower receptor portion, such that when the top portion 47 of the lower post is fully axially received within the receptor 53, the upper seat portion 48 of the lower post member cooperatively engages the lower end 53 c of the receptor 53. The radial directions of the opposed side slot areas of the keyway 53 dare angularly oriented about the common longitudinal axis of the upper post 50 at a 90° angle relative to the common radial directions defined by the first and second pairs of projecting arms 51 a and 52 a (see FIGS. 10A and 10C).

Figure 11A:
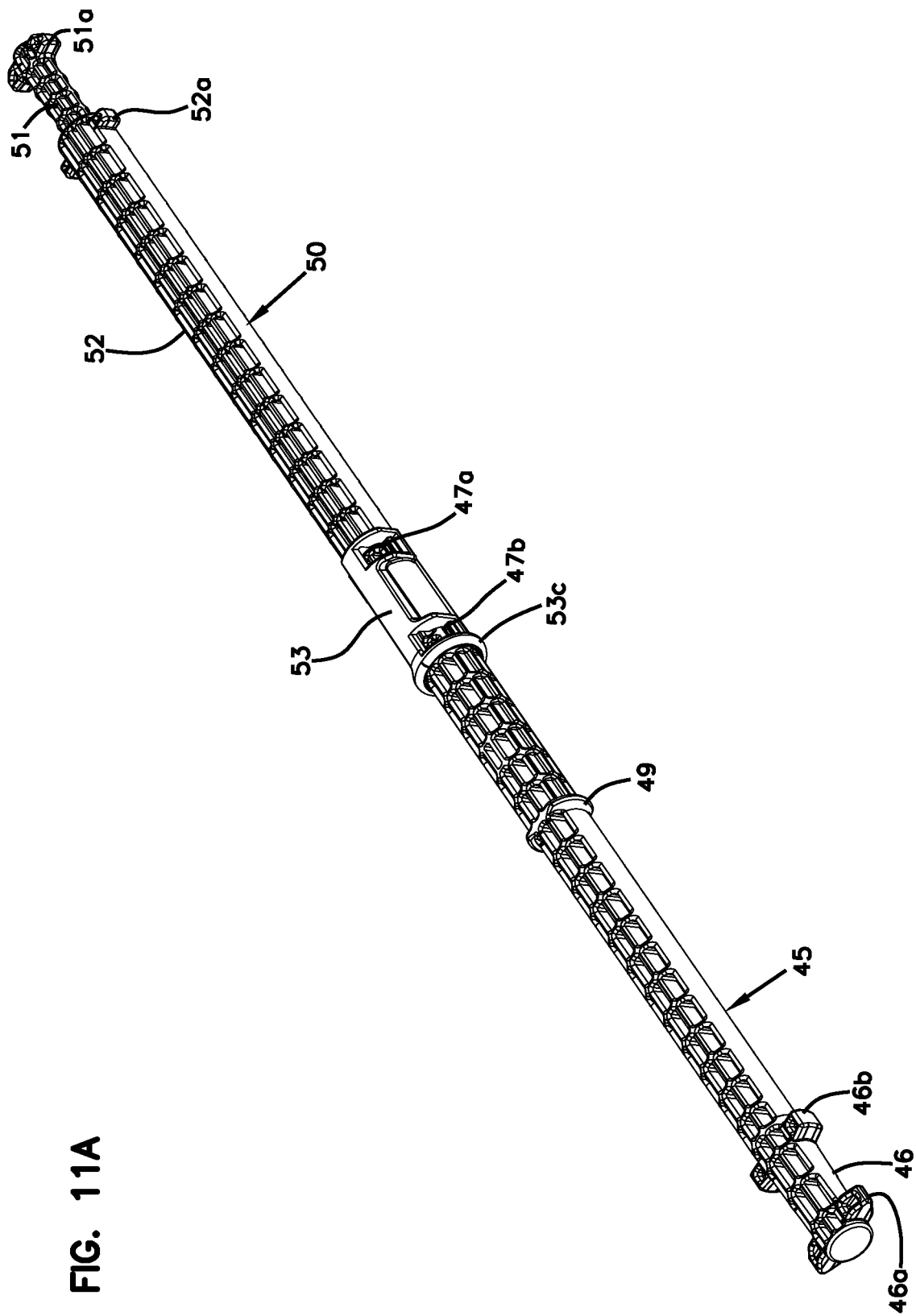
FIG. 11A is a bottom, side perspective view showing the upper and lower posts of FIGS. 9 and 10 operatively connected.
Figure 11B:
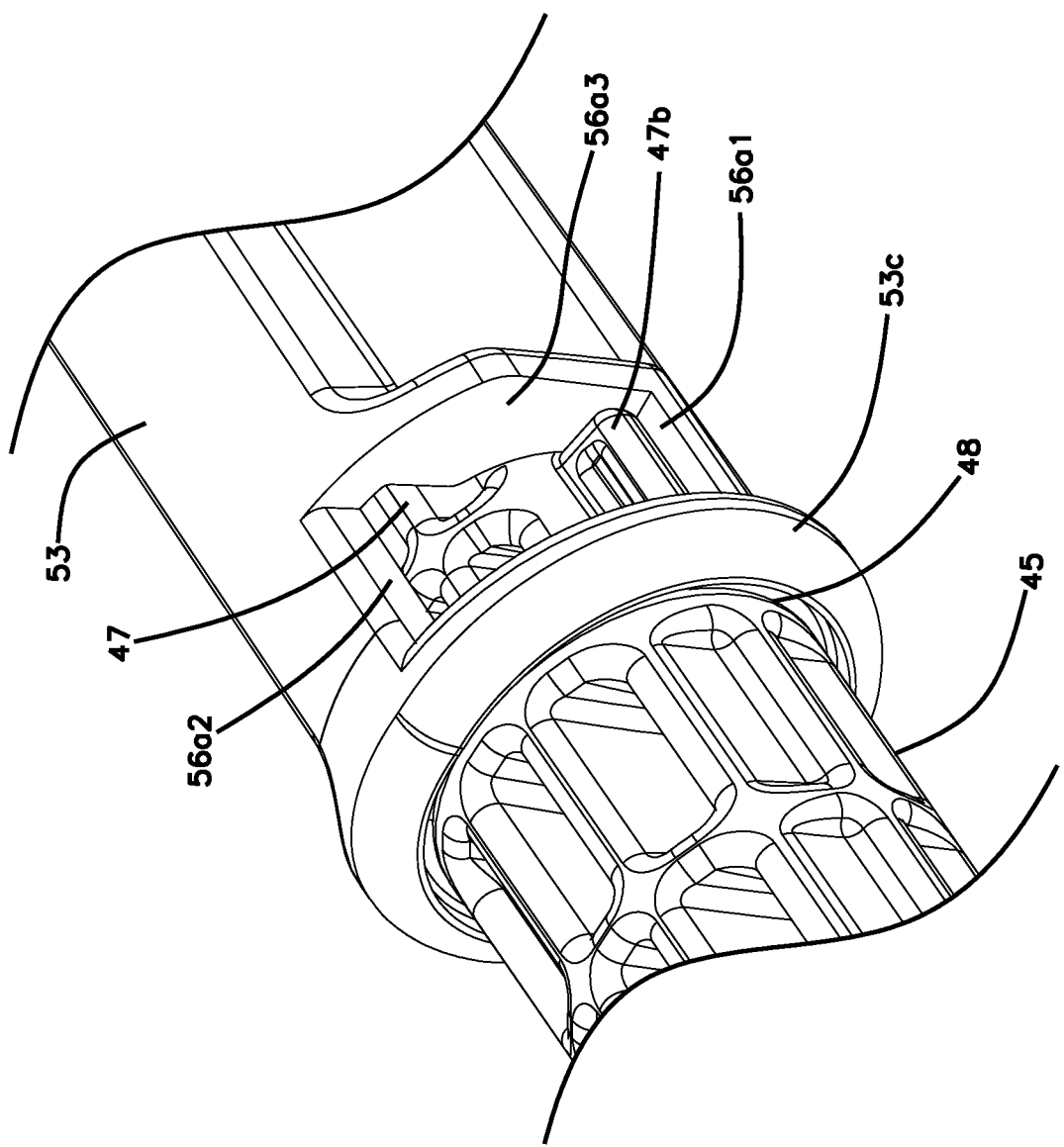
FIG. 11B is an enlarged perspective view of the interconnection portion of the upper and lower posts of FIG. 11A, showing the lower post tab projection in locked position within the receptor portion of the upper post.

Two pairs of generally rectangular opposed slot openings 55 a, 55 b and 56 a, 56 b are formed through the outer wall 53 a of the receptor 53 and open into the keyway passage 53 d. As viewed in FIG. 10B, an uppermost pair of opposed slots 55 a and 55 b lie adjacent to the upper end of the receptor 53 in radially opposed manner. The lowermost pair of radially opposed slots 56 *a* and 56 *b* lie adjacent the lower end 53 *c* of the receptor 53. The respective slots 55 *a*. 56 *a* and 55 *b*, 56 *b* are vertically aligned with one another and curve around approximately 90° of the perimeter of the receptor 53. As viewed in FIG. 10B, the slots 55 *a*, 55 *b* have right walls 55 *a* 1, 55 *b* 1, respectively, and left walls 55 *a* 2 and 55 *b* 2, respectively. The slots 56 *a*, 56 *b* have right walls 56 *a* 1, 56 *b* 1, respectively, and left walls 56 *a* 2 and 56 *b* 2, respectively. The slots 55 and 56 are angularly oriented around the upper post 50 axis such that the vertical right walls 55 *a* 1, 55 *b* 1 and 56 *a* 1, 56 *b* 1 of the slots 55 *a*, 55 *b* and 56 *a*. 56 *b*, respectively, are positioned slightly beyond the general plane of the first and second arms 51 *a* and 52 *a*. The upper slots 55 *a*, 55*b* each receptively has an upper wall 55 *a* 3, 55 *b* 3 formed by an upper plate member 53 *b* of the receptor, and a lower wall 55 *a* 4, 55 *b* 4. The slots 56 *a* and 56 *b* each respectively has an upper wall 56 *a* 3, 56 *b* 3 and a lower wall 56 *a* 4, 56 *b* 4. The slots 55 and 56 are longitudinally spaced from one another and sized and configured so as to, respectively, slidably receive and accept the third 47 *a* and fourth 47 *b* pairs of projecting arms, respectively, of the lower post 45 when fully operatively inserted within the keyway passage 53 *d* of the receptor 53, and when the receptor 53 is subsequently twisted 90° in a clockwise direction when viewed from the top of the upper post 50. As the upper post 50 is rotated clockwise relative to the lower post and with the upper end 47 of the lower post operatively fully inserted into the receptor 53 of the upper post, the opposed pairs of projecting arms 47 *a*, 47 *b* of the lower post that are positioned within the receptor keyway 53*d* will be slidably received within and between the upper and lower walls of the slots 55 *a*, 55 *b* and 56 *a*, 56 *b*, respectively, and will be guided by the upper and lower slot walls during rotation of the upper post, until the projecting arms 47 *a*. 47*b* engage the right sidewalls 55 *a* 1, 55 *b* 1 and 56 *a* 1, 56 *b* 1 of the slots 55 *a*, 55 *b* and 56 *a*, 56 *b*, respectively, at which, positions the upper post 50 will be operatively locked with the lower post 45 as shown in FIGS. 11A and 11B. When the upper 50 and lower 45 posts are in such locked position, all of the projecting pairs of arms 46 *a*, 46 *b*, 47 *a*, 47 *b* of the lower post 45, and the projecting pairs of arms 51 *a*, 52*a* of the upper post 50 will be oriented and lie in the same plane. When the lower and upper posts are longitudinally locked together as described above, they collectively form a single elongated post extending from the bottom of the lower post 45 to the top of the upper post 50. An enlarged view showing an upper post 50 in an operative locked position relative to the lower post 45, with the intermediate band 40 secured in operative position by the upper and lower posts, is shown in FIG. 17C.

Figure 7:
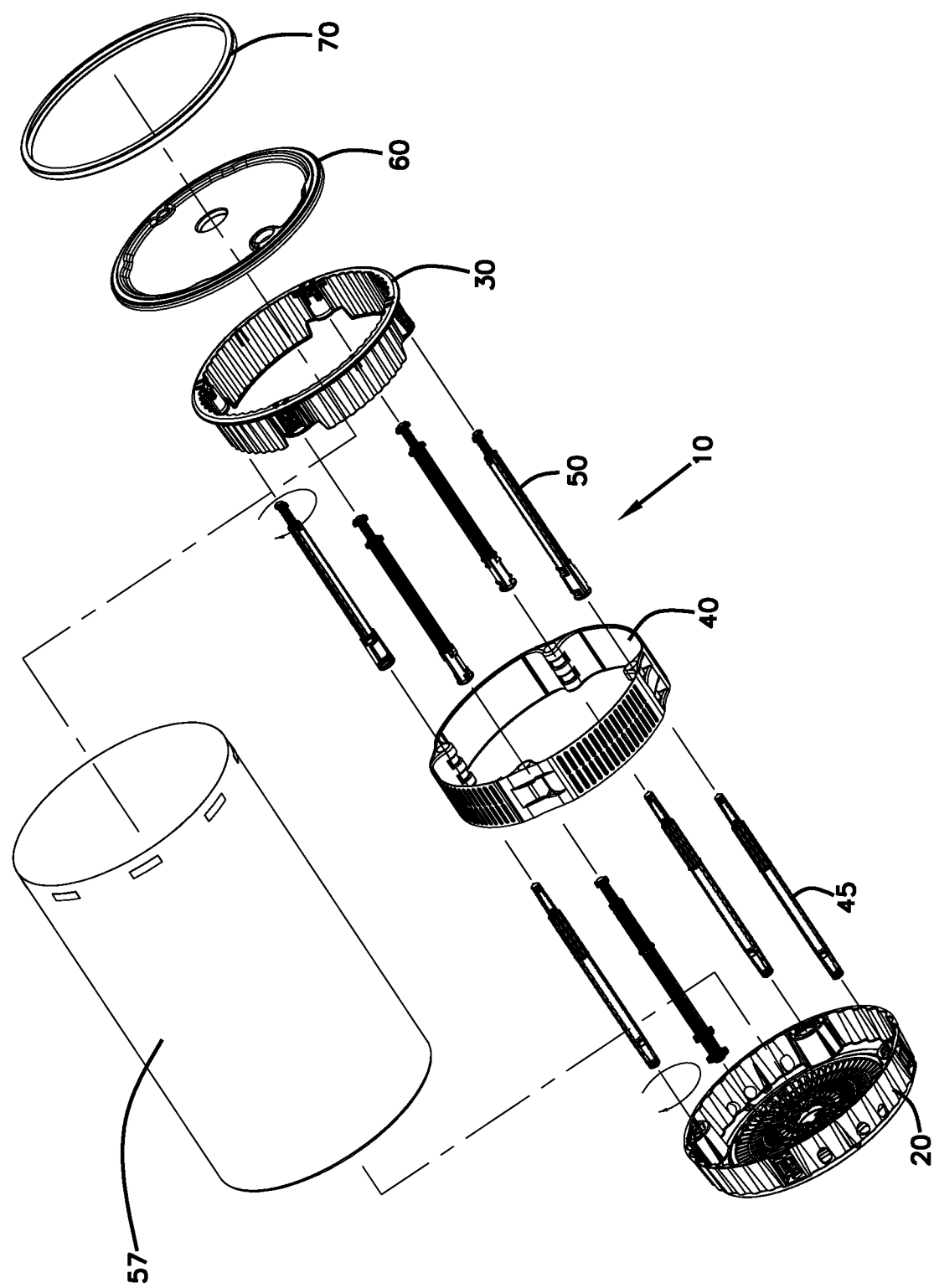
FIG. 7 is an exploded perspective view of the container assembly of FIG. 1.

In the preferred embodiment 55-gallon drum type container assembly, the interlocked lower and upper posts receive further anti-bulge support from the intermediate band member 40. Referring to FIGS. 6 and 7, the intermediate band 40 is configured to be positioned over and vertically supported by the lower post members 45. The weight of the bulk material loaded into an assembled container apparatus exerts downward and outward forces against the internal wall surfaces of the woven fabric support bag 57. It has been determined that the outward or radial forces applied to the bag are greatest in those areas comprising the lower third of the bag, which are accordingly subject to a higher degree of potential bulging than are the upper portions of the support bag 57. During assembly of the container framework (FIG. 6), the intermediate band 40 is positioned over and slid onto the upper and intermediate portions of the lower posts 45 and is retainably held by the lower posts (as hereinafter described in more detail) at a position vertically located below the central point of the container height as shown in FIG. 6, to counteract the position at which the greatest bulging forces are exerted by the bulk material loaded into the container.

Detailed illustrations of a preferred construction of the intermediate band 40 are shown FIG. 12. The intermediate band 40 is molded in a generally flat configuration as shown in FIGS. 12B and 12C and subsequently is bent or formed in the preferred embodiment into a circular configuration as shown in FIG. 12A that is then entrained over the upper ends of the lower post members 45. In the preferred embodiment, the intermediate band 40 is molded from high molecular weight polyethylene (on HMWPE) which is the plastic material commonly used in the industry for manufacturing standard plastic drum containers. The strength, gauge, and thickness specifications for the intermediate band 40 are designed to accommodate the forces it will be required to address by the particular size, shape, and use requirements of the container with which it will be used. In the preferred embodiment, the intermediate band 40 is molded by a method commonly referred to as heavy gauge twin sheet thermal forming which is a process of vacuum and compression forming two sheets of plastic simultaneously, with separate molds for the top and bottom platens. The process results in a single unified product with hollow areas and no secondary bonding required, and meets the requirements and challenges of molding the configuration of the molded intermediate band 40 of the present invention. The molded intermediate band 40 has a generally smooth inner surface texture and an outer/exterior surface as shown in FIGS. 12A and 6 of vertically oriented grooves or depressions that provide additional strength to the band 40.

Figure 12A:
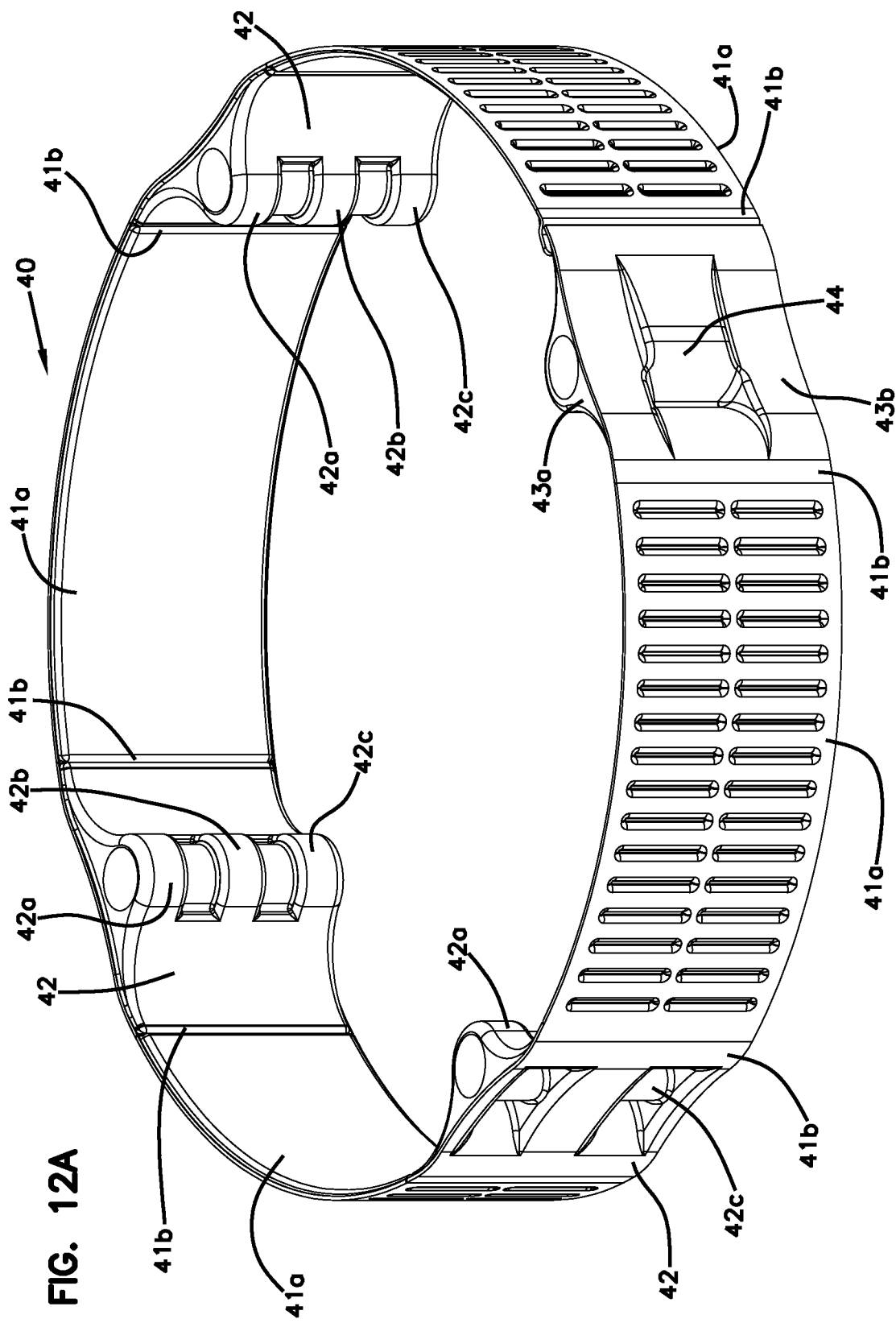
FIG. 12A is an upper, side perspective view of the intermediate band portion of the container assembly of FIG. 1, shown in its assembled closed configuration.
Figure 12B:
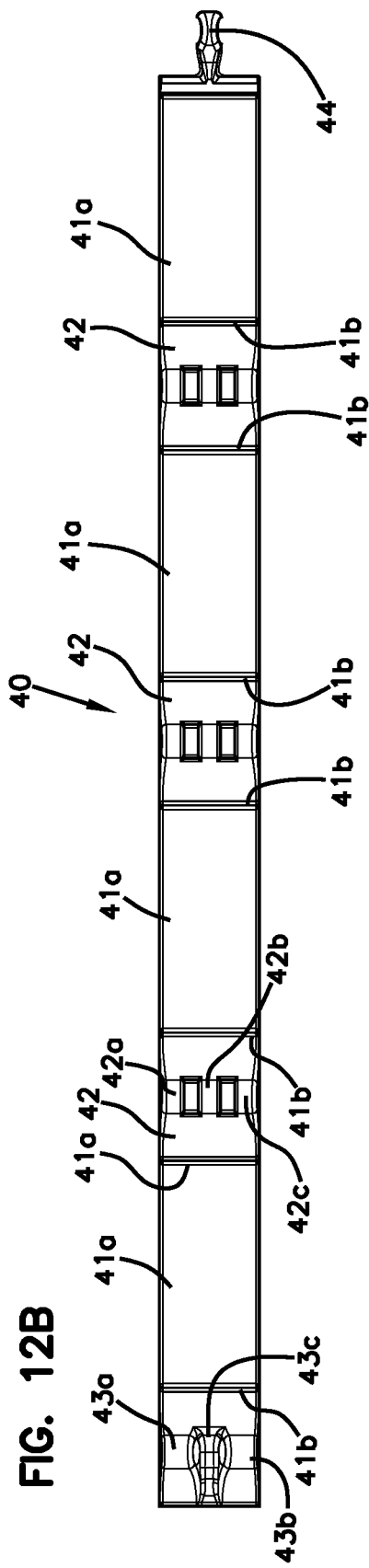
FIG. 12B is an inside back plan view of the intermediate band of FIG. 12A, shown in its unassembled, flat configuration.
Figure 12C:
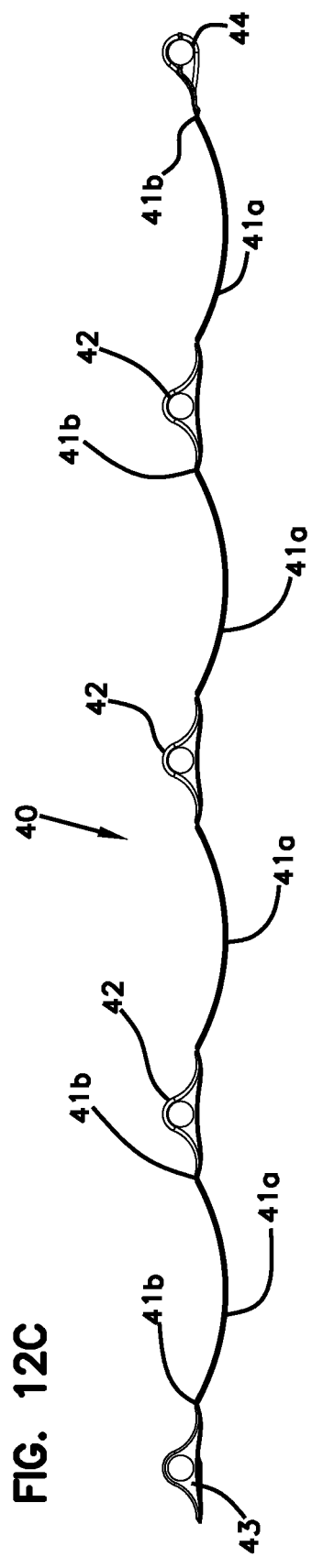
FIG. 12C is a top plan view of the intermediate band of FIG. 12B.

The band 40 has four arcuately curved rectangular band portions 41 *a* connected by means of living hinges 41 *b* to three pole guide sleeve retaining members 42. The three spaced interiorly projecting post guide sleeve members 42 protrude from and are integrally molded to the interior wall surfaces of the intermediate band 40 and have cylindrical passageways formed therethrough for cooperatively receiving and sliding over the upper and intermediate portions of the lower post members 45. The post guide retaining members 42 are of like construction, and are connected at both of their opposed lateral edges by the living hinges 41 *b* to the adjacent band segments 41 *a*. The post guide retaining members 42 have upper, middle, and lower coaxially aligned sleeve segments 42 *a*, 42 *b*, and 42 *c*, respectively, integrally molded and forming a part of the inside portion of the intermediate band (FIG. 12A). The leftmost end of the intermediate band 40, as viewed in FIGS. 12B and 12C, has a post guide sleeve retaining sleeve member 43 comprising two cylindrical axially aligned upper 43 *a* and lower 43 *b* spaced retaining sleeve members that are molded to form a portion of the inner surface of the intermediate band 40 in like manner to the centrally located post guide retaining members 42. The retaining sleeve member 43 is connected at one end by means of a living hinge 41 *b* to an end of one of the band segments 41 *a*. The distal end of the retaining member 43 is unconnected. The central cylindrical opening formed through the sleeve retaining member 43 is shaped generally the same as those of the central post guide sleeve retaining members 42 and is sized to slide over the upper and intermediate portions of a lower post member 45. The upper and lower aligned sleeve portions 43 *a* and 43 *b*, respectively, of the intermediate band 40 define an axial space 43 *c* therebetween for receiving a third sleeve portion 44 therebetween. The right end, as viewed in FIGS. 12B and 12C, of the intermediate band 40 is connected by means of a living hinge 41 *b* to a cylindrical sleeve member 44, also molded to form an integral part of the inwardly directed surface of the intermediate band 40, and having an axial dimension sized to mate with and cooperatively slide into the axial space 43 *c* separating the upper 43 *a* and lower 43 *b* sleeve portions of the post guide sleeve retaining member 43 when the intermediate band 40 is bent by means of the living hinges 41 *b* to form a circular configuration as shown in FIG. 12A. The inner hole diameters of the sleeve members 42, 43, and 44 are similarly sized and configured to cooperatively receive and slide over the upper and intermediate portions of the lower post members 45. When the intermediate band 40 is curved to operatively align and join the sleeve retaining members 43 and 44 in axial alignment, and when the intermediate band 40 is slid over the top and intermediate portions of the four lower post members 45 that have been previously mounted within the post receptors 24 of the base 20, the circular shape of the intermediate band 40 as illustrated in FIG. 12A is maintained, and the intermediate band forms an integral part of the container assembly framework shown in FIG. 6. The lower surface portions of the post guide sleeve segments 42 *c* and 43 *b* cooperatively engage and seat upon the second annular seat portions 49 of the lower post 45, which supports the intermediate band 40 on the lower post members 45 in a manner such that the upper portions 47 of the lower posts 45 extend above the upper edge of the intermediate band 40.

Figure 12D:
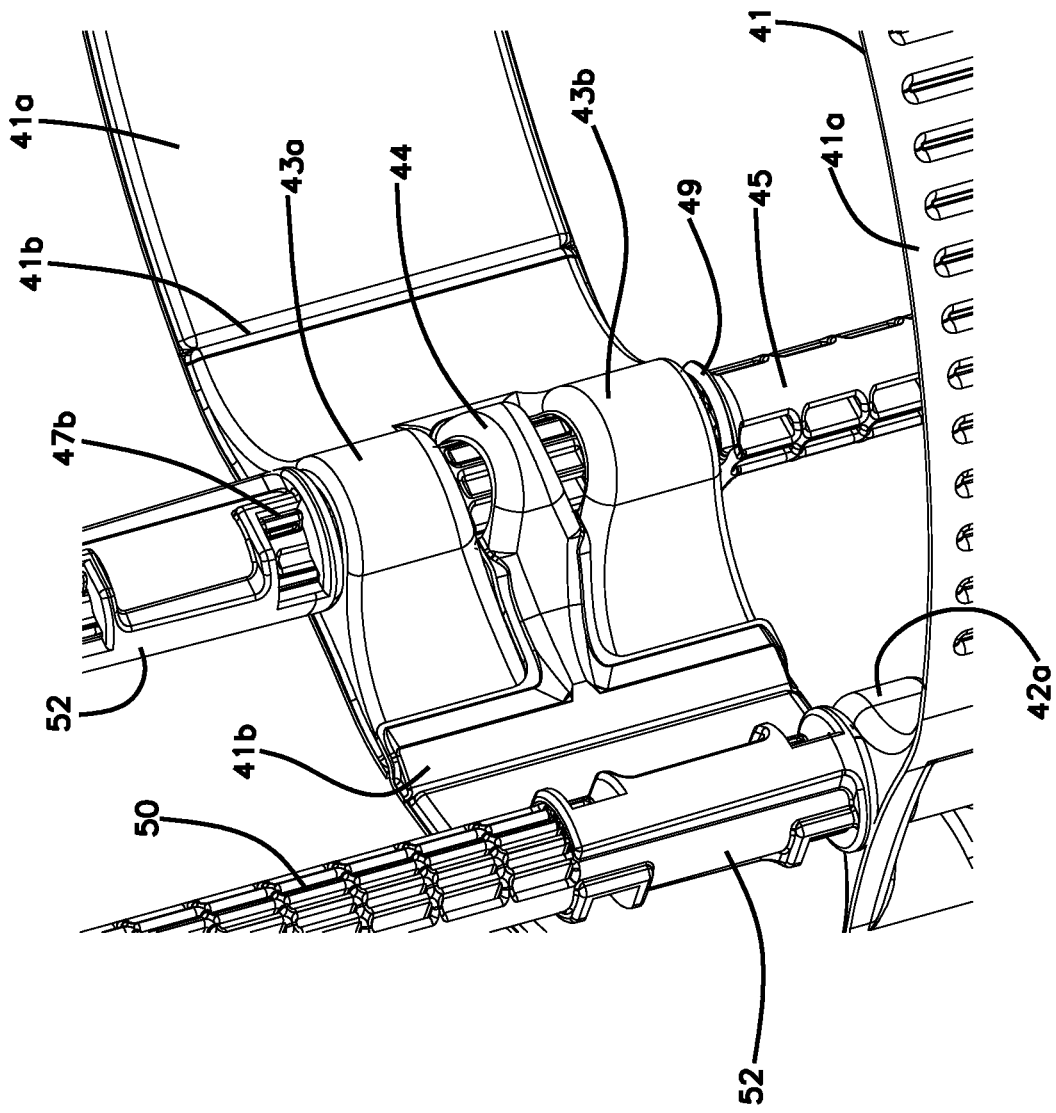
FIG. 12D is an enlarged perspective fractional view of the back side of the intermediate band of FIG. 12A, showing interconnection of the band ends by a lower post.
Figure 13A:
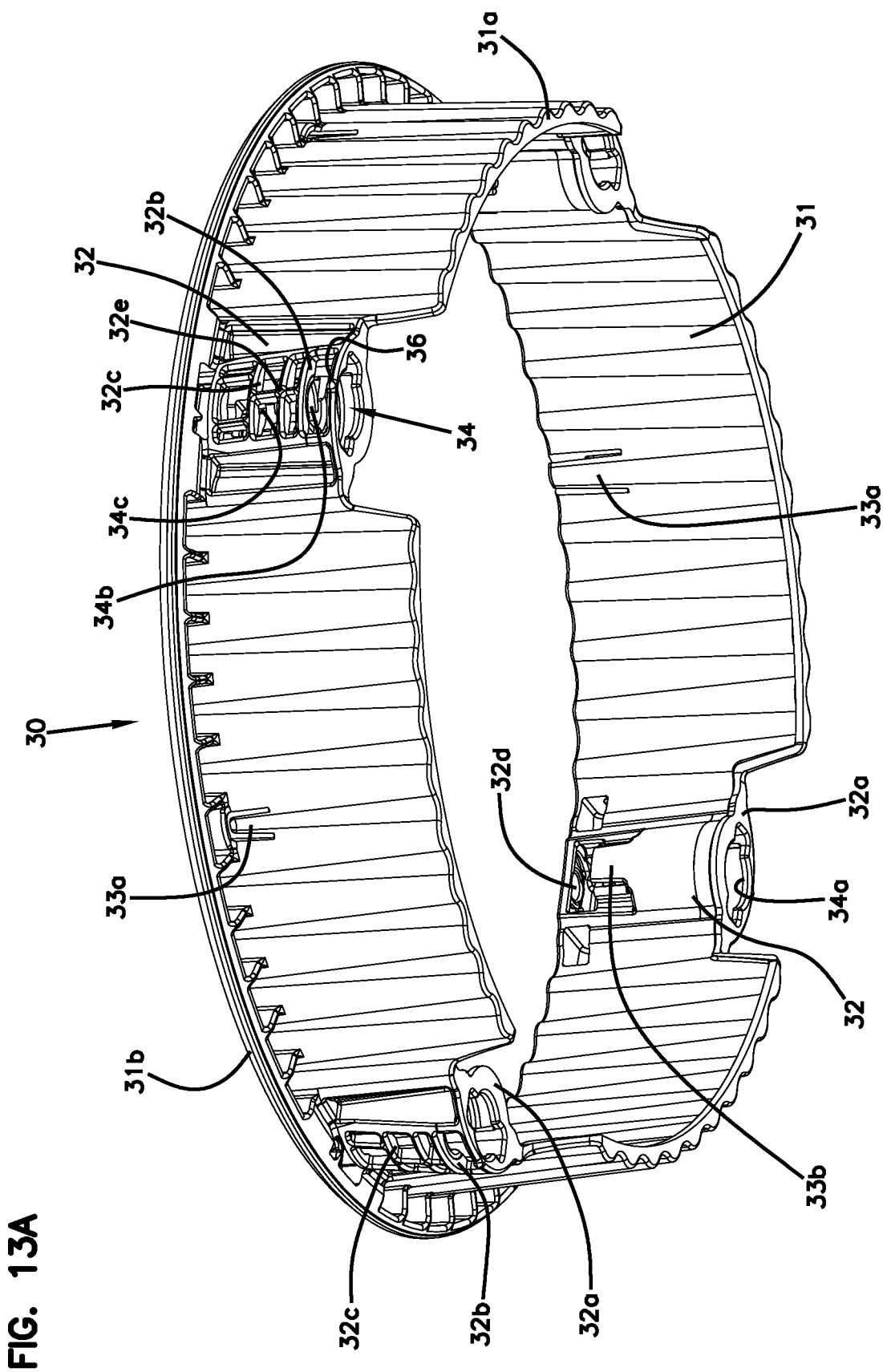
FIG. 13A is a lower, side perspective view of the upper ring portion of the container assembly of FIG. 1.

FIG. 12D illustrates the outer sleeve retaining member portions 43 and 44 as they appear operatively aligned with one another and retained in their operative position between a lower post member 45 and an upper post member 50. When removed from the lower post members 45, the intermediate band can be flexibly bent and coiled by means of its living hinges for compact placement into the internal cavity space of the base 20 for storage when the container assembly is reduced to its unassembled collapsed modular configuration (see FIG. 25). Upper ring member 30 is illustrated in perspective view in FIG. 13A and in top plan view in FIG. 13B. Referring thereto, the upper ring 30 has a cylindrical peripheral wall 31 formed in undulating corrugated manner around its periphery, wherein the corrugation pattern matches that of the upright wall of the base 20. The upper ring 30 defines an axially open configuration. The outer periphery of the wall 31 is equally divided into four segments that are connected by four equally spaced molded areas that form an integral part of the inner and outer portions of the wall surface. The spaced molded formations define upper post receptors 32 for receiving the upper portion of the upper post members 50 and the two pairs of radially projecting arms 51 *a* and 52 *a* of the upper post 50. The upper post receptors 32 are generally the same in construction and function as the lower post receptors 24 of the base 20, but configured in inverted manner to the lower post receptors 24. Those portions of the wall 31 that peripherally extend between the upper post receptors 32, extend upwardly from a lower, generally planar edge 31 *a* to an upper planar edge 31 *b* that extends radially outward beyond the outer surface of the peripheral wall portion to form a washer-like annular top seat surface of the upper ring. The lower edges 31 *a* of the wall segment portions interposed between upper post receptors 32, extend longitudinally down below the lower surfaces of the upper post receptors 32 as shown in FIG. 13A. The upper surfaces of the corrugated wall segments disposed midway between adjacent upper post receptors are configured to define four molded hook members 33 *a* that are configured to retainably engage upper peripherally sewn straps of the woven fabric support bag 57. A second set of four hook members 33 *b* for engaging the bag strap members are formed by the upper inner wall portions of the upper post receptors 32. The wall hook members 33 *a* and the receptor hook members 33 *b* form eight hook members for the support bag 57 that are equally spaced along the inner upper periphery of the upper ring 30.

Referring to FIGS. 13, 17A, and 17B, the four upper post receptors 32 depend downwardly from the upper edge 31 *b* of the upper ring wall at equally spaced positions around the perimeter of the outer wall 31. In the embodiment shown, the inwardly facing walls of the upper post receptors 32 are generally semicircular in shape and terminate at a lower seat plate 32 *a*. The lower surface of the seat plate 32 *a* of each upper post receptor 32 defines a keyed opening 34 *a* therethrough having a circular shaped central portion with a pair of radially opposed extended side slot areas sized, shaped, and configured to receive the upper key portions 51 *a* and 52 *a*, and the upper seat 54 of one of the upper post members 50. The outer walls of the upper post receptors 32 and the corresponding portion of the adjacent walls 31 define a hollow inner cavity, except for intermediate seat plates, described below. A first intermediate seat plate 32 *b* is spaced upwardly from and parallel to the lower seat plate 32 *a* by a distance suitable for receiving the upper seat portion 54 and the second pair of radially projecting arms 52 *a* of the upper post 50. The intermediate seat plate is integrally formed with and connected to the inner wall of the upper post receptor and to the adjacent sidewalls of the primary wall 31. The first intermediate seat plate 32 *b* defines a keyed opening 34 *b* therethrough that is axially aligned with the lower keyed opening 34 *a* and is sufficiently sized and configured to enable passage of the first pair of radially projecting arms 51 *a* and their narrower support post portion 51 of the upper post 50 therethrough, but not the larger diameter upper seat portion 54. When the upper portion of the upper post 50 is operatively inserted within the upper post receptor as shown in FIG. 17B, the upper seat 54 of the upper post 50 slidably engages and abuts against the lower surface of the first intermediate seat plate 32 *b* for supporting the upper ring member 30 on the seat 54 of the upper post 50. A second intermediate seat plate peripherally connected to the inner wall of the upper post receptor 32 and the adjacent wall portions of the primary wall 31, generally shown at 32 *c*, is spaced upwardly from and parallel to the first intermediate seat plate 32 *b* by a distance suitable for receiving the first pair of key arms 51 *a* of the upper post 50. The second intermediate seat plate 32 *c* defines a keyed opening 34 *c* therethrough that is identical or similar in size to the keyed opening 34 *b* in the first intermediate plate and in vertical alignment with the first and second keyed openings 34 *a* and 34 *b*, respectively. An upper wall surface of the upper post receptor 32, generally illustrated at 32 *d* that lies in axial alignment with the circular portion of the keyed openings 34 *a*, 34 *b*, and 34 *c* has a slight concave indentation (see FIG. 13A) for slidably cooperatively receiving the top surface of the upper support post 50 that is received by the upper post receptor 32. The outwardly directed portions of the outer wall of the upper post receptors located between the lower plate 32 *a* and the first intermediate plate 32 *b*, and between the second intermediate plate 32 *c* and the upper wall surface 32 *d*, form openings through the outer wall of the upper post receptor 32 shown at 35 *a* and 35 *b*, respectively. The openings 35 *a* and 35 *b* cooperatively receive one of the arms of the pairs of projecting arms 52 *a* and 51 *a*, respectively, when the upper post is operatively rotated within the upper post receptor 32, as shown in FIG. 17B. The inside, rear wall of the upper post receptor is sufficiently curved along its lower region so as to accommodate free rotational movement of the oppositely disposed one of the pair of radially projecting arms 52a within the inner housing when the upper post is operatively rotated within the upper post receptor 32. Referring to FIG. 17A, the upper portion of the inside wall of the upper post receptor is truncated to form the bag hook member 33 b, thereby exposing the upper surface of the second intermediate seat plate 32 c through a window or hole 35 c formed through the upper rear portion of the upper post receptor 32. As the upper post 50 is operatively rotated within the upper post receptor 32 to a locking position, the rearwardly facing one of the pair of projecting arms 51 a slides along the upper surface of the second intermediate seat plate 32c and extends in locking position through the window opening 35 b as shown in FIG. 17A.

In the preferred embodiment, the upper post receptors 32 include a plurality of support walls generally shown at 32 e along the outer surface of the upper post receptors and between the first and second intermediate seat plates 32 b and 32 c, respectively, forming an open grid-like window pattern between the intermediate seat plates 32 b, 32 c for adding rigidity to the outer wall portion of the upper post receptor, while permitting visual viewing of the upper post member 50 when operatively inserted within the upper post receptor, as shown in FIG. 17B. The radially outer portion of the lower bottom plate 32 a of the upper post receptor is outwardly curved, and terminates at its outermost edge with a small round protrusion or bump 36 that is integrally molded and forms a continuous portion of the lower plate 32 a. The extended bump members 36 of the upper post receptors 32 slidable snap within and engage diamond-shaped openings 26 formed through the outer wall of the base member above the lower post receptor portions thereof for securely locking the upper ring member 30 to the lower base 20 when secured together in their collapsed unassembled modular mode for stacking together for returning use, shipment, or storage.

Figure 13B:
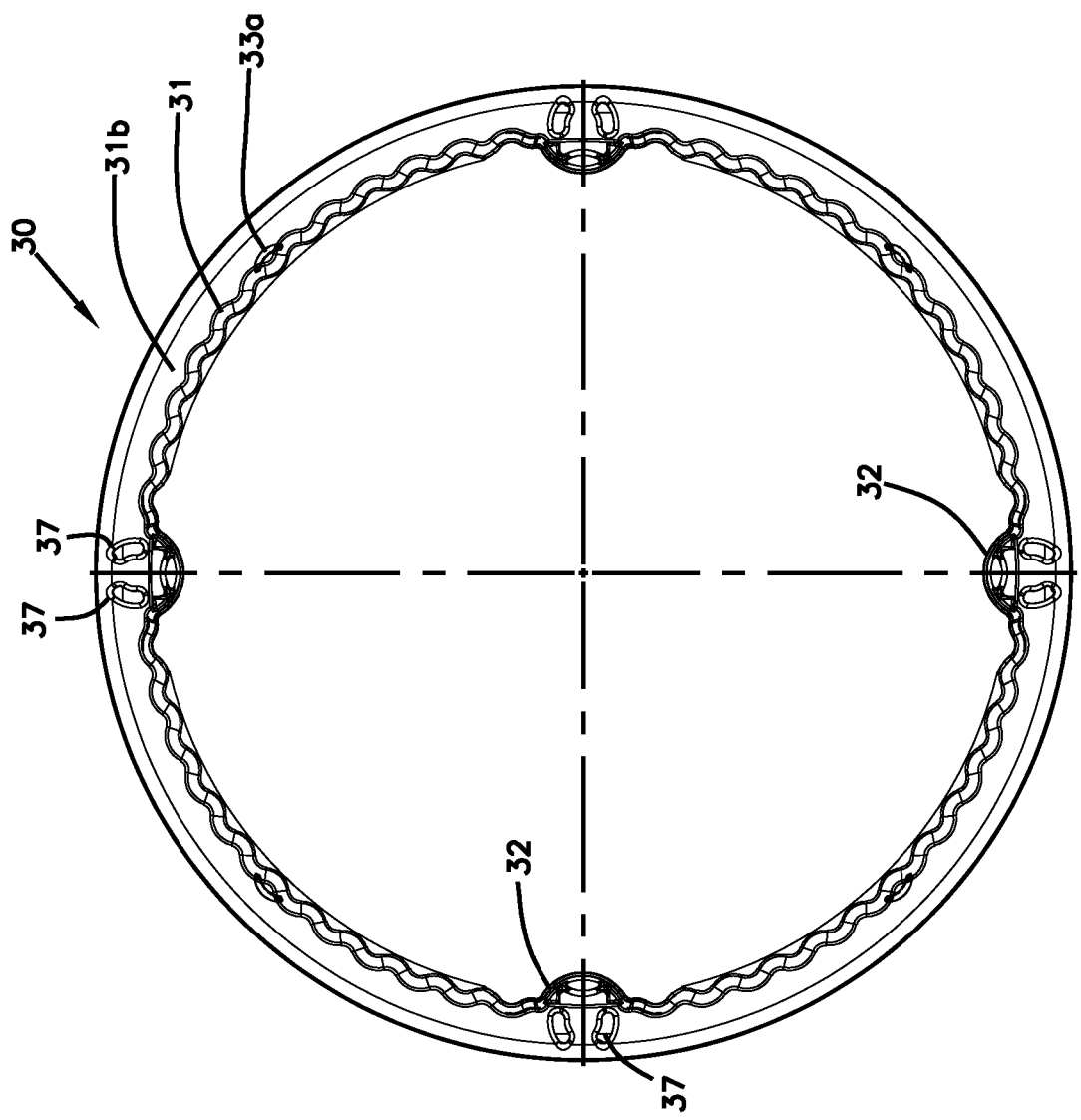
FIG. 13B is a top plan view of the upper ring of FIG. 13A.

Referring to FIGS. 13B and 17A, the upper flange 31 b of the upper ring 30 has four pairs of kidney shaped holes formed therethrough and opening into the inner cavities of the four upper post receptors 32 on opposing sides of the axial keyway openings 34 of the upper post receptors. The holes 37 are sized and shaped to matingly accept downwardly projecting members of the top cover 60 which, when inserted through the holes 37, rest alongside the upper pair of radially projecting arms 51 a of the upper post when positioned in locked position as shown in FIG. 17A, to prevent turning of the upper post 50 within the upper post receptor when the cover 60 is operatively engaged with the upper ring 30. Conversely, if the upper posts 50 have not yet been rotated to a locked position within the upper ring 30, the upper radially projecting arms 51 a of the upper posts 50 will be lying directly beneath the holes 37 of the upper ring 30, preventing the cover 60 from being operatively placed on the upper ring 30 for securement thereto.

Figure 14A:
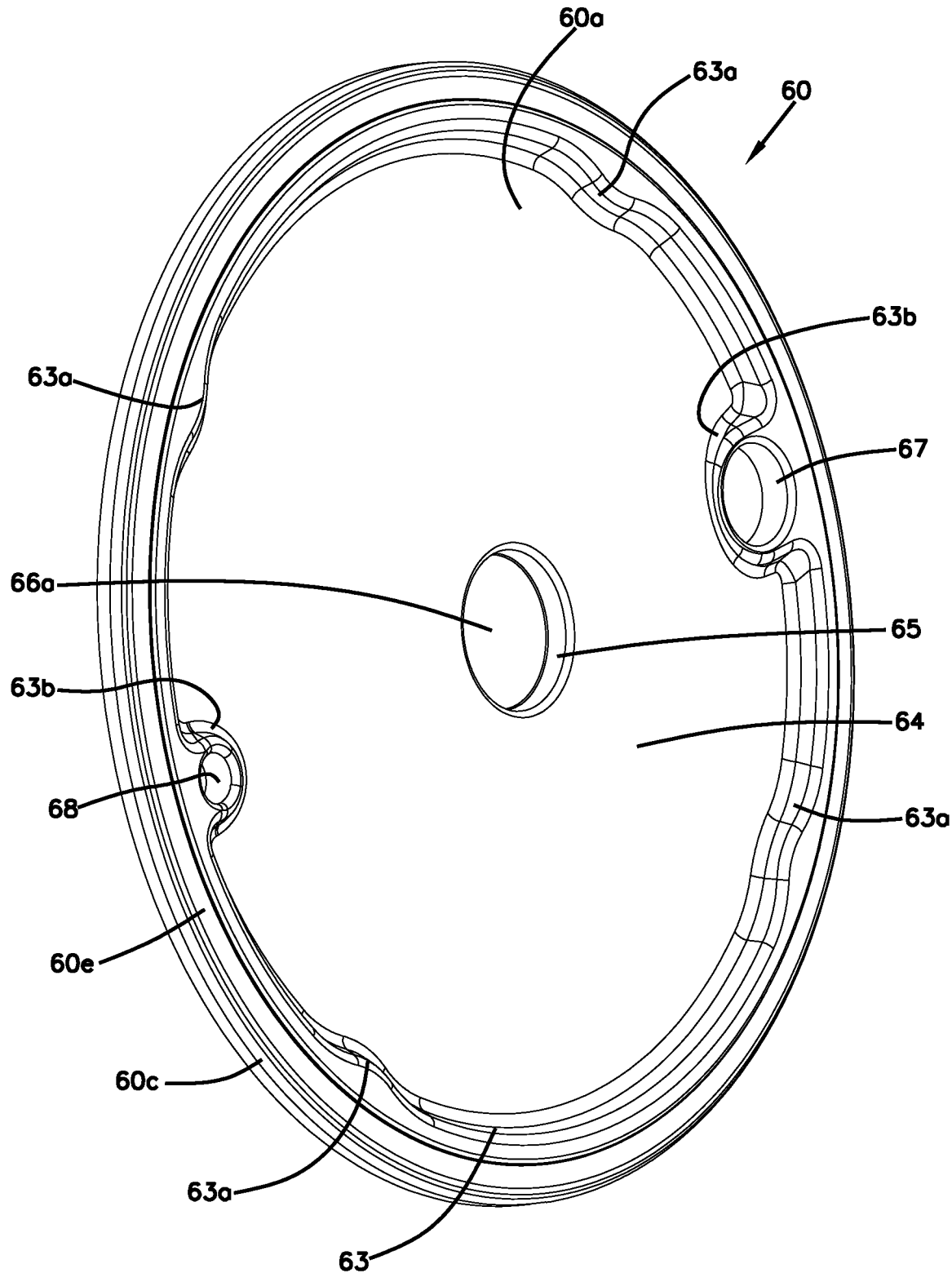
FIG. 14A is an upper, back perspective view of the cover portion of the container assembly of FIG. 1.
Figure 14B:
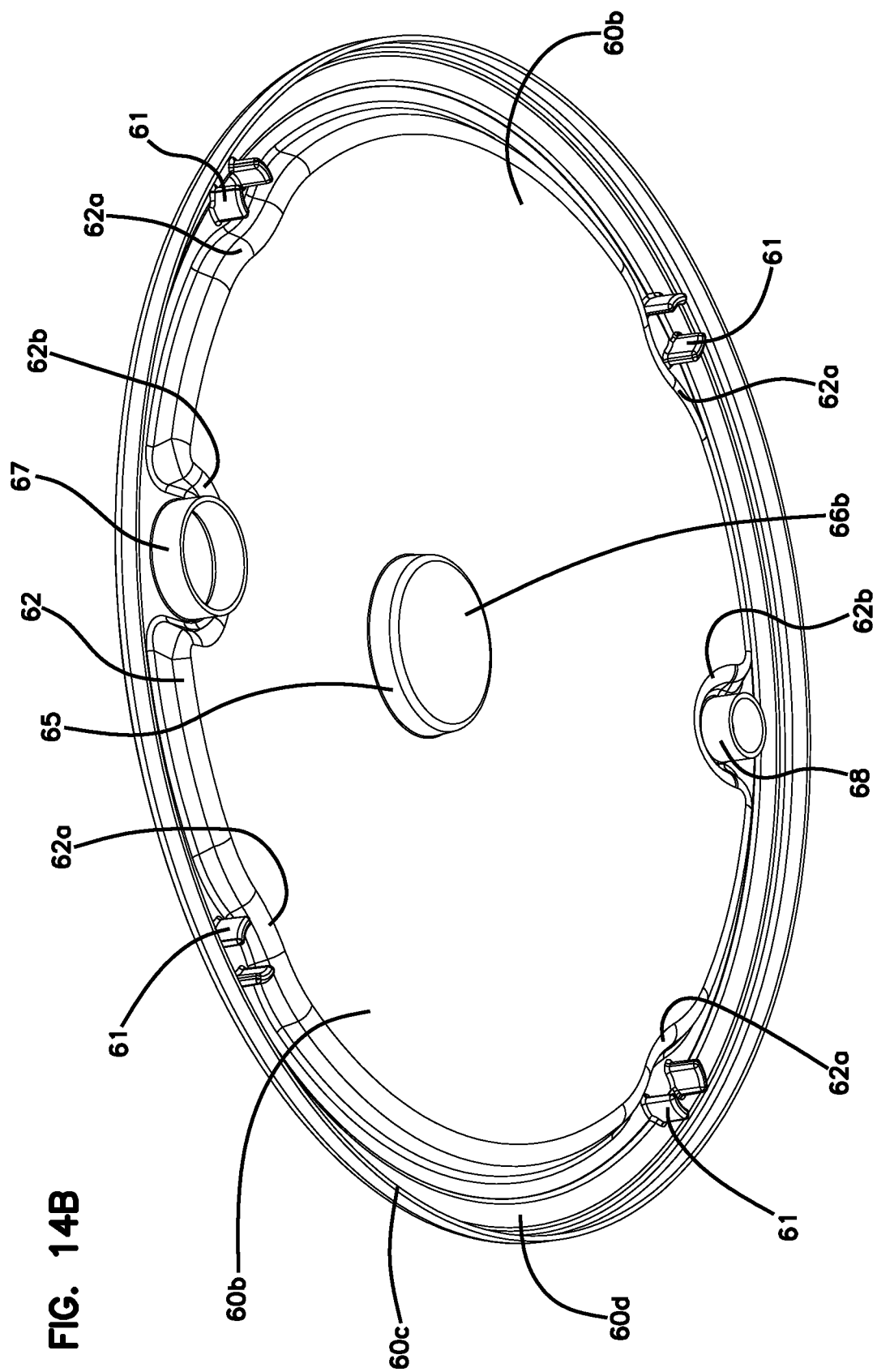
FIG. 14B is a lower, front perspective view of the cover of FIG. 14A.
Figure 14C:
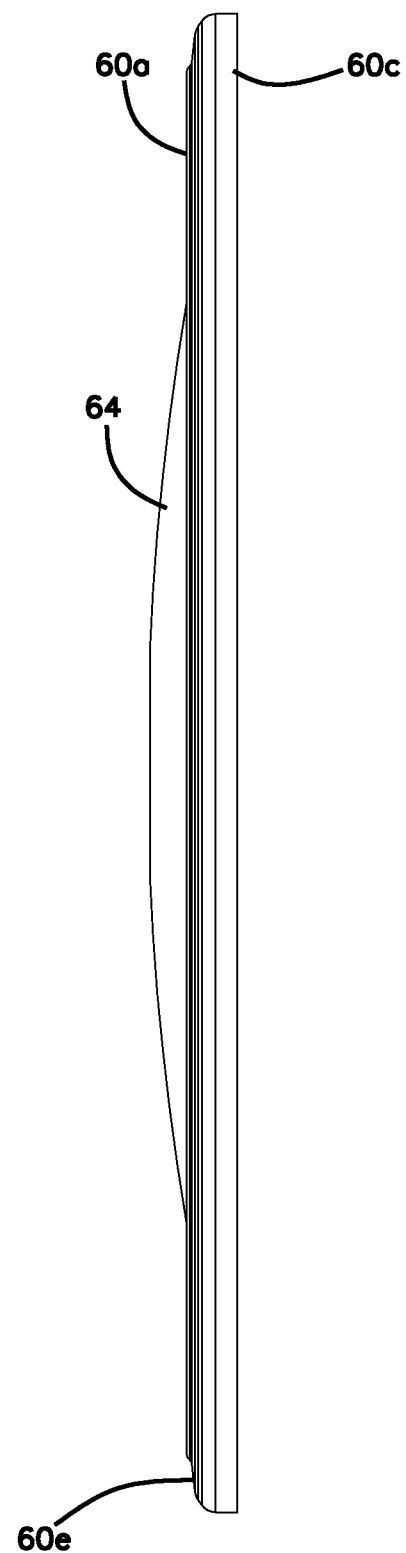
FIG. 14C is a side plan view of the cover of FIG. 14A.

Top and bottom perspective views of the top cover or cap member 60 of the container of the preferred embodiment are illustrated in FIGS. 14A and 14B, respectively. A side elevational view of the cover 60 is shown in FIG. 14C. Referring to FIG. 14, the cover 60 has an upper surface 60 a and a lower surface 60 b. The cover 60 has a circular outer shape with a peripheral downwardly depending lip or flange portion 60 c sized and shaped to cooperatively fit over the peripheral edge of the seat 31 b of the upper ring member 30. A planar band strip 60 d extends radially inward from the inner surface of the flange 60 c along the bottom surface 60 b of the cover, forming an engagement surface that cooperatively engages the upper surface of the flange 31 b of the upper ring, when the cover 60 is operatively placed upon and mounted to the upper ring 30. Four pairs of downwardly projecting molded curved protrusions 61 (also referred to herein as fingers or arms) are equally spaced around the lower periphery of the cover 60 and project from the circumferential strip area 60 d of the lower surface 60 b. The downwardly projecting pairs of protrusions 61 are sized and configured to cooperatively mate and fit in longitudinally sliding manner through the four pairs of kidney-shaped holes 37 formed through the upper flange 31 b of the upper ring 30 (see FIG. 13B). When the upper post members 50 are inserted within the upper post receptors 32 and are twisted within the receptor keyways 34 by 900, as illustrated in FIG. 17B, the cover 60 can be operatively placed into engagement with the upper ring 30 such that the downwardly projecting fingers 61 pass through the receiving holes 37 and extend into the upper post receptors 32 such that they are positioned on opposite sides of the radial tab projections 51 a of the upper posts 50. In such position, the arms 61 prevent the upper post members from being turned out of their locked positions and insure that the framework 12 remains properly "locked" in its assembled configuration. Further, if the upper posts 50 have not been operatively rotated into their locked position as shown in FIG. 17B, and an attempt is made to secure the cover 60 to the upper ring member 30, the cover will not seat upon the upper ring, since the radially projecting tabs 51 a of the upper post 50 will be positioned directly under the receptor holes 37 formed through the upper flange 31 b, preventing the cover's downwardly projecting fingers from sliding into the receptor holes 37. Accordingly, the inability to properly seat the cover 60 upon the upper ring 30 provides an indication to the user that one or more of the upper posts 50 have not been properly turned to operatively lock the framework 12 components in proper operative assembled positions relative to one another. The lower surface 60 b of the cover 60 defines a downwardly projecting ridge portion 62 that extends radially inward from the planar strip 60 d and has inwardly curved portions 62 a that curve around the four pairs of downwardly projecting fingers 61 and also around a pair of bunghole openings, at 62 b. The cap's molded curved perimeter ridge portion 62 is complimentary to the upper mating surfaces of the upper ring member 30 when they are cooperatively engaged, and helps to secure both members together.

Referring to FIG. 14A, the upper peripheral portion of the depending flange 60 c defines a planar strip area 60 e extending between the outer periphery of the upper cover and a downwardly projecting peripheral valley portion 63 which represents that area on the upper surface 60 a of the cover corresponding to the lower ridge area 62 of the lower surface of the cover. The portion of the upper surface 60 a of the cover 60 that extends between the downwardly projecting valley portion 63 and inwardly toward the central axis of the cover is configured in an upwardly convex shape (see FIG. 14C) with the central axis of the cover 60 defining the apex of the convex surface. The convex shaped portion of the upper surface is generally indicated at 64 in FIG. 14C. The convex molded upper surface of the top cover 60 has a curvature identical to that of the concave bottom surface of the base 20 so as to cooperatively mate with the bottom surface of the base when the base is placed upon the cover in stacked configuration. The central portion of the upper surface 60 a defines a downwardly extending cylindrical portion 65 that extends in a downward axial direction and is molded as an integral portion of the cover surface. The downwardly extending cylindrical portion 65 has an integrally molded bottom 66 having an upper surface 66 *a* and a lower surface 66 *b*. The cylindrical portion 65 formed through the upper convex surface of the cover's upper surface is sized and shaped to identically cooperatively mate with the downward protrusion 23 of the bottom of the base member 20 when the base is placed in stacking manner upon the upper surface 60 *a* of the cover 60.

Figure 15B:
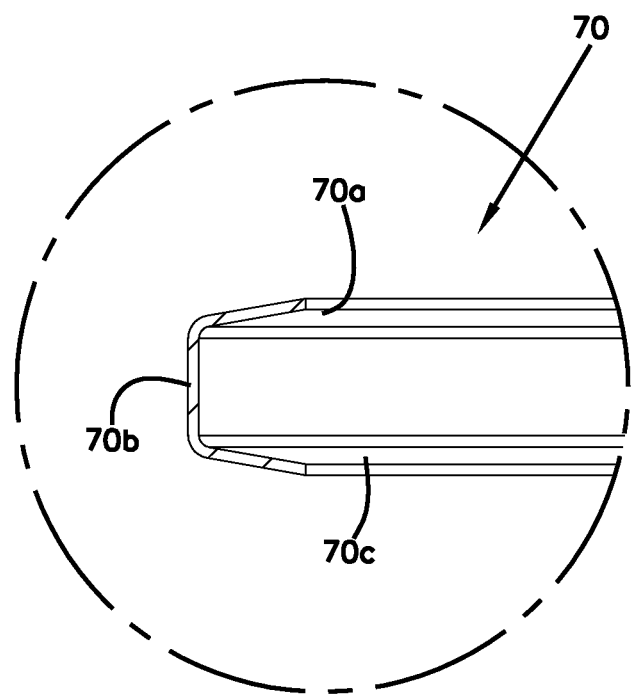
FIG. 15B is a cross-sectional view of the tightening band of FIG. 15A generally taken along Line A-A of FIG. 15A.

The cover 60 further includes a pair of through-holes 67 and 68 (referred to in the industry as bungholes) formed through the cover 60 and comprising the industry standard NPS bungholes of 2 inches and 0.75 inches in diameter, respectively, with internal threads into which industry standard plugs are threaded to provide access to the container's internal cavity when the cover is attached to the container. The larger hole 67 is typically used to fill and empty liquid materials into and out of the container; whereas the smaller hole 68 is typically provided to provide access to the container's internal cavity to relieve any pressure or vacuum that may be created inside of the container during filling or emptying of its contents, as is well known by those skilled in the art. The lower outer wall surfaces 24 *b* of the lower post receptors 24 of the base 20 cooperatively mate with those inwardly molded areas of 63 *a* of the downwardly projecting peripheral portion 63 of the upper cover for providing added engagement stability for stacking of a base member 20 on top of the cover 60 for stacking both loaded container assemblies and collapsed container assemblies for return shipment and reuse and/or storage. The tightening band 70 for securing the cover 60 to the underlying upper ring member 30 is diagrammatically illustrated in FIG. 15A, and in cross-section in FIG. 15B. The tightening band only shown diagrammatically in FIG. 15, is a standard off-the-shelf item well known in the industry and by those skilled in the art. Such tightening bands referred to as "closing or locking rings" are commonly used to sealingly secure a container cover to a container by applying uniform radial inward forces around the periphery of a cover seated on top of a container, to secure the cover to the container. The tightening band generally has a u-shaped cross-sectional configuration, as shown in FIG. 15B, such that the band is placed over the cover's outer peripheral edge and the upper curl or flange of the container upon which the cover seats with free ends of the band facing one another. A tightening mechanism is attached to the band in a manner that pulls the opposed ends of the band toward one another, thereby drawing the band radially inward toward the container to firmly hold and sealingly secure the cover to the open end of the container. Two such tightening band configurations are commonly used. A first such tightening band configuration referred to as a "bolt locking ring" (shown at 71) uses a bolt and nut assembly for drawing the ends of the encircling band toward each other. A second commonly used technique is to draw the tightening band ends together by using an over-center lever arrangement (not shown) that draws the band ends together as the lever is pivoted in closing manner toward engagement with the outer surface of the container. Such tightening bands are commonly available from many manufacturers and suppliers of packaging materials. For example, such lever activated tightening band Models T85 or BRG sold under the brand name LEVER-LOC™ are manufactured by Rieise Corporation of Auburn, Ind. Bolt locking rings are available for example, from companies such as Greif, Inc. of Delaware, Ohio.

Figure 16:
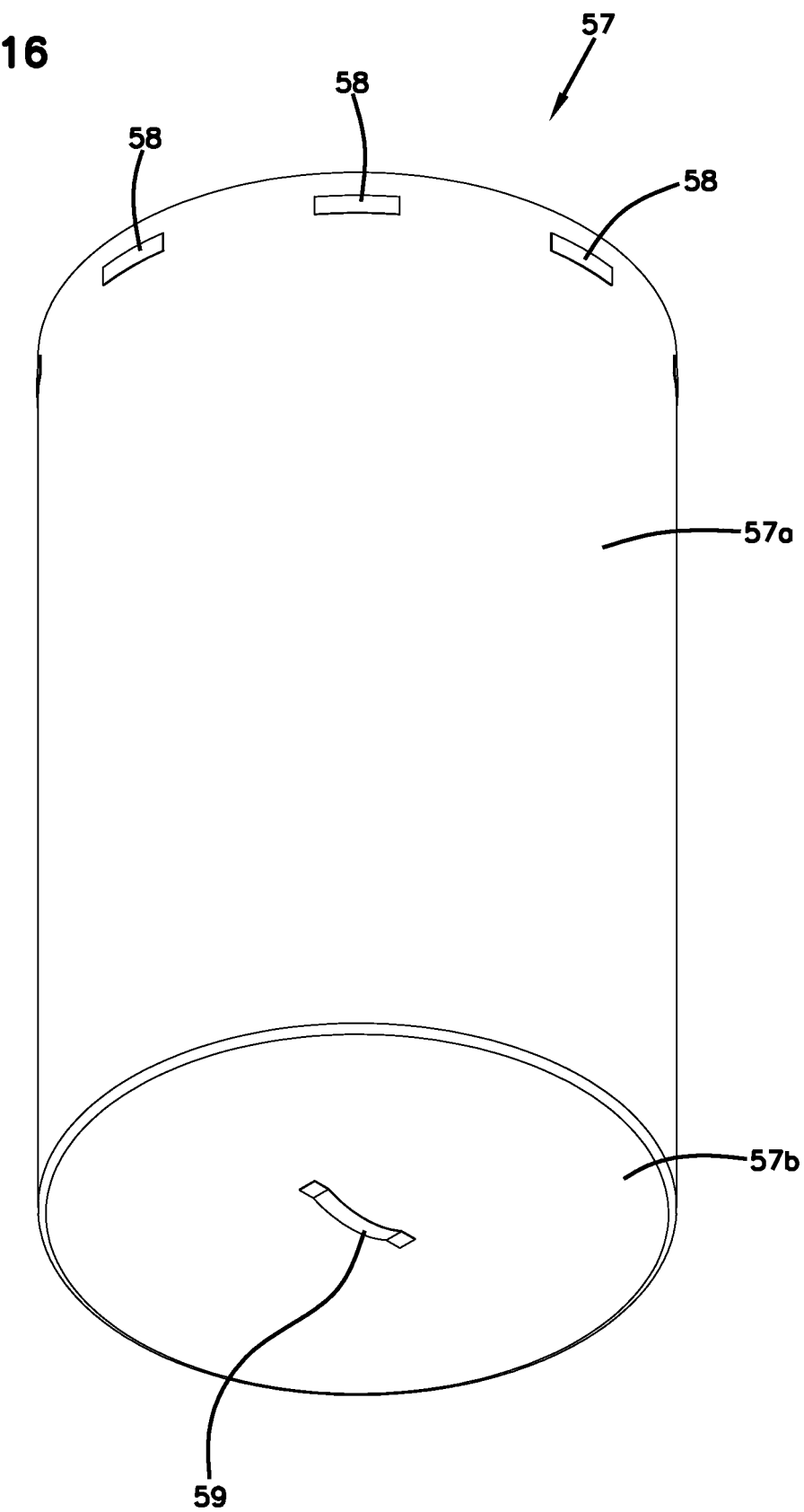
FIG. 16 is a bottom, side perspective diagrammatic view of the woven fabric bag portion of the container assembly of FIG. 1.

A woven fabric support bag 57 configured according to the principles of this invention and usable in the container assembly 10 is illustrated in FIG. 16. The bag has a seamless tubular body 57 *a* and a bottom 57 *b* that is sewn to close the body portion at its bottom edge. The bag material is preferably of woven polypropylene material well known in the art, and is known for its use in making flexible intermediate bulk containers (FIBC's). The woven fabric materials are manufactured in various weights and include food grade fabrics which are usable for food containment applications. The woven polypropylene material is well known for its strength and safety factors. The selected weight and safety factor fabric strength required would be selected according to the particular type of bulk material to be contained, the volume of the bulk material, and the weight that the container assembly would be required to hold. As with fabrics used in the FIBC industry, the fabric material could, for example, be coated or remain breathable, could be treated for ultraviolet retardation, could be configured for weather resistance, or could be of a fabric that complies with the Food & Drug Administration criteria for foods, pharmaceuticals and edibles, and the like. In the preferred embodiment, a plurality of bag support straps or loops 58 are sewn in spaced manner around the outer upper periphery of the bag, and a bottom strap 59 is sewn to the central outer portion of the bottom 57 *b* of the bag. In the preferred embodiment bag configuration shown in FIG. 16, the bag includes eight upper straps 58 equally spaced around the perimeter of the bag which are configured for looping over the four wall hook members 33 *a* and the four upper post receptor hook members 33 *b* of the upper ring 30. The bottom bag loop 59 is configured for attachment to the hook member 23 *a* formed within the downwardly extending cylindrical portion 23 of the base 20. Optionally, a tubular seamless sleeve of woven polypropylene fabric material, without any bottom, could be used by folding over a portion of the sleeve material over the bottom surface of the base 20, to act as a bottom of the sleeve.

An optional plastic liner or bag may be inserted within the fabric support bag 57. The optional liner may be of any appropriate film or sheet of flexible impervious material, preferably polyethylene or polypropylene, to protect the contents of the container system, to prevent leakage of liquids or sifting of powders out of the woven fiber bag 57, or for carrying liquid or slurry bulk materials. Such liners are well known in the art and have been used in the past for both corrugated and FIBC packaging. The liner could include a filling spout and sealing mechanism, as well as a discharge spout. The liner could also be made just thin enough to provide an impervious inner coating or layer to the woven fiber bag 57. Often, where the contents of the shipping container are pumped out of the container during removal, the liner need only be strong enough to allow lifting of any residual product left in the liner following the pumping operation, in order to remove and reclaim the residual materials. While the support bag is reusable and recyclable, the liner bags have optional reuse and are typically discarded or recycled after use.

Poly liner bags used with shipping containers generally are two types. The first type is a poly bag with an open top, and which is large enough such that when inserted into the woven fabric support bag 57, its side walls extend out of the support bag and over and down the outer walls of the container. Such liner bags can be used for loading any type of bulk material (liquid or granular). The bulk material is poured or pumped into the confined open top poly bag held by the container. When the bag is full, the liner's sidewalls are gathered upwards, pinched, twisted, and tied shut, and the cover is then secured to the container. The second type of basic poly liner bags are those that are sealed, where the liner bag itself has an access fitting on one end that is threaded with standard NPS threats. For the container of this invention, the threaded liner access fitting would be screwed into the filling bunghole 67 on the bottom surface of the cover 60, and the cover 60 with the attached liner would then be secured to the container. The bulk material would then be pumped through the bunghole 67 into the poly bag liner. When the liner bag is filled, standard plugs are screwed into both the larger and smaller bungholes 67, 68 to seal the container.

The woven fabric material used to form the support bag 57 can be readily purchased from any supplier of FIBCs such as from B.A.G. Corp. of Dallas, Tex., or from other distributors or supplier such as Tech Packaging Group of Joplin, Mo., or from the National Paper Board Group. Inc. of Burnsville. Minn. The woven fabric bag material is typically graded by weight. A preferred weight of material that is acceptable for most applications is 5.2 oz. Lighter weight materials can typically be used for the woven fabric bag 57 of this invention as compared with FIBC applications, since the bag only needs to support horizontally applied containment forces. The insert liner bags can be purchased generally from the same suppliers that supply FIBCs. The present invention contemplates that the component parts comprising the inventive container assembly will be provided in kit form. The base 20, upper ring member 30, cover 60, post members 45/50 and woven fabric support bag 57 comprise the basic components for assembling a bulk material container configured according to the principles of this invention. The base and cover portions are preferably designed to cooperatively mate with one another when a base is placed or stacked upon the cover. The kit is completed for use by the addition of bunghole closure plugs and a tightening band 70 for securing the cover, which are commercially available parts found in the industry. Depending on the required size and configuration of the container as determined by industry standards, and the types and physical nature of the bulk materials with which the container will be used, the kit may include one or more intermediate support band members 40, and the post members may be longitudinally segmentable into a plurality of interconnecting segments or post members which, when assembled, comprise a unified post member extending from the base to the upper ring. The kit may optionally include one or more bags or containers preferably of waterproof plastic configuration, sized for insertion within the woven fabric bag, for directly holding and sealing the bulk material and for isolating the contained bulk material from the outer woven fabric bag.

The kit components are also preferably sized and configured relative to one another such that they can be assembled to provide an operable container assembly for holding and transferring bulk materials loaded into the container, or disassembled and packaged together in collapsed modular form for shipment or storage in significantly reduced size. Preferably all of the component pans of the collapsed container can be arranged and held within the lower base and protectively packaged between the base 20 and the upper ring 30/cover 60 which collectively interconnect to form a compact storage/shipment module.

Assembly of the Container

The component parts described above with respect to the preferred embodiment construction of a 55-gallon sized drum-type container are readily assembled as follows:

(1) The four lower post members 45 are identified, preferably by their unique color that is different from other posts of the container assembly. The bottom end portions 46 of the lower posts 45 are longitudinally positioned and downwardly inserted into the upper keyed openings 25 *a* of the four lower post receptors 24 of the base. The lower post portions 46 and their two pairs of radially protruding arms or tabs 46 *a* and 46 *b* act as key members that are cooperatively received by the keyed openings 25 defining the downwardly depending keyways of the lower base receptors 24. When the lower posts bottom out in their respective lower post receptors, they are twisted/turned by 90° about their longitudinal axes to lock the lower posts to the base by means of their respective receptors, with their key tab members 46 *a* and 46 *b* being securely locked within the lower and upper openings 24 *e* and 24 *d*, respectively, as shown in FIG. 17D. In their locked configurations, all of the key tab portions 46*a*, 46 *b*, 47 *a* and 47 *b* of the assembled lower posts lie in planes radially passing through the central axis of the circular base member 20.

(2) The intermediate band 40 is curved to form its circular shape as shown in FIG. 12A, with its end connector portions 43 and 44 axially aligned with one another. In such circular configuration, the band is then slid down over the top and intermediate portions of the upright lower posts, with the intermediate axial post guide portions 42 and the end post guide portions 43/44 of the intermediate band 40 being cooperatively slid down over the upper and intermediate portions of the lower posts 45 until the lower surfaces of the descending band post guide sleeves engage and are retainably supported by the annular seats 49 of the lower posts. The intermediate band 40 is shown in its fixed supported position on the lower posts 45 in FIGS. 6 and 12D.

(3) The four upper post members 50 are next identified, preferably by their color and are, respectively, longitudinally aligned with the upper ends 47 of the upright lower posts 45 that are projecting through and above the intermediate band 40. The keyed receptor ends 53 of the upper posts are cooperatively slid over the projecting key tabs 47 *a*, 47 *b* of the lower posts. The upper posts 50 are lowered until the lower ends 53 *c* of the upper post receptors cooperatively engage the upper seats 48 of the lower posts. At this position, the planes of the key tabs 51 *a*, 52 *a* of the upper posts will lie in planes perpendicular to the planes of the key tabs 46 *a*, 46 *b*, 47 *a* and 47 *b* of their respective lower posts. At this stage, the upper protruding tab pairs 51 *a* and 52 *a* of the upper posts lie in planes generally tangential to the outer periphery of the base 20, and the lower post key tabs 47 *a*, 47 *b* are not engaged in locking manner to the receptor portion 53 of the upper post 50.

(4) The upper ring 30 is next aligned such that its lower keyed openings 34 *a* of its four upper post receptors 32 are longitudinally axially aligned with the upper ends 51 of the upper posts. The upper ring is then slidably lowered over the upper post distal ends with the upper post tab key projections 51 *a* and 52 *a* being slidably accepted within the receptor keyways 34 of the upper ring. The upper ring 30 comes to rest on the upper posts when the upper seat portions 54 of the upper posts engage the lower surfaces of the first intermediate plates 32 *b* of their associated upper ring receptor members 32, and the upper wall surfaces 32 *d* of the upper post receptor members 32 come into contact with the upper distal ends of the upper posts. In such position, the upper ring 30 is in proper position to be locked to the upper posts.

(5) The upper posts 50 are simultaneously locked to the lower posts 45 and to the upper ring 30 by twisting in turn each of the upper posts 50 by 90° in a clockwise direction as viewed from above, until the key tabs 51 *a* and 52 *a* of the upper posts are configured as shown in FIGS. 17A and 17B. The assembled and locked base 20, upper ring 30, intermediate band 40, and lower 45 and upper 50 posts now form a unified framework as shown in FIG. 6 (without the cover 60), that defines an internal geometric volume shape into which the woven fabric bag 57 can be placed.

(6) The woven fabric bag 57 is positioned within the container framework through the open upper end of the upper ring 30. The eight upper support loops 58 of the bag are attached to the upper ring hooks 33 *a* and 33 *b*, and the lower loop 59 on the bag bottom 57 *b* is attached to the lower hook 23 *a* of the base 20. The container assembly is now ready for receiving bulk materials.

An optional poly bag that is impervious to moisture can be inserted within the woven fabric bag 57 if desired, to contain liquid or semi-solid materials and/or to otherwise isolate the fabric bag from direct contact with the bulk material to be contained, or to protect the bulk material to be contained from environmental moisture.

(7) The top cover 60 can be secured to the container assembly either before or after the bulk contents are loaded into the container, depending upon the type and nature of the bulk material to be inserted into the container. When loading granular or particulate solid materials into a container, it is usually desirable to attach the cover as the final step. When pumping liquid bulk material into the container, it may be desirable to first attach the cover 60 to the upper ring of the assembled framework depending upon the type of liner bag used and the filling technique employed. The cover 60 is attached to the upper ring 30 by aligning the lower projection 61 of the cover with the holes 37 in the upper flange 31 *b* of the upper ring and then lowering the cover and projecting tabs 61 into engagement with the upper flange of the upper ring until the two come into sealing engagement. As previously described, when the cover is operatively engaged with the upper ring, the projection members 61 prevent turning of the assembled post members, thereby retaining the framework 12 in a unified locked configuration. The cover 60 is retainably secured to the upper ring by fastening the tightening band 70 around the outer periphery of the cover and upper flange of the upper ring, in a well-known manner. Liquid bulk materials may be pumped into and removed from the container through the bungholes 67 and by using the bunghole 68 to control the internal air pressure within the containers. Liquid to be contained may also be pumped into an impervious insert bag that has its own filling spout and sealing mechanism as described above. The filling spout can be connected to or passed through the larger cover bunghole 67. Alternatively, the impervious insert bags could be filled at separate filling stations, which is an industry practice for high volume processors, and then sealed and placed into the container before its cover is secured to the container assembly.

Collapsible/Disassembly and Stacking

An empty assembled container assembly (i.e., no bulk materials remain within the container) can be rapidly disassembled or broken down into its collapsed form, generally as follows. The tightening band 70 is removed from engagement with the cover 60 and upper ring 30 freeing the cover for removal from the container assembly framework 12. The cover is removed by lifting it longitudinally upward from the upper ring, which enables turning of the upper posts, and exposes the woven fabric bag 57. If an insert liner bag has been inserted into the woven fabric bag, the insert bag can be removed from the woven bag for recycling or cleaning for subsequent reuse, or can remain within the woven bag for removal therewith. The woven fabric bag 57 is removed from the container framework 12 by disengaging its upper peripheral loops 58 from engagement with the upper ring hooks 33 *a*, 33 *b*, and the bag's bottom loop 59 from engagement with the base bottom hook member 23 *a*. The bag can then be lifted and removed from the container assembly framework 12. The upper posts 50 are rotated by 90° in a counterclockwise direction, which releases the upper ring receptors 32 from locking engagement with the upper posts 50 and enables removal of the upper ring 30. The upper ring 30 is removed by lifting it upwardly, freeing it from engagement with the upper posts. The upper posts are then longitudinally lifted to free them from engagement with the lower posts 45. As the upper posts 50 are raised, the lower receptor portions 53 of the upper posts 50 are lifted out of engagement with the top portions 47 of the lower posts 45, freeing the intermediate band 40 for removal from the lower posts. The intermediate band 40 is lifted upwardly and disengaged from the lower posts 45. The lower posts 45 are then rotated by 90°, unlocking them from the base receptors 24. The lower posts can then be lifted out of engagement with the receptors 24 of the base 20, freeing the lower post members 45 from the base 20. All of the container components are now in disassembled form. The component parts can now be gathered for configuration of the container assembly in its modular collapsed configuration.

Figure 18:
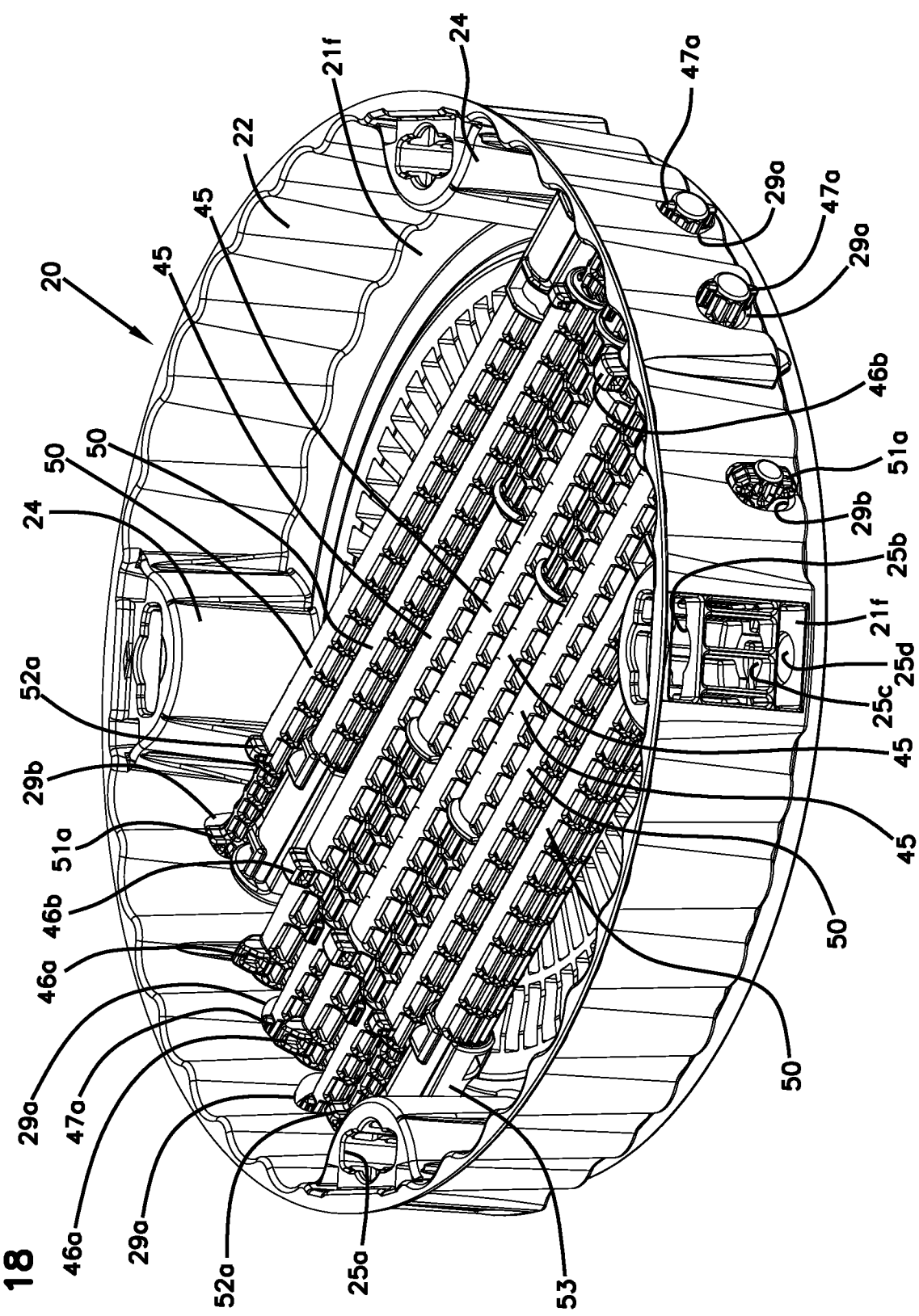
FIG. 18 is a top, side perspective view of the base member in unassembled configuration, showing storage placement of the upper and lower post members therein.
Figure 22:
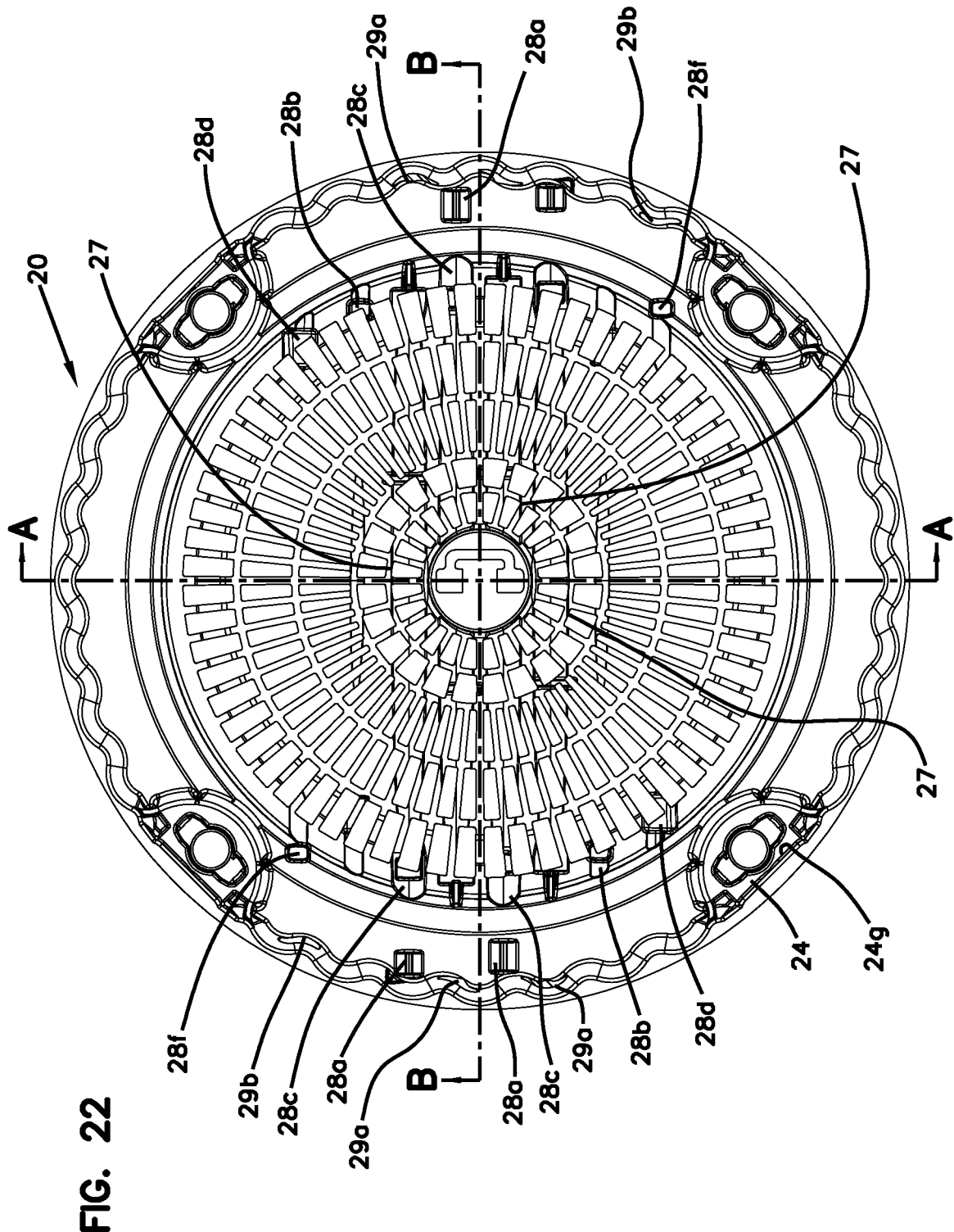
FIG. 22 is a top plan view of the base portion of the container assembly of FIG. 1.
Figure 23:
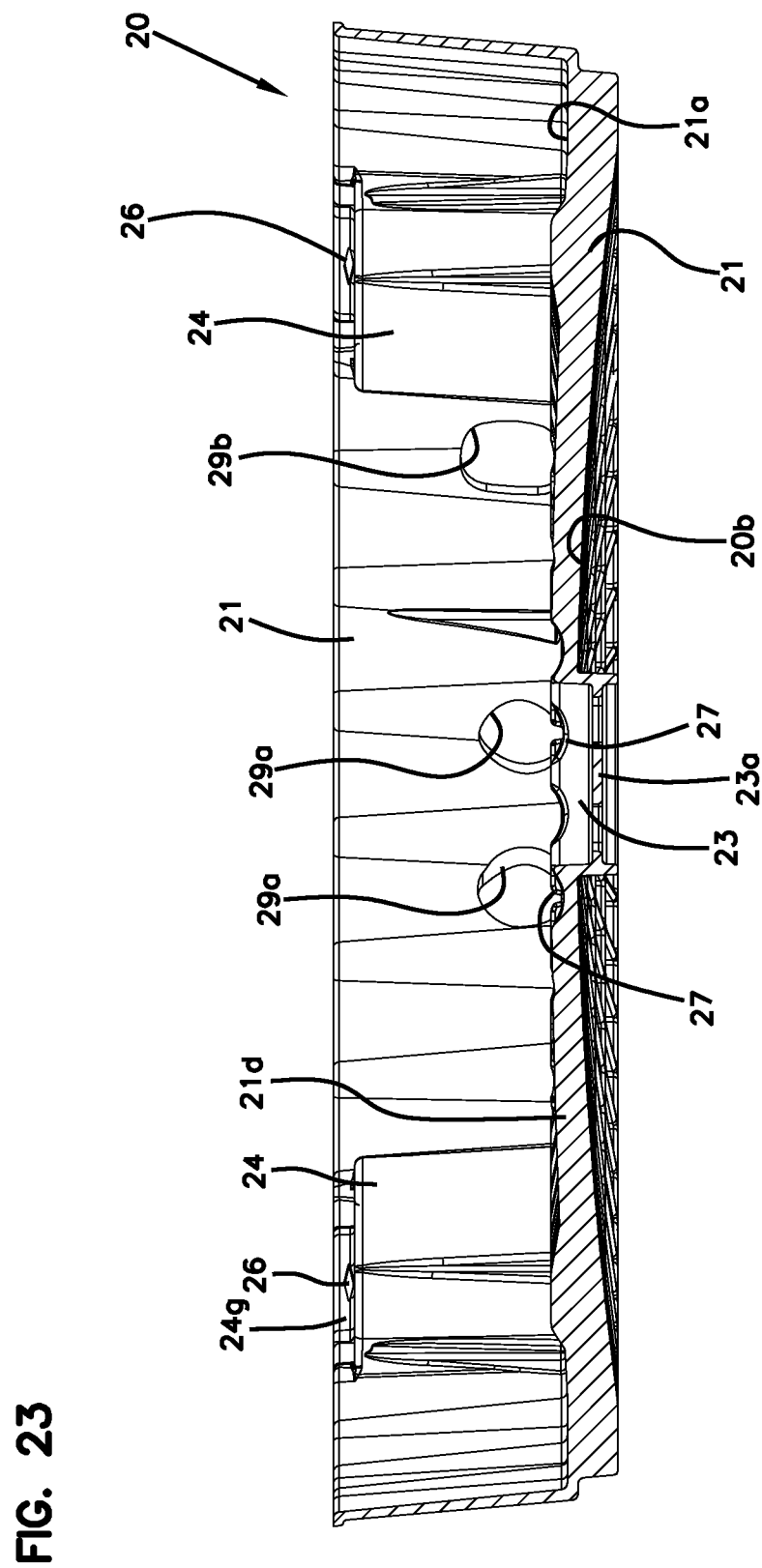
FIG. 23 is a cross-sectional view of the base of FIG. 22, taken generally along Line A-A of FIG. 22.

In a preferred embodiment, the component parts of the container assembly are configured such that they can be encapsulated within a compact module holding all of the component parts of the container assembly. The base 20 of the container is sized, shaped, and configured so as to retainably hold, in ordered aligned arrangement (as shown in FIG. 18), all of the lower and upper post members 45 and 50, respectively. The base 20 is configured with a plurality of internal indentations formed within the upper surface 21 *a* of its bottom for retaining the lower and upper post members in a prearranged ordered pattern along the bottom of the base. The concentric rings 21 *c* and connecting ribs 21 *d* forming the upper surface 21 *a* of the base bottom 21 are laterally grooved across the upper surface 21 *a*, as generally shown in FIG. 22 by the lateral lines 27 extending across the bottom 21. The lines 27 represent concave arcuate curved grooves laterally extending and molded into the base bottom 21 for receiving the rounded side portions of the lower and upper posts 45, 50. The bottom surface of the base 20 further includes a plurality of deeper indentations, generally indicated at 28, for cooperatively receiving the projecting key member portions or the lower receptor portion 53 of the upper post members 50. Referring to FIG. 22, in combination with the FIG. 18 illustration of the side-by-side placement of the upper and lower post members within the base, the larger indentations identified at 28 *a*, for example, are sized and configured to cooperatively receive one of the lowermost projections 46 *a* of the lower post members 45. The deeper indentations referred to at 28 *b* are sized and configured to receive the distal end portions of the keyed projections 52 *a* of the upper post 50. The indentations 28 *c* are sized and configured to cooperatively receive the keyed projections 46 *b* of the lower post 45. The indentations designated at 28 *d* are configured to cooperatively receive the outer peripheral surface of the bottom receptor 53 portions of the upper posts 50.

The outer peripheral wall 22 contains a plurality of holes 29 formed therethrough for cooperatively receiving end portions of the upper and lower posts when configured in their storage positions illustrated in FIG. 18. There are three such holes located on opposite sides of the base member.

Each of the six holes is configured to retain an end of different ones of the support posts 45, 50. Two of the holes on each side, which are located closer to one another, and labeled as 29 *a* are aligned with the groove and indent portions 27 and 28 formed in the base to receive the lower post members 45, and cooperatively receive the upper end portions of the lower post members 45. The third holes on each side are aligned with the radially outermost grooves and indentations of the base bottom which receive upper post members 50, and are sized and configured to cooperatively receive the uppermost portion of two of the upper post members. Two of the upper post members 50 that are shown in FIG. 18 as lying adjacent to the outermost upper post members 50, do not have corresponding holes for enabling projection of any portion of such retained upper post members, since the inner diameter of the base 20 is sufficiently large where they are retained, to completely accommodate storage of such upper post members 50 inside of the inner confines of the base 20. The grooves and indentations formed within bottom of the base 20, in cooperation with the holes 29 formed through the outer wall of the base 20, enable a user to rapidly orient and place the upper and lower post members in cooperative retention within the base member as shown in FIG. 18, for storage and transport.

Figure 25:
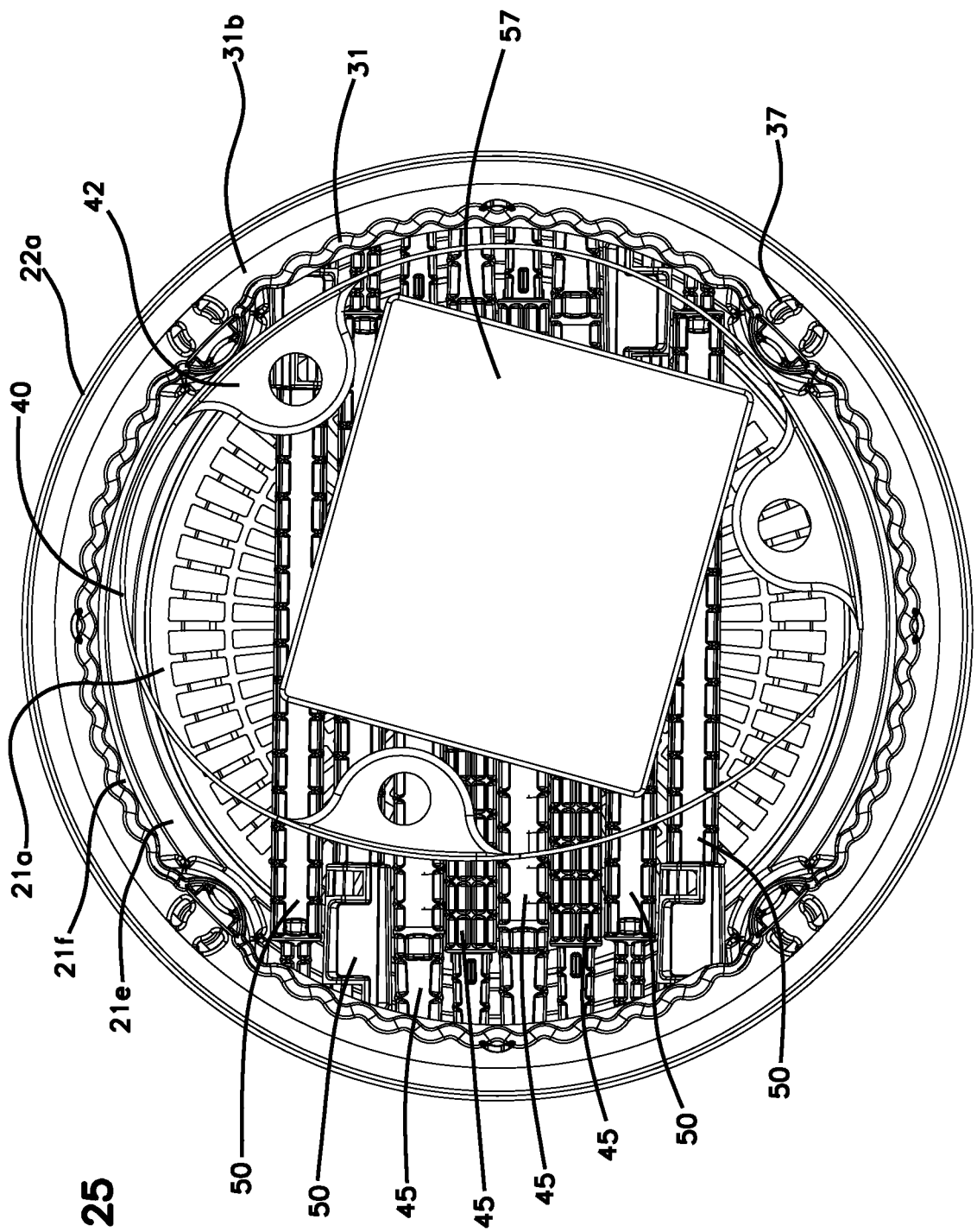
FIG. 25 is a diagrammatic view showing the container assembly of FIG. 20A in collapsed modular configuration with the top cover removed to show the post members, intermediate band, and woven fiber bag components packaged within the outer protective sheath formed by the base and upper ring portions of the container.

The outer containment perimeter of the container assembly in its collapsed modular form is formed by the lower base member 20, the upper ring member 30, and the cover 60, which is attached to the upper ring 30 by means of the well-known tightening bands 70. As stated above, before the collapsed module is secured together, the upper and lower post members 50, 45 are securely retained within the lower base portion 20. The intermediate band member 40 is folded along its living hinge portions to a collapsed form and placed within the base 20 upon the retained post members, along with the woven fabric bag 57, which is first folded into a compact shape. FIG. 25 diagrammatically illustrates the container assembly shown in collapsed form, without the attached cover, but with the upper ring 30 cooperatively inserted within the base 20, and the upper and lower posts, intermediate band, and woven bag protectively inserted within the inner cavity collectively defined by the upper ring and base member.

Figure 19A:
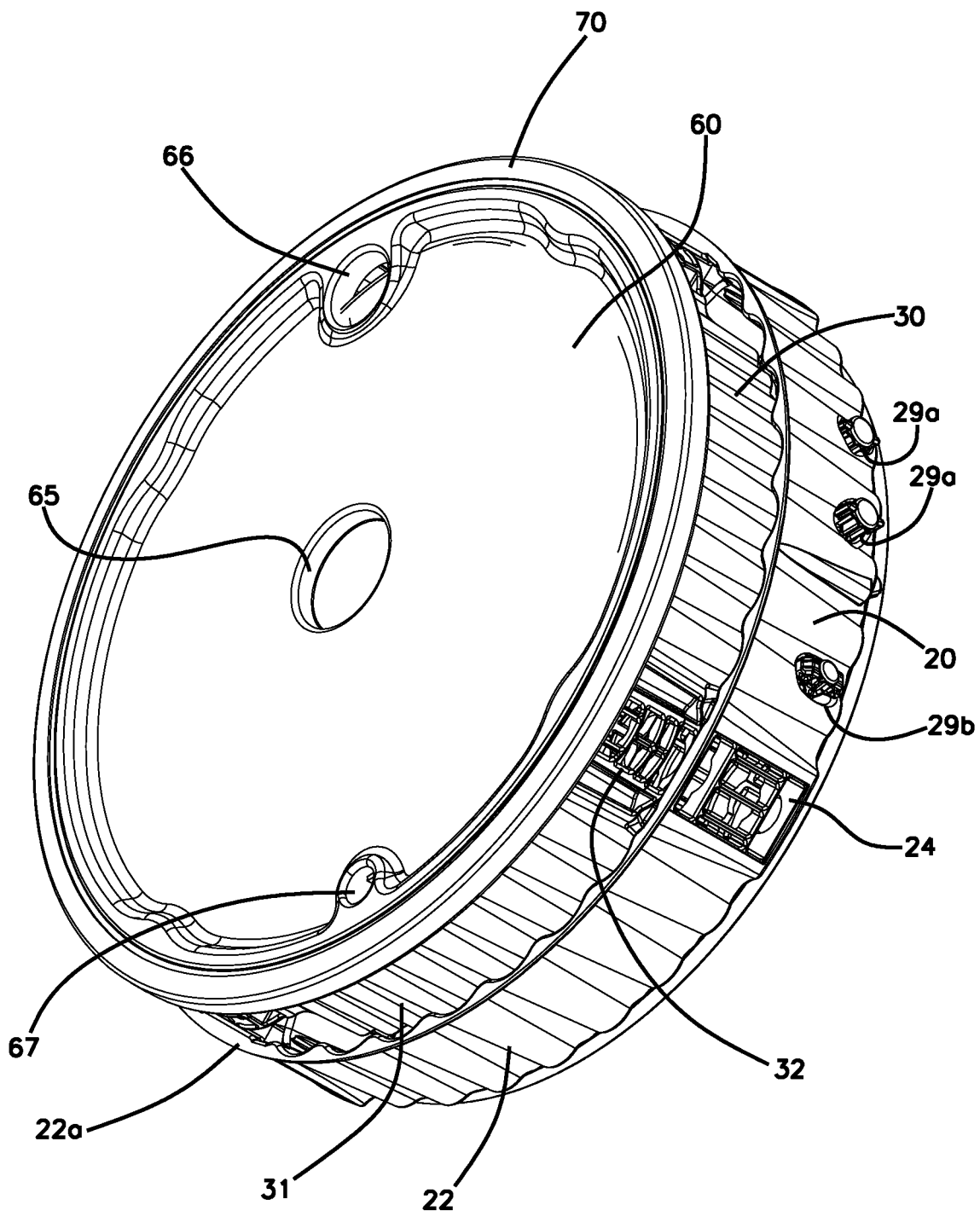
FIG. 19A is a top, side perspective view showing the container assembly of FIG. 1 in collapsed modular configuration for storage or transport.
Figure 19B:
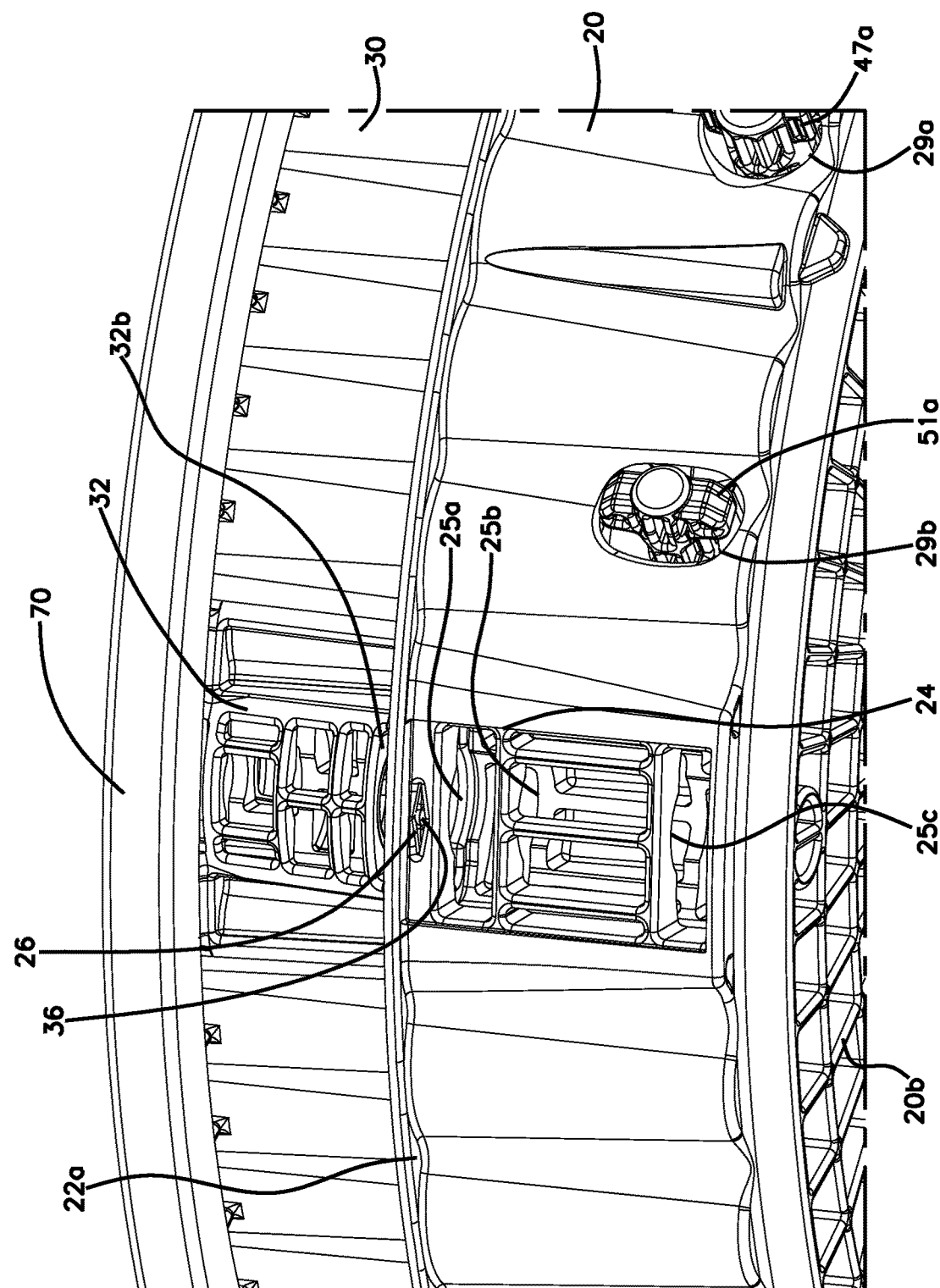
FIG. 19B is an enlarged fractional view illustrating the interconnection of the base and upper ring member portions of the collapsed container assembly of FIG. 19A.

The upper ring 30 and the lower base 20 are cooperatively designed to mate with one another in forming the collapsed container module. The peripheral corrugated wall 31 of the upper ring 30 is sized and shaped to cooperatively slide within and mate with the inner surface of the base corrugated wall 22 when the upper post receptors 32 of the upper ring 30 are in longitudinal alignment with the lower post receptors 24 of the base 20, as shown in FIGS. 19A and 19B. As the upper ring 30 is slid downwardly into cooperative mating registration with the base member 20, the lower seat edge members 31 *a* of the four downwardly extending corrugated wall portions 31 of the upper ring 30 are slidably received within the mating corrugations of the upwardly extending base wall 21. When the lower plate members 32 *a* of the upper post receptors 32 of the upper ring downwardly enter into the upper portion of the base receptors 24, the radially outermost protrusion member 36 of the lower plate member 32 *a* forcibly frictionally engages the inner wall surface of the wall portion 24 *g* of the lower base causing the outer wall to flex slightly radially outward as the projection 36 slides downwardly along the wall. When the projection 36 downwardly progresses to the diamond-shaped opening 26 in the wall 24 *g*, the protrusion 36 rapidly slides, in snap-fit manner, into the diamond opening 26 to secure the upper ring 30 to the base 20. The upper ring 30 and base 20 may be cooperatively slightly twisted relative to each other during the mating movement to facilitate the snap-fit connection. Since there are identical cooperatively mating snap-fit members on each of the upper and lower receptors, the upper ring 30 is secured to the base 20 at each of the four receptor areas located around the periphery of the container. An enlarged view of the post receptor portions of the base and upper ring members shown in locked configuration is illustrated in FIG. 19B. The snap-lock fit mechanism described above is configured relative to the base 20 and upper ring 30 such that, as the locking protrusions 36 engage the diamond-shaped openings 26, the lower edges of the downwardly depending intermediate wall portions 31 of the upper ring 30 simultaneously cooperatively engage and seat upon the outer land portion 21 *f* adjacent the inner periphery of the corrugated walls 22 of the base 20.

Figure 20A:
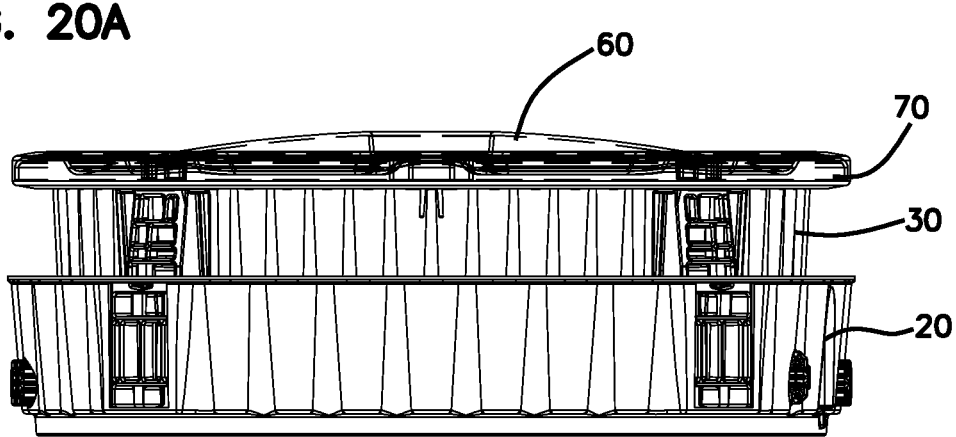
FIG. 20A is a side elevation view of a single container in collapsed interlocked configuration.
Figure 20B:
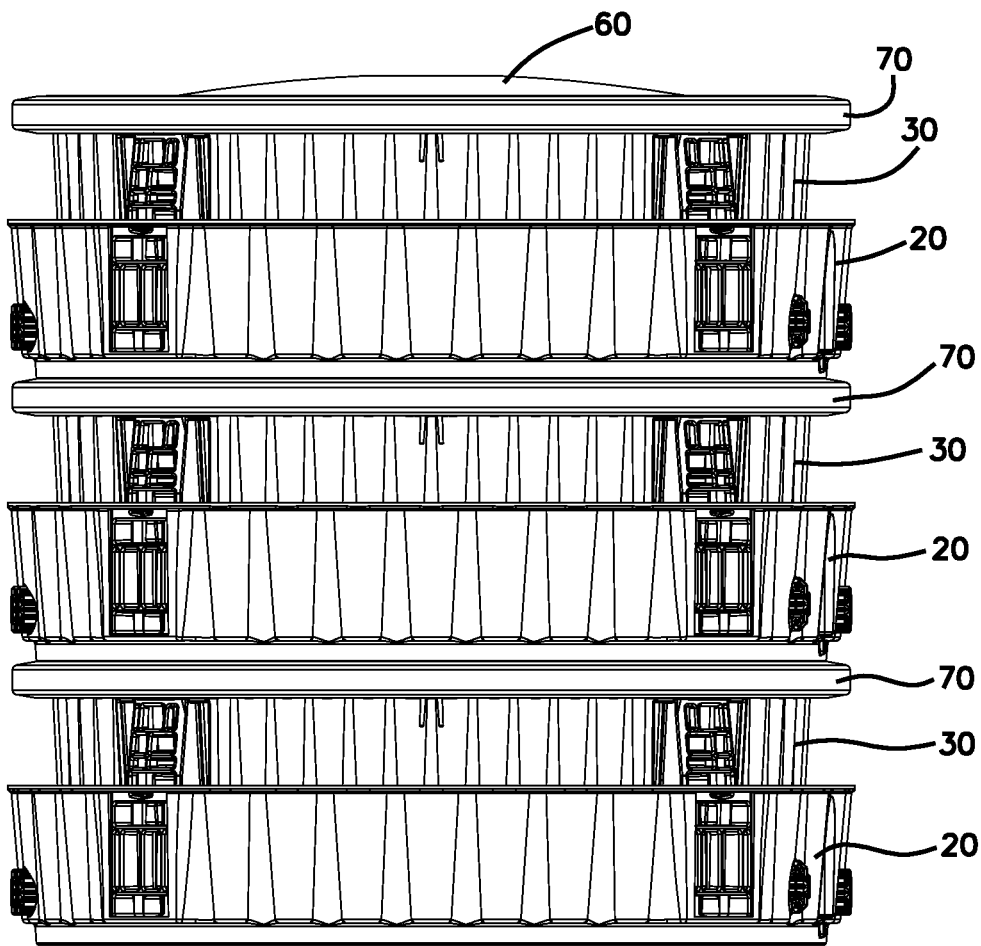
FIG. 20B is an illustration showing a plurality of the collapsed container module assemblies of FIG. 20A, in stacked configuration.

The top cover 60 can now be secured to the upper ring 30 as described above by means of a tightening band 70 to form a closed module containing all of the parts of the container assembly, for shipment and/or storage in a manner such that the container assembly parts face minimum risk of damage or loss. An assembled container assembly in a collapsed mode is illustrated in FIGS. 19A and 20A. The container assembly in its collapsed mode is suitable for stacking in the same manner as previously described with respect to the assembled container. Referring to FIG. 20B, a plurality of the collapsed modular container assemblies are shown stacked upon one another, wherein the radially indented portion of the base member cooperatively seats on the peripherally molded depressed portion of the cover's upper surface, with the upwardly convex portion of the cover 60 cooperatively engaging the lower concave curved surface of the bottom of the base 20, and the centrally downwardly projecting cylindrical portion 23 of the base member cooperatively slidably fitting within and engaging the axially indented cylindrical region 65 of the upper cover.

Obviously, the upper cover 60 could also be attached to the upper ring 30 prior to securement of the upper ring to the base member. To detach the upper ring (with or without the cover 60) from the lower base member when in secured modular collapsed configuration, one needs simply to twist the upper ring member slightly relative to the lower base to release the snap-fit engagement between the upper ring protrusions 36 and the diamond-shaped receptor holes 26 of the base 20.

Figure 26:
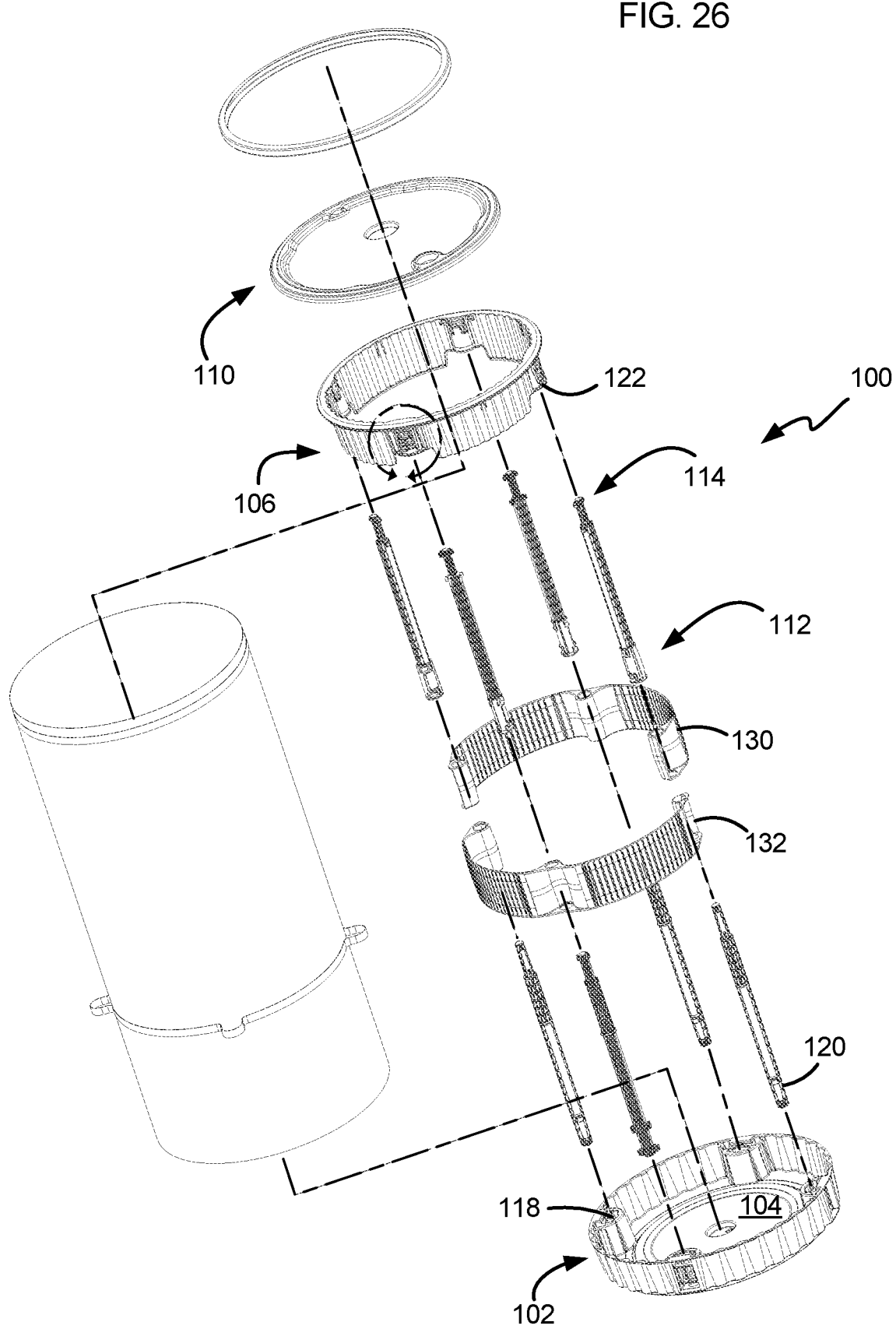
FIG. 26 is an exploded perspective view of an alternative embodiment of the container assembly of FIG. 1.
Figure 27:
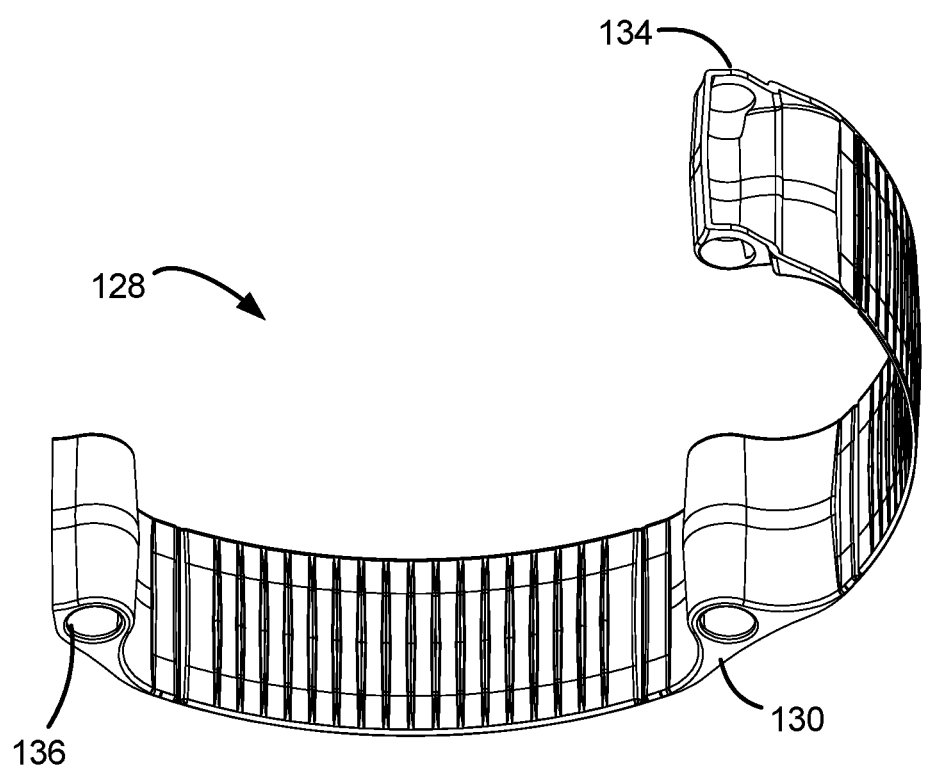
FIG. 27 is a perspective view of the intermediate band portion of the container assembly of FIG. 26, shown in a first orientation.
Figure 28:
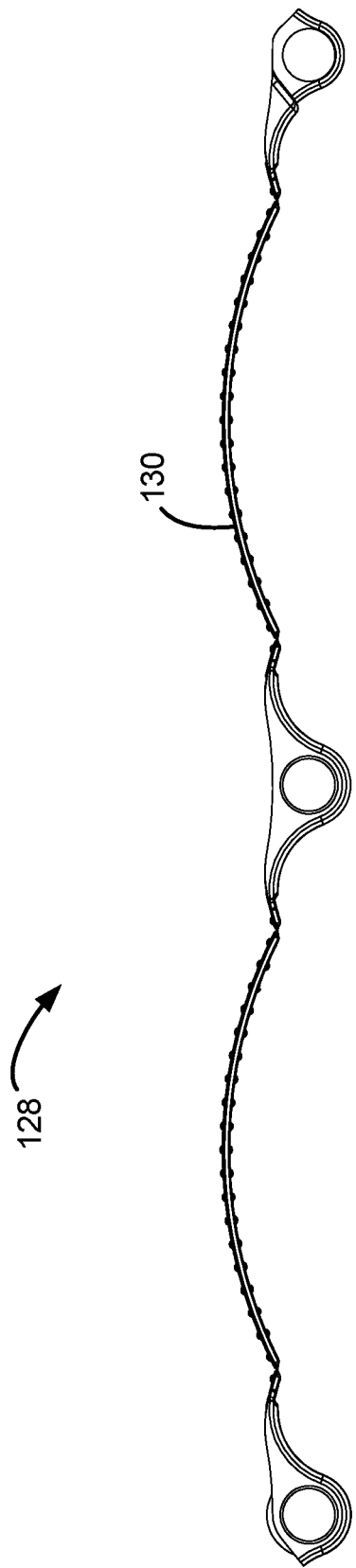
FIG. 28 is a perspective view of the intermediate band portion of the container assembly of FIG. 26, shown in a second orientation.
Figure 29:
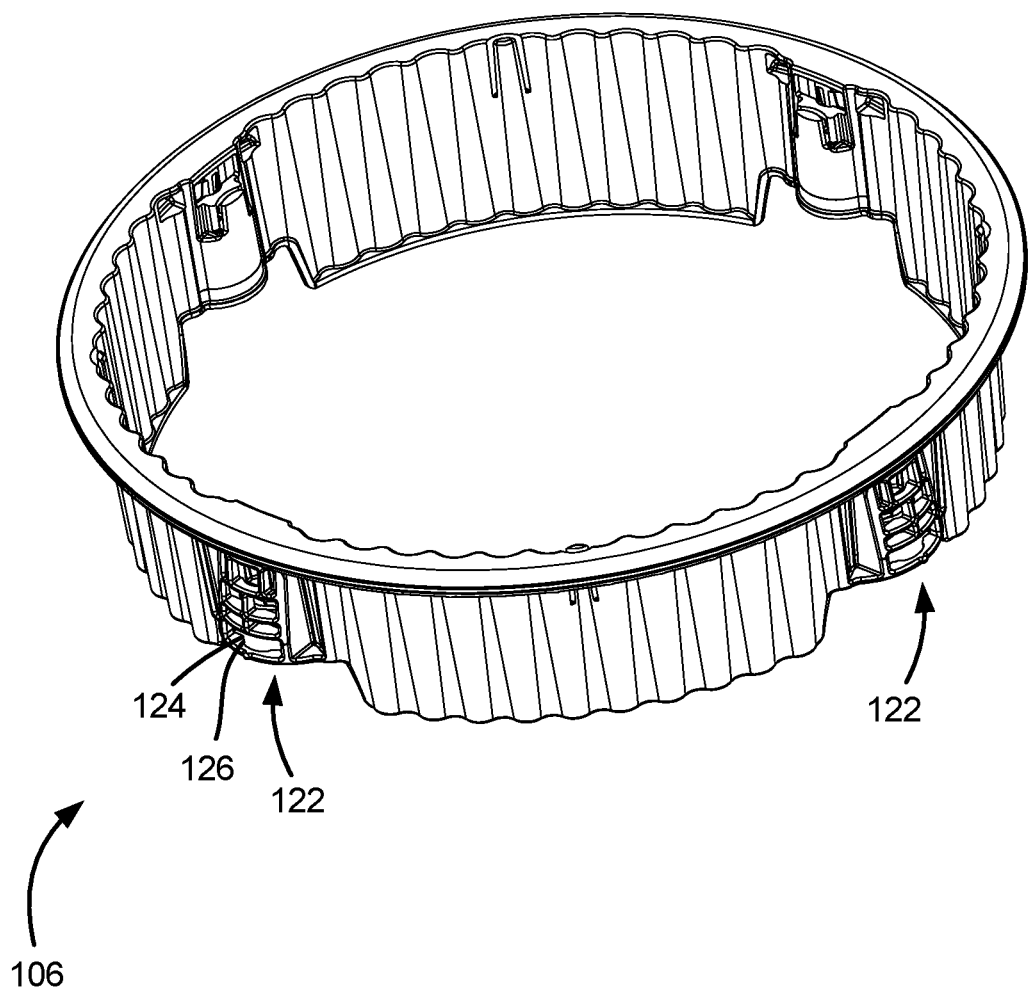
FIG. 29 is a perspective view of the upper ring portion of the container assembly of FIG. 26.
Figure 30:
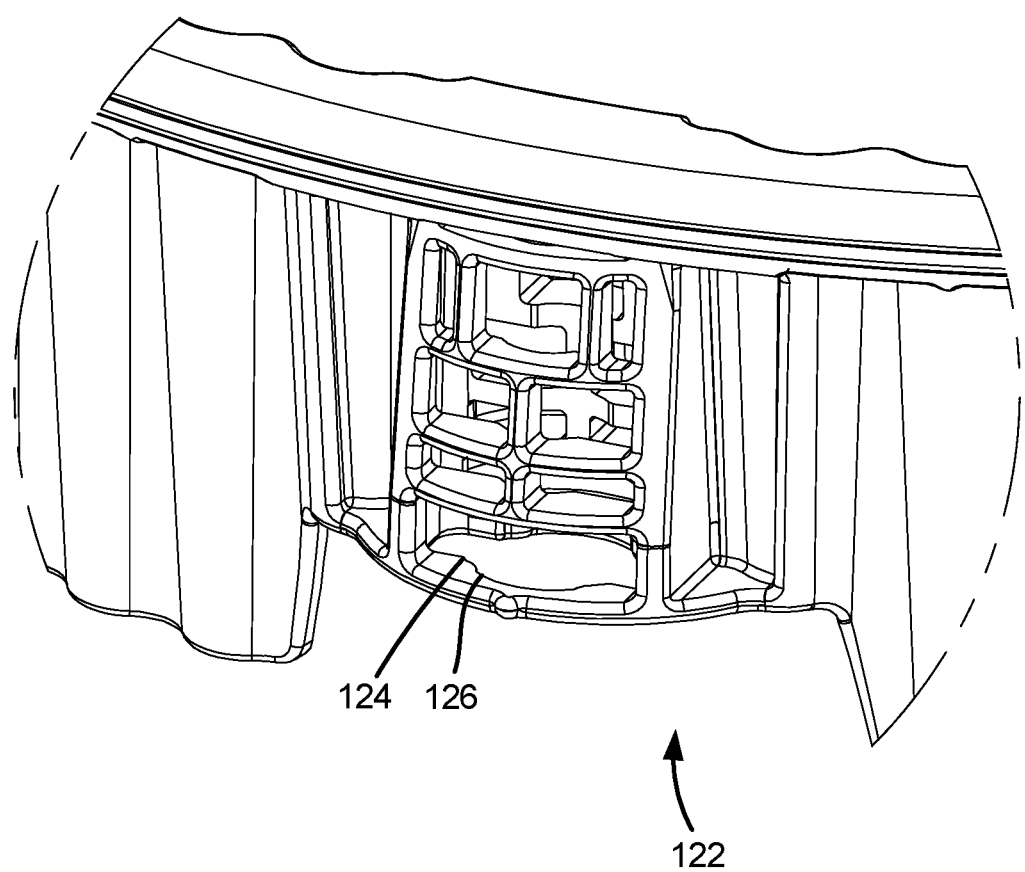
FIG. 30 is an enlarged portion of FIG. 29.
Figure 31:
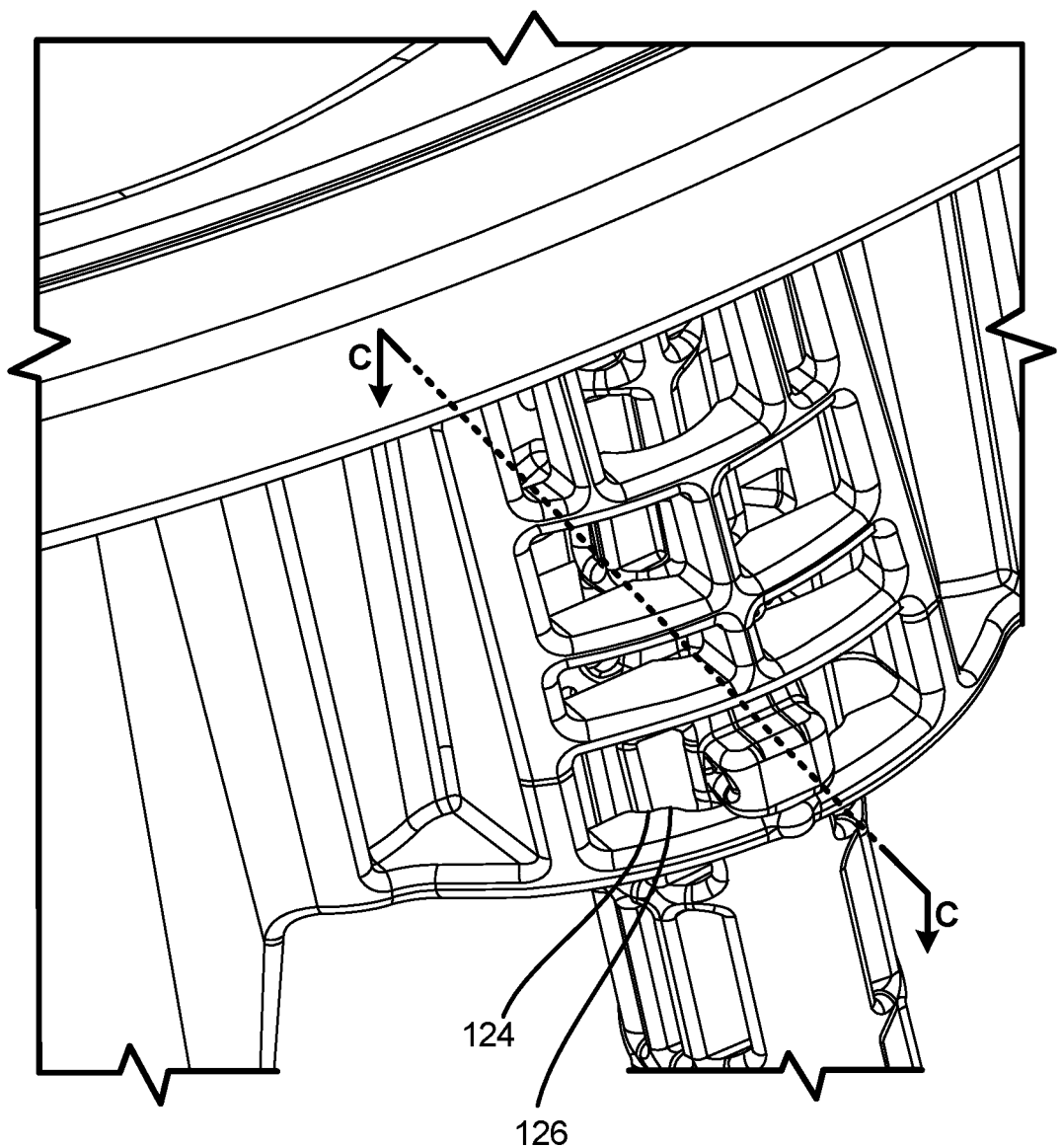
FIG. 31 is an enlarged perspective view of an upper post connection portion of the upper ring, viewed from the outside of the ring, showing the upper post members in locked position within the ring.
Figure 32:
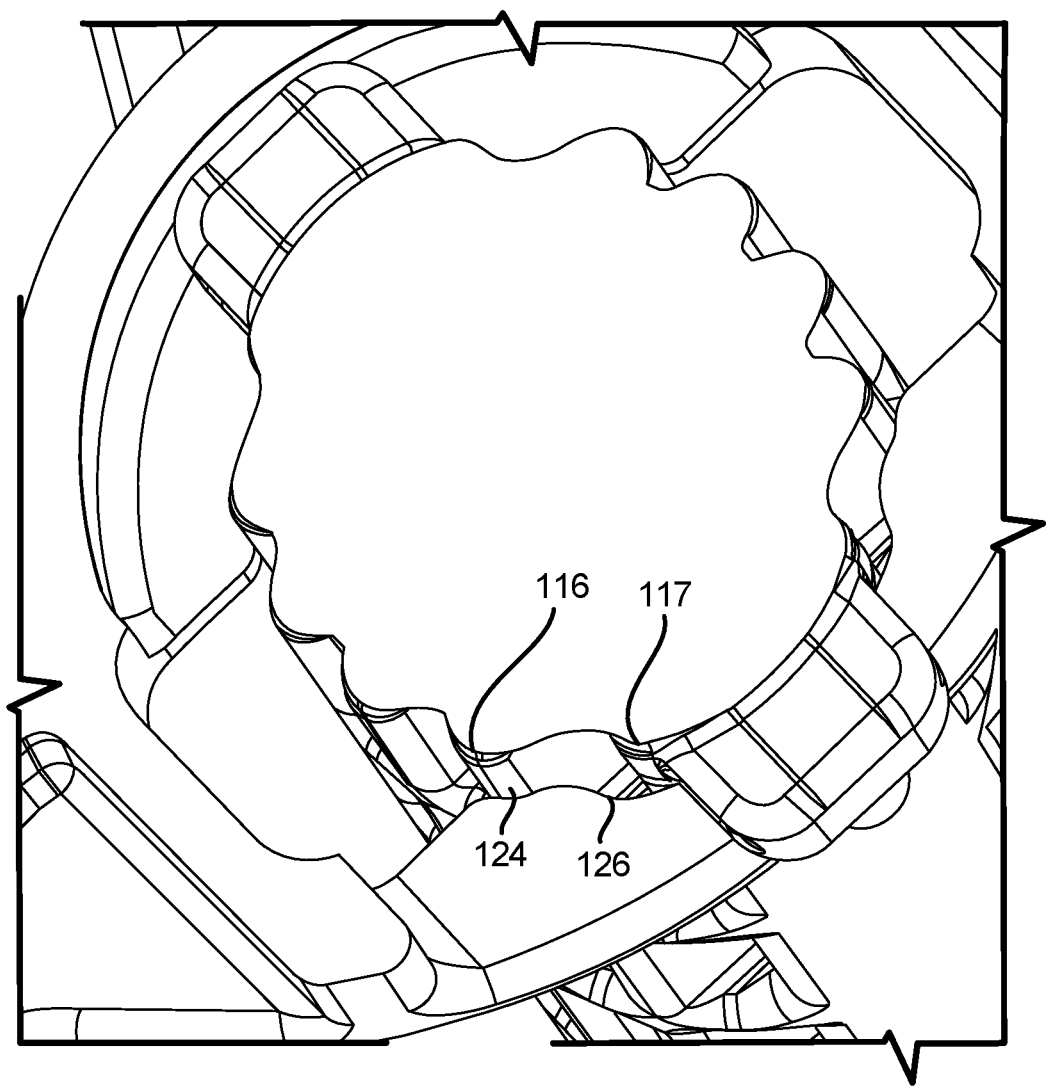
FIG. 32 is a cross-sectional view taken along Line C-C of FIG. 31.
Figure 33:
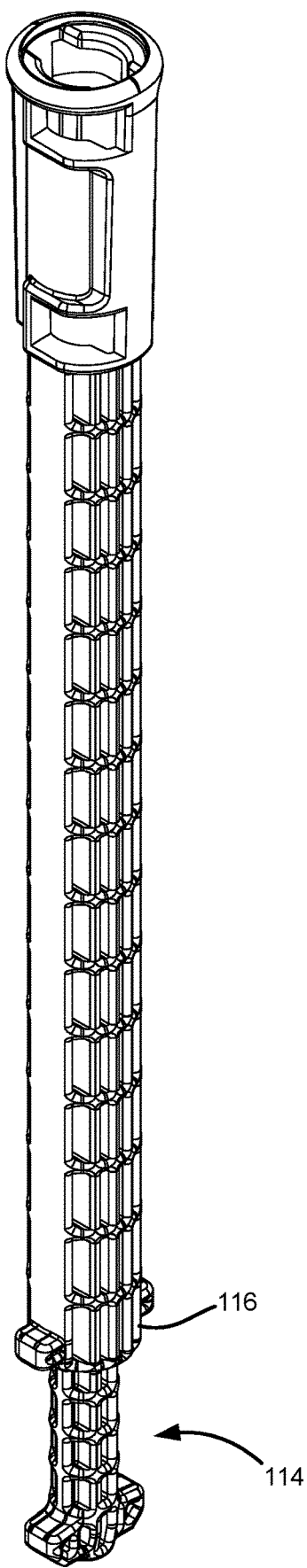
FIG. 33 is a perspective view of a post member of the container assembly of FIG. 26.

Referring to FIGS. 26-33, an alternative embodiment of the container assembly of the present disclosure is described herein in further detail. A container assembly 100 of the alternative embodiment shares many common features of the container assembly of the embodiments described above. Similar or identical structures of the present embodiment are not described again herein. Instead, the description below focuses on the differences between the alternative embodiment and the embodiment described and shown elsewhere herein. Referring to FIG. 26, the container assembly 100 includes a rigid collapsible framework defining an internal geometrically shaped volume. The rigid collapsible container 100 includes a rigid base 102 having a footprint perimeter defining a first closed geometric shape. The rigid base 102 has a bottom portion with a broad upper surface 104. The rigid base 102 has a strength sufficient to support a charge of bulk material.

The container assembly 100 includes a rigid upper member 106 having a perimeter defining a closed geometric shape similar to that of the rigid base 102. The upper member 106 defines an opening therethrough suitable for receiving the charge of bulk material.

The container assembly 100 includes a plurality of rigid post members 112 detachably fixedly connecting and peripherally extending between the rigid base 102 and said rigid upper member 106 to form a rigid framework.

The container assembly 100 includes a woven fabric sleeve sized and configured to operatively fit within the internal geometrically shaped volume of said framework. The sleeve has a closed bottom or has a lower open end that can be positioned in a folded manner on the broad upper surface of the rigid base 102 bottom portion to form a bottom and has an open upper end for receiving said charge of bulk material into the sleeve. The sleeve has a strength and bulge resistance parameters suitable for containing the charge of bulk material of a quantity that would substantially fill the internal geometrically shaped volume. The sleeve can have a number of different constructions. For example, the sleeve can have a construction of the sleeves disclosed in U.S. patent application Ser. No. 16/218,034, filed Dec. 12, 2018, and titled "COLLAPSIBLE BULK MATERIAL SLEEVE AND CONTAINER", which application is hereby incorporated in its entirety.

The container assembly 100 includes one or more connectors cooperatively configured on the upper member and the sleeve. The connectors detachably connect the sleeve to the upper member with the open upper end of the sleeve being in operative alignment with said opening in said upper member. The container assembly 100 also includes a cover 110 that can be securable to the upper member to selectively close the opening in the upper member.

In the depicted embodiment, the post members 112 have oppositely disposed first ends 120 and second ends 114. The second end 114 of the post member includes a spinal protrusion 116. The rigid base 102 includes a plurality of lower receptors 118 for detachably receiving respective ones of said first ends 120 of said post members.

In the depicted embodiment, the rigid upper member 106 includes a plurality of upper receptors 122 for cooperatively detachably receiving respective ones of the second ends 114 of the post members 112. In the depicted embodiment, the upper receptors 122 include a ramp 124 adjacent a shoulder 126. The ramp 124 and shoulder 126 are configured to be driven into contact with the spinal protrusion 116 of the post member 112 when the post member 112 is rotated about its longitudinal axis from an unlocked position to a locked position.

In the depicted embodiment, the ramp 124 has a more gradual edge profile as compared to the shoulder 126. As a result the act of rotating the spinal protrusion 116 from in front of the ramp (i.e., the unlocked position) to a location past the shoulder 126 (i.e., the locked position) requires less torque than rotating the spinal protrusion in the reverse direction from the location past the shoulder 126 (i.e., the locked position) down the ramp 124 to the unlocked position. The shape of the ramp and shoulder together work with the protrusion 116 to create a locking function. Once locked, it is unlikely that the post will inadvertently become unlocked.

In the depicted embodiment, the container assembly, further comprising an intermediate band 128 engaged with the post 112. In the depicted embodiment, the intermediate band 128 includes a first portion 130 and a second portion 132. The first portion 130 and said second portion 132 include interlocking end portions 134, 136. In the depicted embodiment, the interlocking end portions 134, 136 of the intermediate band member 128 define apertures in which the post 112 passes through.

The present disclosure also provides a kit for assembling a collapsible container suitable for supporting bulk material for storage or transport. In the depicted embodiment, the kit includes a rigid base 102 having a footprint perimeter defining a first closed geometric shape. The rigid base post receptors 118 are arranged about the perimeter. The kit includes a rigid upper member 106 having a peripheral shape generally the same as that of said base footprint perimeter and defining an opening therethrough. The upper member 106 includes upper receptors 122 arranged about its perimeter.

In the depicted embodiment, the kit includes a plurality of post members 112 having opposed bottom end portions and top end portions. The bottom end portion are configured to mate with the post receptors 118 of the rigid base 102 and the top end portions are configured to mate with the post receptors 122 of the rigid upper member 106. The upper 106, base 102, and post 112 cooperatively defining an internal geometrically shaped volume.

In the depicted embodiment, at least one of the plurality of post members 112 includes a spinal protrusion 116 at its top end portion. In the depicted embodiment, the top end portion of the post member 112 includes a plurality of spinal protrusions around its periphery. The spinal protrusion 116 is received within a locking assembly of said post receptacle such that, when the post member is rotated about its longitudinal axis in a direction from an unlocked position to a locked position, the spinal protrusion is driven along a decreasing radius ramp 124 past a shoulder 126 of said locking assembly. The depicted ramp 124 is described herein having a profile that is curved towards the center of the container. The radius defined by the distance between the curve and the center of the container decreases as the ramp 124 approaches the shoulder 126. The shoulder 126 defines a drop off where the profile follows a curve, where the distance between the curve and the center of the container increases at a rapid rate. This construction results in an arrangement where the post members 116 pop into place once they are rotated about their longitudinal axis. Substantial force is require to unlock (rotate the post counterclockwise) the post from the upper member. This functionally creates a lock that prevents the container from inadvertently becoming disassembled. In the depicted embodiment, each of the posts are identical and hence interchangeable.

In the depicted embodiment, the kit further comprises a woven fabric sleeve sized and configured to fit within said internal geometrically shaped volume and has an open upper end for receiving said bulk material therethrough. The sleeve can have a closed lower bottom end or an open lower end with sufficient material to be folded on itself over the base to form a bottom. The sleeve has the strength and bulge resistance parameters suitable for containing the bulk material of a quantity that would substantially fill said internal geometrically shaped volume.

In the depicted embodiment, the kit includes connectors having portions cooperatively arranged on the upper member 106 and adjacent the open upper end of the sleeve to enable selective operative attachment of the upper end of the sleeve to the upper member.

In the depicted embodiment, the kit further comprises an intermediate band 128 engaged with said post 112. The intermediate band comprises a first portion 130 and a second portion 132. The first portion and said second portion include interlocking end portions 134, 136. In the depicted embodiment, the interlocking end portions of the intermediate band member define an aperture in which the post passes through thereby securing said end portions of said intermediate band member to each other. In the depicted embodiment, the rigid base member 102 is sized and configured to secure the post members completely therein for transport. Since the posts are fully contained within the base during transport, they are protected during transport.

The present disclosure, with reference to FIGS. 26-33, also provides an alternative embodiment of a method of assembling a collapsible container for storage or transport of bulk materials. The method comprises the steps of providing component parts of a collapsible container. In particular, the method includes providing a base having an outer periphery, a cover, an upper member having an opening extending therethrough and a plurality of first connector members along its inner periphery, a plurality of lower post members, a plurality of upper post members, a woven fabric sleeve having a plurality of second connector members adjacent an upper open end thereof, and an intermediate band member. It also includes the step of operatively engaging the lower post members with the base around the outer periphery of the base such that the post members extend generally vertically upward from said base. In addition, it includes the step of engaging the intermediate band member with the lower post members at a longitudinal position along the lower post members. The intermediate band member forms a continuous closed configuration around the lower post members. The method can include the step of operatively engaging the upper post members to the lower post members, operatively engaging the upper member with the top distal portions of the vertically extending upper post members, such that the upper member overlies said base.

The method can include rotating the upper post members to positionally lock the upper and lower posts to the base and to the upper member, forming a rigid framework of the upper and lower posts, base, upper member, and intermediate band that defines an internal geometrically shaped volume. The step of rotating the upper post members includes driving at least one spinal protrusion on the upper member of the post against a ramp on said upper member and past a shoulder on said upper member. In the depicted embodiment, the upper member includes a plurality of spinal protrusions radially spaced around its periphery.

The method also can include the step of positioning the woven fabric sleeve within the internal geometrically shaped volume of the rigid framework with an upper open end of the sleeve adjacent the opening of the upper member. The method could also include securing the woven fabric sleeve to the upper member with the first and the second connector members, and operatively engaging said cover to said upper member.

In the depicted embodiment, the ramp has a more gradual edge profile as compared to the shoulder. Therefore, rotating the spinal protrusion from the ramp to past the shoulder requires less force than rotating said spinal protrusion from past the shoulder to said ramp. According to an embodiment of the method, the intermediate band comprises a first portion and a second portion that each include interlocking end portions. The step of engaging the intermediate band member to the lower post includes passing a portion of the lower post through the interlocking end portions of the first portion and the second portion of the intermediate band. In such an embodiment, the lower post is engaged with the base member and extends through the interlocking portion. It should be appreciated that the step of operatively engaging the upper post member with the lower post member can include placing a lower end portion of the upper post member over an upper end portion of the lower post member.

The unique protective collapsibility feature of this invention provides outstanding cost savings for storage and reshipping of the container for reuse, when compared with those for rigid/non-collapsible drum containment approaches of comparable volume containers. For the preferred embodiment 55-gallon drum container configuration described above, the total height of the container in collapsed configuration is less than 8 inches as compared to the typical height of a conventional rigid 55-gallon drum, which varies from about 33.5 inches to 35 inches, depending on the drum's diameter. Therefore, for a standard 55-gallon drum configuration, the height of the collapsed configuration of the container assembly is less than 25 percent of the height of the fully assembled upright container assembly. The preferred height of the collapsed container assembly is preferably less than about 33 percent of its fully assembled upright height. For example, a fully loaded typical 53-foot truck trailer can carry 224 empty conventional 55-gallon drums. The same truck trailer will be able to carry 1,456 of the collapsed 55-gallon container assemblies of the present invention. The savings are multiplied since the collapsible container of this invention is reusable many times, and if replacement parts become necessary over time, the previously used parts are totally recyclable.

It will be obvious to those skilled in the art that the principles of this invention can readily be applied to all sizes of drum type containers, by appropriate adjustments, for example, to the size, strength, or number of the various components comprising the container assembly. The plastic formed members and the woven fabric bag of the bulk drum containment system can be configured to various sizes that are smaller or larger than the 55-gallon drum size configuration of the described preferred embodiment. An increase or decrease in desired size of the configuration mainly affects the base and upper ring members by a change to their diameter (if cylindrical) or other footprint dimension. The height dimensions of the post members may change or remain the same. The circular or other circumferential shape of any intermediate band members used would change appropriately to correspond with any changes in size or footprint dimensions of the base and upper ring members. The invention's unique assembled and collapsed configuration feature, and the other unique features of the other components of the invention, would remain the same, as well as their functionality. Only their length, width, height, circumference, and dimensions would vary due to the container size changes. Also, for larger sizes, the number of individual component members could vary. For example, instead of the four posts used in the 55-gallon drum container embodiment described, a larger number may be required to accommodate greater stacking strength for the particular size of container required and type of bulk material being contained. For smaller containers (e.g., 20-30-gallon size drums) four assembled posts might still be used, but would be shorter than those required for the 55-gallon drum configuration. A 210-330 gallon sized drum configuration might require six to eight posts and possibly additional intermediate bands. In general, the size of the drum's desired volume and the weight of its bulk material contents will dictate the number of posts used because of the stacking strength required and the bulge strength of the woven fiber bag material required. The invention is not to be limited to those specific design variations and alternatives discussed above.

Figure 21:
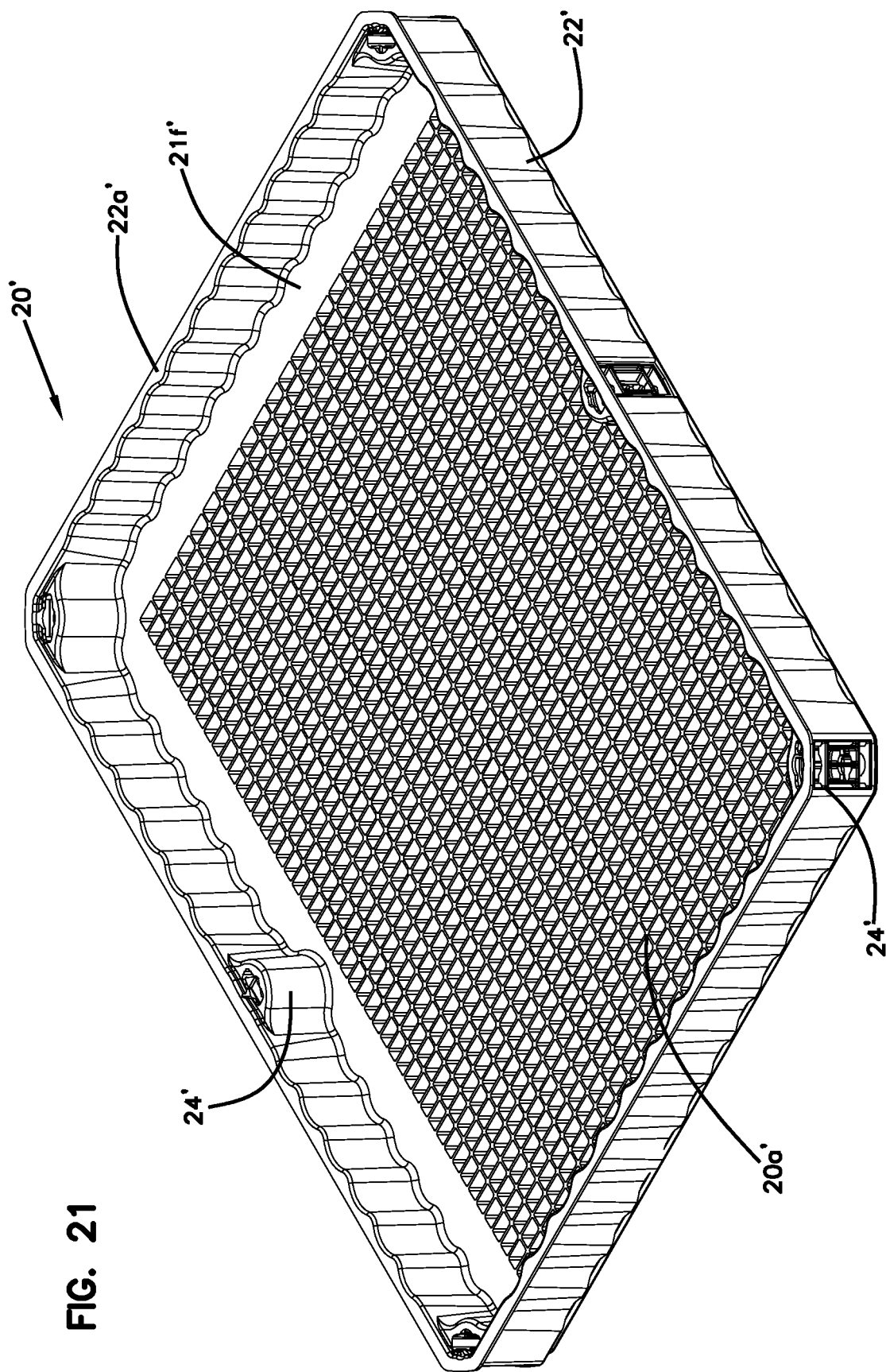
FIG. 21 is an upper, front perspective view of an alternate base portion of rectangular shape for a container assembly constructed according to the principles of this invention.

While a circular base footprint has been shown and described with respect to the preferred embodiment 55-gallon drum-type container described above, those skilled in the art will appreciate that footprint shapes of any closed geometric pattern could be used within the spirit and intent of this invention. It will be understood that the outer configuration of the upper ring would be configured to cooperatively match that of the base footprint. Being able to incorporate footprint shape changes to the unique bulk drum containment system of this invention, recognizes and accommodates industry practices regarding specific footprint sizes of pallets that are standard pallet sizes for particular industries. For example, a footprint of 40, 48 inch pallet size is used for the food/grocery industry's standard pallet size. Recognizing this industry's standard, bulk containers that serve this industry generally have a rectangular footprint configuration which results in being the most efficient configuration for use of the surface area of the 40/48 inch pallet. An example of how a rectangular footprint base member might appear when constructed according to the principles of this invention is generally illustrated in FIG. 21. Those skilled in the art will recognize that appropriate changes to the upper ring and cover along with the intermediate band would be made to match the rectangular footprint shape of the base. The functional aspects of the components and various portions thereof, as described with respect to the 55-gallon drum embodiment, do not change simply because of a change in the shape of the footprint. The unique features of the invention which provide for both assembled and collapsible stacked container configurations with ease of cleanability, reusability and recyclability with resulting shipping and storage cost savings are retained, regardless of the particular footprint configuration employed by the container assembly.

It will be appreciated by those skilled in the art that this invention provides a unique container apparatus, kit and method for shipping bulk materials and for transporting the used containers in collapsed protected form back to a shipping origin. The rigid open container framework, in combination with the woven fabric bag contained therein, provides the same stacking and bulge resistance strength for transporting bulk materials as that of known solid rigid containers, while eliminating the drawbacks and expenses associated with such known solid rigid containers. The assembled loaded container is readily transported to a customer's destination, unloaded, handled, and emptied using standard industry equipment. At the final destination, the drum or other shaped container is easily disassembled and the plastic molded post members, intermediate band, and woven fabric bag are safely secured within the internal cavity space between the base member as it is rapidly secured to the upper ring/cover to form a collapsed module. The collapsed drum container module is ready for storage and/or return shipment and reuse. If necessary, portions of the container can be easily cleaned depending on the particular bulk material being shipped, use application, and sanitation requirements. All component members of the container assembly are completely recyclable.

The above specification, and description of preferred embodiments provide a complete description of the inventive apparatus, use, and materials of the container apparatus of the invention. Since many embodiments of the invention can be made without departing from the spirit and scope of the invention, the invention resides in the claims hereinafter appended.

What is claimed is:

1. A collapsible container assembly suitable for holding a charge of bulk material for storage and transport, comprising:
   (a) a rigid collapsible framework defining an internal geometrically shaped volume, comprising:
      (i) a rigid base having a footprint perimeter defining a first closed geometric shape, and having a bottom portion with a broad upper surface and strength sufficient to support said charge of bulk material;
      (ii) a rigid upper member having a perimeter defining a closed geometric shape similar to that of said first closed geometric shape, and defining an opening therethrough suitable for receiving said charge of bulk material; and
      (iii) a plurality of rigid post members detachably fixedly connecting and peripherally extending between said rigid base and said rigid upper member to form a rigid framework therewith;
   (b) a woven fabric sleeve sized and configured to operatively fit within said internal geometrically shaped volume of said framework, said sleeve having a closed bottom or having a lower open end that is positionable in folded manner on the broad upper surface of the base bottom portion to form a bottom and having an open upper end for receiving said charge of bulk material into the sleeve, said sleeve having strength and bulge resistance parameters suitable for containing said charge of bulk material of a quantity that would substantially fill said internal geometrically shaped volume;
   (c) one or more connectors cooperatively configured on said upper member and said sleeve, detachably connecting said sleeve to said upper member with said open upper end of said sleeve being in operative alignment with said opening in said upper member; and
   (d) a cover detachably cooperatively securable to said upper member to selectively close said opening through said upper member;
   wherein said post members have oppositely disposed first and second ends, wherein the second ends of said post members include a spinal protrusion;
   wherein said base includes a plurality of lower receptors for cooperatively detachably receiving respective ones of said first ends of said post members; and
   wherein said upper member includes a plurality of upper receptors for cooperatively detachably receiving respective ones of said second ends of said post members, wherein said upper receptor includes a ramp adjacent a shoulder that is configured to be driven into contact with the spinal protrusion when said post member is rotated about a longitudinal axis of said post member from an unlocked position to a locked position.

2. The container assembly of claim 1, wherein said ramp has a more gradual edge profile as compared to said shoulder such that rotating said spinal protrusion from said ramp to a location past said shoulder requires less torque than rotating said spinal protrusion from said location past said shoulder to said ramp.

3. The container assembly of claim 1, further comprising an intermediate band engaged with said post member, said intermediate band comprising a first portion and a second portion, wherein said first portion and said second portion include interlocking end portions.

4. The container assembly of claim 3, wherein said interlocking end portions of said intermediate band member define an aperture in which the post member passes through.

5. A kit for assembling a collapsible container suitable for supporting bulk material for storage or transport, comprising:

(a) a rigid base having a footprint perimeter defining a first closed geometric shape, the rigid base including post receptors arranged about said perimeter;
(b) a rigid upper member having a peripheral shape the same as that of said base footprint perimeter and defining an opening therethrough, said upper member including post receptors arranged about said perimeter; and
(c) a plurality of post members having opposed bottom end portions and top end portions, said bottom end portions configured to mate with said post receptors of said rigid base, and said top end portions configured to mate with said post receptors of said rigid upper member, thereby defining an internal geometrically shaped volume; and
wherein at least one of the plurality of post members includes a spinal protrusion at its top end portion, wherein the spinal protrusion is received within a locking assembly of said post receptor such that, when said post member is rotated about its longitudinal axis in a direction from an unlocked position to a locked position, the spinal protrusion drives along a decreasing radius ramp past a shoulder of said locking assembly.

6. The kit of claim 5, further comprising:
a woven fabric sleeve sized and configured to fit within said internal geometrically shaped volume and having an open upper end for receiving said bulk material therethrough, and either a closed lower bottom end or an open lower end with sufficient material to be folded on itself on said base to form a bottom, said sleeve having strength and bulge resistance parameters suitable for containing said bulk material of a quantity that would substantially fill said internal geometrically shaped volume; and
connectors having portions cooperatively arranged on said upper member and adjacent said open upper end of said sleeve, to enable selective operative attachment of the upper end of said sleeve to said upper member.

7. The kit of claim 5, further comprising an intermediate band engaged with said post member, said intermediate band comprising a first portion and a second portion, wherein said first portion and said second portion include interlocking end portions.

8. The kit of claim 7, wherein said interlocking end portions of said intermediate band member define an aperture in which said post member passes through, thereby securing said end portions of said intermediate band member to each other.

9. The kit of claim 5, wherein the rigid base member is configured to secure the plurality of post members completely therein for transport.

10. A method of assembling a collapsible container for storage or transport of bulk materials, comprising the steps of:
(a) providing component parts of a collapsible container including a base having an outer periphery, a cover, an upper member having an opening extending therethrough and a plurality of first connector members along its inner periphery, a plurality of lower post members, a plurality of upper post members, a woven fabric sleeve having a plurality of second connector members adjacent an upper open end thereof, and an intermediate band member;
(b) operatively engaging said lower post members with said base around the outer periphery of said base such that said post members extend vertically upward from said base;
(c) engaging said intermediate band member with said lower post members at a longitudinal position along said lower post members to form a continuous closed configuration of said band around said lower post members;
(d) operatively engaging said upper post members to said lower post members;
(e) operatively engaging said upper member with top distal portions of said vertically extending upper post members, such that said upper member overlies said base;
(f) rotating said upper post members to positionally lock said upper and lower post members to said base and said upper member, forming a rigid framework of said upper and lower post members, base, upper member, and intermediate band that defines an internal geometrically shaped volume, wherein the step of rotating said upper post members includes driving a spinal protrusion on said upper member against a ramp on said upper member and past a shoulder on said upper member;
(g) positioning said woven fabric sleeve within the internal geometrically shaped volume of said rigid framework with an upper open end of said sleeve adjacent said opening of said upper member;
(h) securing said woven fabric sleeve to said upper member with said first and said second connector members; and
(i) operatively engaging said cover to said upper member.

11. The method of claim 10, wherein said ramp has a more gradual edge profile as compared to the shoulder such that rotating said spinal protrusion from the ramp to past the shoulder requires less torque than rotating said spinal protrusion from past the shoulder to said ramp.

12. The method of claim 10, wherein said intermediate band comprises a first portion and a second portion, and wherein said first portion and said second portion include interlocking end portions.

13. The method of claim 12, wherein the step of engaging said intermediate band member to said lower post members includes passing a portion of said lower post member through the interlocking end portions of said first portion and said second portion of the intermediate band.

14. The method of claim 10, wherein said lower post member that is engaged with said base member extends through the interlocking portion.

15. The method of claim 10, wherein the step of operatively engaging said upper post members with said lower post members includes placing a lower end portion of each upper post member over an upper end portion of each lower post member.

* * * * *